United States Patent [19]

Seki et al.

[11] Patent Number: 5,325,664
[45] Date of Patent: Jul. 5, 1994

[54] SYSTEM FOR DETERMINING DETERIORATION OF CATALYSTS OF INTERNAL COMBUSTION ENGINES

[75] Inventors: Yasunari Seki; Toshihiko Sato; Katuhiro Kumagai; Hiroshi Maruyama; Yoichi Iwata; Tsuyoshi Takizawa; Kenichi Maeda; Shigetaka Kuroda; Masataka Chikamatsu; Shukoh Terata; Kazutomo Sawamura; Hajime Uto; Takuya Aoki; Makoto Kobayashi, all of Wako, Japan

[73] Assignee: Honda Giken Kogyo Kabushiki Kaisha, Tokyo, Japan

[21] Appl. No.: 961,794

[22] Filed: Oct. 16, 1992

[30] Foreign Application Priority Data

Oct. 18, 1991 [JP] Japan ............................. 3-271203
Oct. 18, 1991 [JP] Japan ............................. 3-271204
Mar. 10, 1992 [JP] Japan ............................. 4-86284

[51] Int. Cl.$^5$ ............................................. F02F 3/26
[52] U.S. Cl. ............................. 60/276; 60/277; 60/285
[58] Field of Search ............................. 60/277, 285, 276

[56] References Cited

U.S. PATENT DOCUMENTS 3,969,932 7/1976 Rieger et al. .................. 60/277
5,154,055 10/1992 Nakane et al. .................. 60/277

FOREIGN PATENT DOCUMENTS 63-231252 9/1988 Japan .
2-30915 2/1990 Japan .
2-33408 2/1990 Japan .
2-207159 8/1990 Japan .
2-310453 12/1990 Japan .
3-57862 3/1991 Japan .

*Primary Examiner*—Noah P. Kamen
*Attorney, Agent, or Firm*—Nikaido, Marmelstein, Murray & Oram

[57] ABSTRACT

A catalyst deterioration-determining system determines deterioration of a catalyst arranged in the exhaust passage of an internal combustion engine. An ECU is responsive to an output from an $O_2$ sensor arranged upstream of the catalyst or outputs from $O_2$ sensors arranged upstream and downstream of the catalyst for controlling the air-fuel ratio of a mixture supplied to the engine by means of an air-fuel ratio correction value (first air-fuel ratio control). When the engine is in a predetermined operating condition, the system effects changeover from the first air-fuel ratio control to a second air-fuel ratio control which is responsive to the output from the downstream $O_2$ sensor for controlling the air-fuel ratio of the mixture by means of the air-fuel ratio correction value. After the changeover has been effected, a time period is measured which elapses from the time the second air-fuel ratio control causes a change in the air-fuel ratio correction value from a richer side to a leaner side or vice versa with respect to a stoichiometric air-fuel ratio to the time the output from the downstream $O_2$ sensor is inverted from the richer side to the leaner side or vice versa with respect to the stoichiometric air-fuel ratio. It is determined that the catalyst is deteriorated, when the measured time period is shorter than the predetermined time period.

14 Claims, 36 Drawing Sheets

FIG.13b

| | RVo2 | tRD | tLD | TL | TR | Ko2 | tSTRG |
|---|---|---|---|---|---|---|---|
| 1 | <VREF | 0 | 0 | 0 | 0 | +PRSP | SET |
| 2 | <VREF | 0 | 0 | 0 | 0 | +IRSP | COUNTING |
| 3 | INVERTED | SET | 0 | 0 | 0 | +IRSP | COUNTING |
| 4 | >VREF | COUNT DOWN | 0 | 0 | 0 | +IRSP | COUNTING |
| 5 | >VREF | 0 | 0 | M.S. | 0 | −PLSP | SET |
| 6 | >VREF | 0 | 0 | M.C. | 0 | −ILSP | COUNTING |
| 7 | INVERTED | 0 | SET | M.T. | 0 | −ILSP | COUNTING |
| 8 | <VREF | 0 | COUNT DOWN | 0 | 0 | −ILSP | COUNTING |
| 9 | <VREF | 0 | 0 | 0 | M.S. | +PRSP | SET |
| 10 | <VREF | 0 | 0 | 0 | M.C. | +IRSP | COUNTING |
| 11 | INVERTED | SET | 0 | 0 | M.T. | +IRSP | COUNTING |
| 12 | <VREF | 0 | 0 | 0 | M.D. | O. F/B C. | |

M.S. : MEASUREMENT STARTED
M.C. : MEASUREMENT BEING CONTINUED
M.T. : MEASUREMENT TERMINATED
M.D. : MEASUREMENT STOPPED
O. F/B C. : ORDINARY F/B CONTROL

FIG.14b

| | RVo2 | tRD | tLD | TL | TR | Ko2 | tSTRG |
|---|---|---|---|---|---|---|---|
| A | >VREF | 0 | 0 | 0 | 0 | −PLSP | SET |
| B | >VREF | 0 | 0 | 0 | 0 | −ILSP | COUNTING |
| C | INVERTED | 0 | SET | 0 | 0 | −ILSP | COUNTING |
| D | <VREF | 0 | COUNT DOWN | 0 | 0 | −ILSP | COUNTING |
| E | <VREF | 0 | 0 | 0 | 0 | +PRSP | SET |
| 2 | <VREF | 0 | 0 | 0 | 0 | +IRSP | COUNTING |
| 3 | INVERTED | SET | 0 | 0 | 0 | +IRSP | COUNTING |
| 4 | >VREF | COUNT DOWN | 0 | 0 | 0 | +IRSP | COUNTING |
| 5 | >VREF | 0 | 0 | M.S. | 0 | −PRSP | SET |
| 6 | >VREF | 0 | 0 | M.C. | 0 | −ILSP | COUNTING |
| 7 | INVERTED | 0 | SET | M.T. | 0 | −ILSP | COUNTING |
| 8 | <VREF | 0 | COUNT DOWN | 0 | 0 | −ILSP | COUNTING |
| 9 | >VREF | 0 | 0 | 0 | M.S. | +PRSP | SET |
| 10 | >VREF | 0 | 0 | 0 | M.C. | +IRSP | COUNTING |
| 11 | INVERTED | SET | 0 | 0 | M.T. | +IRSP | COUNTING |
| 12 | >VREF | 0 | 0 | 0 | M.D. | O. F/B C. | |

M.S. : MEASUREMENT STARTED
M.C. : MEASUREMENT BEING CONTINUED
M.T. : MEASUREMENT TERMINATED
M.D. : MEASUREMENT STOPPED
O. F/B C. : ORDINARY F/B CONTROL

FIG.25b

| | RVo2 | tRD | tLD | TL | TR | Ko2 | tSTRG |
|---|---|---|---|---|---|---|---|
| 1 | <VREF | 0 | 0 | 0 | 0 | +PRSP | SET |
| 2 | <VREF | 0 | 0 | 0 | 0 | +IRSP | COUNTING |
| 3 | INVERTED | SET | 0 | 0 | 0 | +IRSP | COUNTING |
| 4 | >VREF | COUNT DOWN | 0 | 0 | 0 | +IRSP | COUNTING |
| 5 | >VREF | 0 | 0 | M.S. | 0 | −PLSP | SET |
| 6 | >VREF | 0 | 0 | M.C. | 0 | −ILSP | COUNTING |
| 7 | INVERTED | 0 | SET | M.T. | 0 | −ILSP | COUNTING |
| 8 | <VREF | 0 | COUNT DOWN | 0 | 0 | −ILSP | COUNTING |
| 9 | <VREF | 0 | 0 | 0 | M.S. | +PRSP | SET |
| 10 | <VREF | 0 | 0 | 0 | M.C. | +IRSP | COUNTING |
| 11 | INVERTED | SET | 0 | 0 | M.T. | +IRSP | COUNTING |
| 12 | <VREF | 0 | 0 | 0 | M.D. | O. F/B C. | |

M.S. : MEASUREMENT STARTED
M.C. : MEASUREMENT BEING CONTINUED
M.T. : MEASUREMENT TERMINATED
M.D. : MEASUREMENT STOPPED
O. F/B C. : ORDINARY F/B CONTROL

FIG.26b

| | RVo2 | tRD | tLD | TL | TR | Ko2 | tSTRG |
|---|---|---|---|---|---|---|---|
| A | >VREF | 0 | 0 | 0 | 0 | −PLSP | SET |
| B | >VREF | 0 | 0 | 0 | 0 | −ILSP | COUNTING |
| C | INVERTED | 0 | SET | 0 | 0 | −ILSP | COUNTING |
| D | <VREF | 0 | COUNT DOWN | 0 | 0 | −ILSP | COUNTING |
| E | <VREF | 0 | 0 | 0 | 0 | +PRSP | SET |
| 2 | <VREF | 0 | 0 | 0 | 0 | +IRSP | COUNTING |
| 3 | INVERTED | SET | 0 | 0 | 0 | +IRSP | COUNTING |
| 4 | >VREF | COUNT DOWN | 0 | 0 | 0 | +IRSP | COUNTING |
| 5 | >VREF | 0 | 0 | M.S. | 0 | −PRSP | SET |
| 6 | >VREF | 0 | 0 | M.C. | 0 | −ILSP | COUNTING |
| 7 | INVERTED | 0 | SET | M.T. | 0 | −ILSP | COUNTING |
| 8 | <VREF | 0 | COUNT DOWN | 0 | 0 | −ILSP | COUNTING |
| 9 | <VREF | 0 | 0 | 0 | M.S. | +PRSP | SET |
| 10 | <VREF | 0 | 0 | 0 | M.C. | +IRSP | COUNTING |
| 11 | INVERTED | SET | 0 | 0 | M.T. | +IRSP | COUNTING |
| 12 | >VREF | 0 | 0 | 0 | M.D. | O. F/B C. | |

M.S. : MEASUREMENT STARTED
M.C. : MEASUREMENT BEING CONTINUED
M.T. : MEASUREMENT TERMINATED
M.D. : MEASUREMENT STOPPED
O. F/B C. : ORDINARY F/B CONTROL

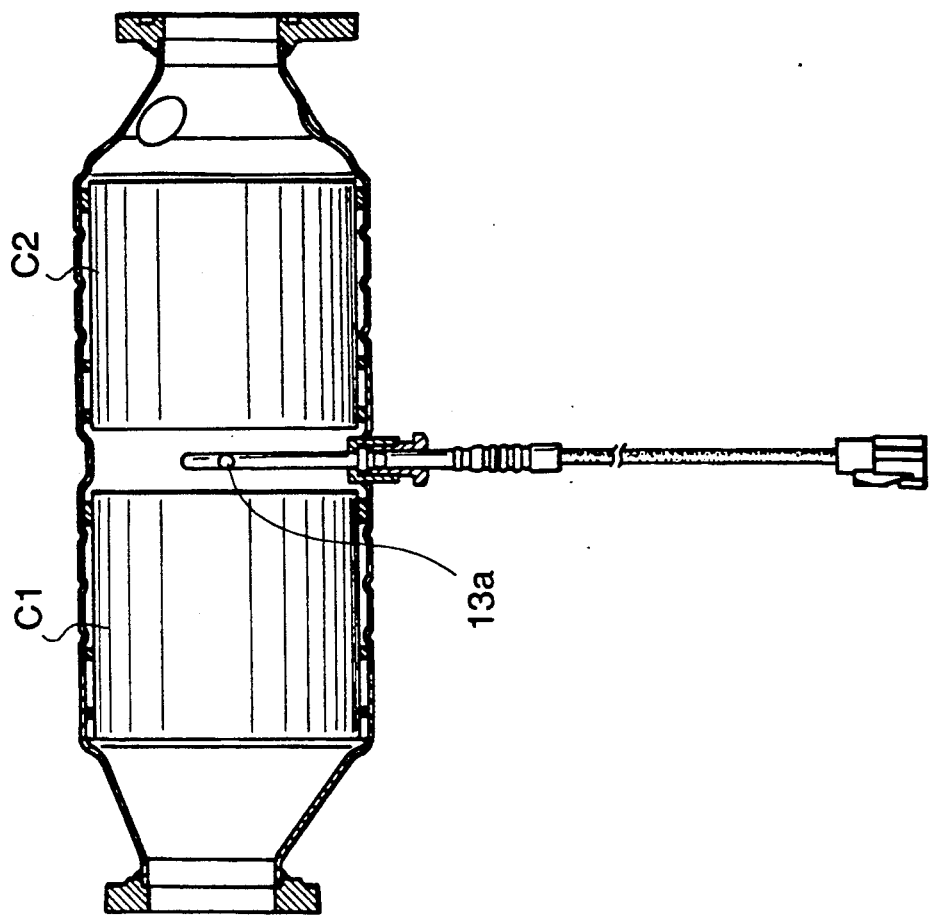
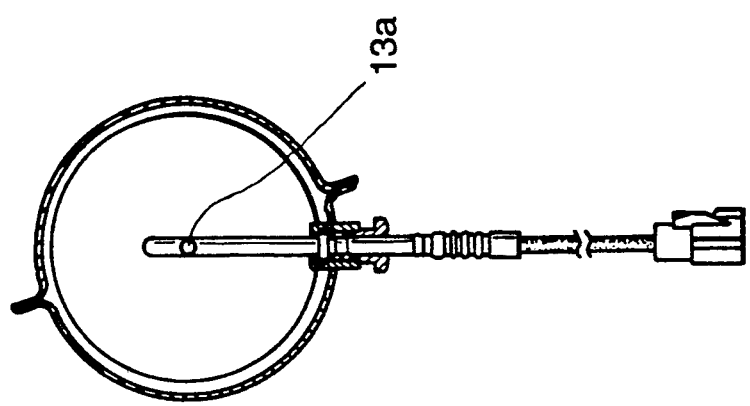

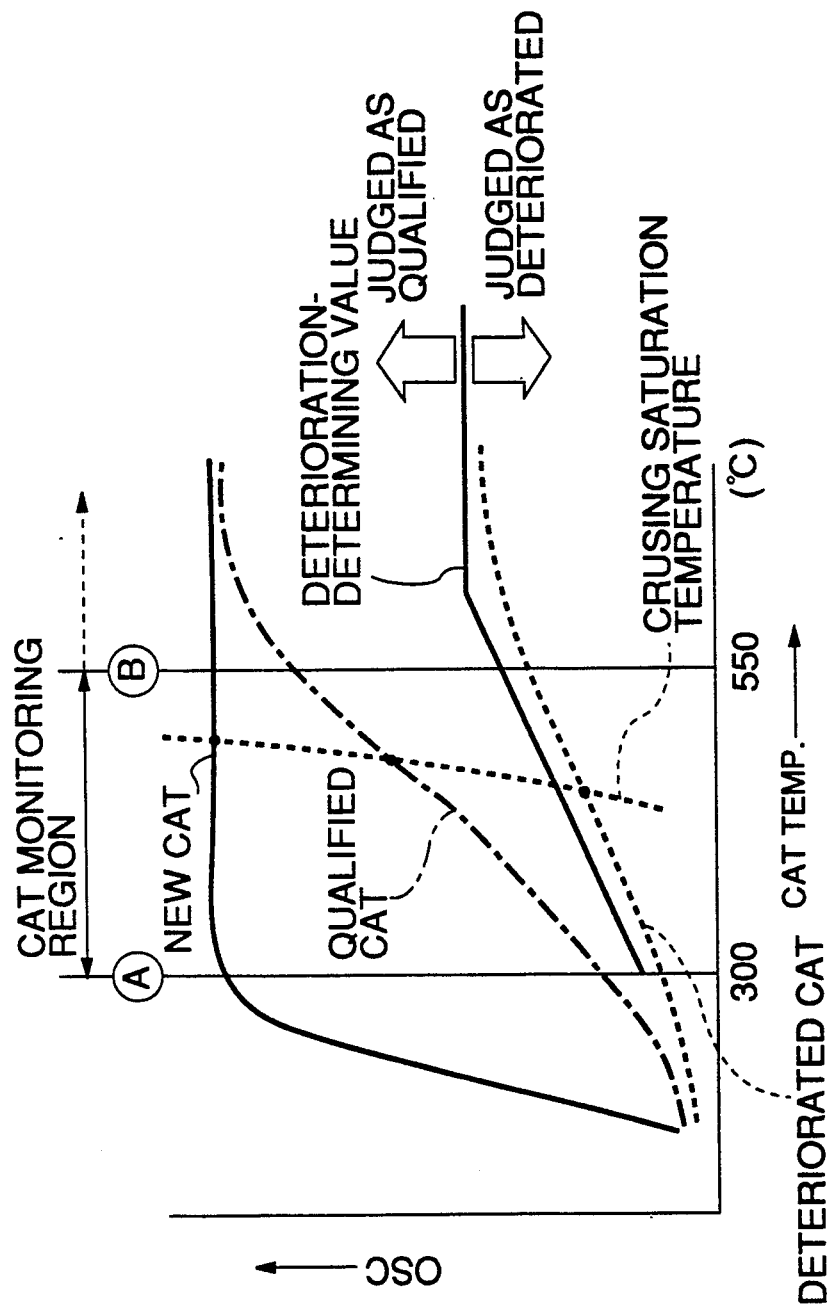

SYSTEM FOR DETERMINING DETERIORATION OF CATALYSTS OF INTERNAL COMBUSTION ENGINES

BACKGROUND OF THE INVENTION

1. Field of the Invention

This invention relates to a system for determining deterioration of a catalyst arranged in the exhaust system of an internal combustion engine for purifying exhaust gases emitted from the engine, and more particularly to such a system which determines deterioration of the catalyst by the use of an output from at least one oxygen concentration sensor arranged in the exhaust system.

2. Prior Art

Conventional methods for determining deterioration of catalysts for purifying exhaust gases from internal combustion engines include a method which comprises providing $O_2$ sensors (oxygen concentration sensors) arranged upstream and downstream of a catalyst arranged in the exhaust system of an internal combustion engine, changing the air-fuel ratio of a mixture supplied to the engine, and measuring a time period elapsed from the time the air-fuel ratio is changed to the time the output from the $O_2$ sensor arranged downstream of the catalyst changes from a leaner side to a richer side with respect to a stoichiometric air-fuel ratio or vice versa (e.g. Japanese Provisional Patent Publications (Kokai) Nos. 2-30915, 2-33408, and 2-207159), a method which is similar to the above-mentioned method but comprises measuring a first time period elapsed from the time the air-fuel ratio is changed to the time the output from the $O_2$ sensor arranged upstream of the catalyst changes from the leaner side to the richer side or vice versa and a second time period elapsed from the air-fuel ratio is changed to the time the output from the downstream $O_2$ sensor is changed from the leaner side to the richer side or vice versa, and measuring a time difference between the first and second time periods (e.g. Japanese Provisional Patent Publication (Kokai) No. 2-310453).

Most of these conventional or known methods include calculating the sum or average value of the time period elapsed from the time the air-fuel ratio is changed to the time the downstream $O_2$ sensor output changes from the leaner side to the richer side with respect to the stoichiometric air-fuel ratio and the time period elapsed from the time the air-fuel ratio is changed to the time the $O_2$ sensor output changes from the richer side to the leaner side, or the sum or average value of the time differences between the first and second time periods, and using the calculated sum or average value for determination of deterioration of the catalyst, to thereby ensure accurate determination of the catalyst deterioration.

Further proposed methods for determining deterioration of catalysts include a method which comprises comparing between an output from the upstream $O_2$ sensor and an output from the downstream $O_2$ sensor, such as a method of determining the ratio between the two sensor outputs (Japanese Provisional Patent Publication (Kokai) No. 63-231252), a method of determining the response ratio between the sensor outputs (Japanese Provisional Patent Publication (Kokai) No. 3-57862), and a method of determining the phase difference time between the sensor outputs (Japanese Provisional Patent Publication (Kokai) No. 2-310453).

Further, a method of this kind has been proposed by U.S. Ser. No. 07/694,831 assigned to the assignee of the present application, which comprises switching an air-fuel ratio correction coefficient at a constant frequency, to determine an area difference between an output from the upstream $O_2$ sensor and an output from the downstream sensor, and determining deterioration of the catalyst from the determined area difference (area difference method).

However, some of the above-mentioned prior art methods employ comparison between the outputs from the upstream and downstream $O_2$ sensors. As a result, they can suffer from errors in the result of deterioration determination, which are due to variations in the characteristics of $O_2$ sensors used and/or aging thereof. Particularly, the upstream $O_2$ sensor, which is directly exposed to hot exhaust gases, undergoes faster deterioration than the downstream $O_2$ sensor. The rate at which the determination proceeds is thus different between the upstream and downstream $O_2$ sensors, which results in an error in the result of deterioration determination.

Also the area difference method proposed by the present assignee, referred to above, suffers from an error in the result of deterioration determination due to deterioration of the upstream $O_2$ sensor. Another disadvantage of this method is that when the central value of the air-fuel ratio correction coefficient subjected to switching deviates from a value corresponding to a stoichiometric air-fuel ratio, it causes changes in the outputs from the $O_2$ sensors, resulting in a variation in the determined area difference.

Further, all the above-mentioned prior art methods do not fully contemplate characteristics or action of the catalyst which are related to its $O_2$ storage capacity, and therefore are unable to accurately determine deterioration of the catalyst. More specifically, in the prior art methods, measurement of the time period or the time difference elapsed or obtained at the time the downstream $O_2$ sensor output changes from the leaner side to the richer side and measurement of the time period or the time difference elapsed or obtained at the time the downstream $O_2$ sensor output changes from the richer side to the leaner side are made independently of each other, i.e. in a manner not related to each other. This results in inaccurate determination of deterioration of the catalyst.

Still further, the $O_2$ storage capacity of catalysts in general varies with a change in the temperature of the catalyst, which causes a variation in the time period (CTL) elapsed before the downstream $O_2$ sensor output changes from the richer side to the leaner side, also resulting in a low degree of accuracy of determination of the catalyst deterioration.

SUMMARY OF THE INVENTION

It is an object of the invention to provide a system for determining deterioration of a catalyst, which is capable of accurately determining deterioration of the catalyst, without being affected by deterioration of an $O_2$ sensor arranged in the exhaust system.

It is a further object of the invention to provide a catalyst deterioration-determining system which can achieve highly accurate determination of deterioration of the catalyst, by utilizing characteristics of the catalyst which are related to its $O_2$ storage capacity.

Another object of the invention is to ensure accurate determination of the catalyst, irrespective of a variation in the temperature of the catalyst causing a variation in the $O_2$ storage capacity.

To attain the first-mentioned object, the present invention provides a catalyst deterioration-determining system for determining deterioration of catalyst means of an internal combustion engine having:

an exhaust passage;

catalyst means arranged in the exhaust passage;

a first oxygen concentration sensor arranged in the exhaust passage upstream of the catalyst means, for sensing concentration of oxygen contained in exhaust gases emitted from the engine;

a second oxygen concentration sensor arranged in the exhaust passage downstream of the catalyst means for sensing concentration of oxygen contained in the exhaust gases; and first air-fuel ratio control means responsive to an output from the first oxygen concentration sensor and an output from the second oxygen concentration sensor for controlling the air-fuel ratio of a mixture supplied to the engine by means of an air-fuel ratio correction value.

The catalyst deterioration-determining system according to the invention comprises:

second air-fuel ratio control means responsive to the output from the second oxygen concentration sensor for controlling the air-fuel ratio of the mixture by means of the air-fuel ratio correction value;

operating condition determining means for determining whether the engine is in a predetermined operating condition;

changeover means for effecting changeover from the first air-fuel ratio control means to the second air-fuel ratio control means for controlling the air-fuel ratio of the mixture, when the engine is determined to be in the predetermined operating condition;

inversion determining means for determining whether the output from the second oxygen concentration sensor has been inverted from a leaner side to a richer side or vice versa with respect to a stoichiometric air-fuel ratio;

time period measuring means for measuring a time period elapsed from the time the second air-fuel ratio control means causes a change in the value of the air-fuel ratio correction value from the richer side to the leaner side with respect to the stoichiometric air-fuel ratio to the time the output from the second oxygen concentration sensor is inverted from the richer side to the leaner side with respect to the stoichiometric air-fuel ratio, after the changeover has been effected; and deterioration determining means for comparing the time period measured by the time period measuring means with a predetermined time period and determining that the catalyst means is deteriorated, when the measured time period is shorter than the predetermined time period.

There are also provided:

time period measuring means for measuring a time period elapsed from the time the second air-fuel ratio control means causes a change in the value of the air-fuel ratio correction value from the leaner side to the richer side with respect to the stoichiometric air-fuel ratio to the time the output from the second oxygen concentration sensor is inverted from the leaner side to the richer side with respect to the stoichiometric air-fuel ratio, after the changeover has been effected; and deterioration determining means for comparing the time period measured by the time period measuring means with a predetermined time period and determining that the catalyst means is deteriorated, when the measured time period is shorter than the predetermined time period.

With the above arrangements, determination of deterioration of the catalyst means is effected during operation of the second air-fuel control means, by the use of the output from the second oxygen concentration sensor (downstream $O_2$ sensor) alone without using the output from the first oxygen concentration sensor (upstream $O_2$ sensor). As a result, the determination results are free of the influences of variations in characteristics of the upstream $O_2$ sensor due to manufacturing tolerances, etc. and deviation from the controlled air-fuel ratio from the stoichiometric air-fuel ratio due to aging, thereby achieving accurate determination of the catalyst deterioration based upon the stable output from the downstream $O_2$ sensor. Further, since the time period measuring means detects the $O_2$ storage capacity of the catalyst means solely based upon the output from the downstream $O_2$ sensor, the deterioration determination can be effected without the influence of the output characteristic of the upstream $O_2$ sensor.

In a more preferred form, the time period measuring period may comprise:

first time period measuring means for measuring a first time period elapsed from the time the second air-fuel ratio control means causes a change in the value of the air-fuel ratio correction value from the richer side to the leaner side with respect to the stoichiometric air-fuel ratio to the time the output from the second oxygen concentration sensor is inverted from the richer side to the leaner side with respect to the stoichiometric air-fuel ratio, after the changeover has been effected; and second time period measuring means for measuring a second time period elapsed from the time the second air-fuel ratio control means causes a change in the value of the air-fuel ratio correction value from the leaner side to the richer side with respect to the stoichiometric air-fuel ratio to the time the output from the second oxygen concentration sensor is inverted from the leaner side to the richer side with respect to the stoichiometric air-fuel ratio, after the changeover has been effected.

In this preferred form, the deterioration determining means compares the sum of the first and second time periods measured by the first and second time period measuring means or an average value thereof with a predetermined time period and determining that the catalyst means is deteriorated, when the sum or the average value is shorter than the predetermined time period.

By virtue of the use of the sum of the first and second time periods or an average value thereof for the deterioration determination, the determination results are free of variations in characteristics between the first and second time period measuring means, thereby enabling to finely detect the $O_2$ storage capacity of the catalyst means and hence achieve accurate deterioration determination.

To attain the second-mentioned object, the deterioration-determining means calculates the sum or the average value of the first time period measured while the second air-fuel ratio control means is controlling the air-fuel ratio of the mixture in response to the output from the second oxygen concentration sensor and the second time period successively measured following the measurement of the first time period, and determines that the catalyst means is deteriorated when the calculated sum or average value is less than the predetermined time period.

Therefore, more precise detection of the $O_2$ storage capacity can be effected on the basis of the actions of the catalyst, i.e. the action of taking in oxide gas components in the exhaust gases and the immediately following action of combining the taken-in oxide gas components with reduced gas components in the exhaust gases, thereby achieving more accurate deterioration determination.

Advantageously, the catalyst deterioration-determining system may include normality determining means for judging that the catalyst means is qualified and terminating the determination of deterioration of the catalyst means, when a predetermined time period has elapsed after the second air-fuel ratio control means caused a change in the value of the air-fuel ratio correction value, before no further inversion occurs in the output from the second oxygen concentration sensor.

By virtue of the provision of the normality determining means, it can be avoided that the operation of the second air-fuel ratio control means where the inversion period of the controlled air-fuel ratio is longer than that during operation of the first air-fuel ratio control means continues over a longer time period than the required time period, thereby preventing degraded driveability of the engine and increase of noxious substances in the exhaust gases.

Alternatively, the first air-fuel ratio control means may be adapted to respond to an output from the first oxygen concentration sensor alone for controlling the air-fuel ratio of a mixture supplied to the engine, to thereby make the control system simple in structure.

Further, according to the invention, alternatively of the (first and second) time period measuring means, there may be employed:

first time difference measuring means for measuring a first time difference between the time the output from the first oxygen concentration sensor is inverted from the richer side to the leaner side with respect to the stoichiometric air-fuel ratio after the air-fuel ratio control means causes a change in the value of the air-fuel ratio correction value from the richer side to the leaner side with respect to the stoichiometric air-fuel ratio and the time the output from the second oxygen concentration sensor is subsequently inverted from the richer side to the leaner side with respect to the stoichiometric air-fuel ratio;

second time difference measuring means for measuring a second time difference between the time the output from the first oxygen concentration sensor is inverted from the leaner side to the richer side with respect to the stoichiometric air-fuel ratio after the air-fuel ratio control means causes a change in the value of the air-fuel ratio correction value from the leaner side to the richer side with respect to the stoichiometric air-fuel ratio and the time the output from the second oxygen concentration sensor is subsequently inverted from the leaner side to the richer side with respect to the stoichiometric air-fuel ratio; and deterioration determining means for comparing the sum of first and second time differences measured by the first and second time difference measuring means or an average value thereof with a predetermined time period and determining that the catalyst means is deteriorated, when the sum or the average value is shorter than the predetermined time period.

Advantageously, to attain the second-mentioned object, the deterioration-determining means calculates the sum or the average value of the first time difference measured by the first time difference measuring means and the second time difference successively measured following the measurement of the first time period, by the second time difference measuring means, and determines that the catalyst means is deteriorated when the calculated sum or average value is less than the predetermined time period.

With the above arrangement, the deterioration determination is effected by utilizing the actions of the catalyst that the time period over which $O_2$ and $NO_x$ in the exhaust gases are taken in by the catalyst and the immediately following time period over which CO and HC in the exhaust gases are taken in by the catalyst. As a result, the $O_2$ storage capacity of the catalyst can be finely detected to thereby enable to achieve accurate determination of deterioration of the catalyst.

To attain the last-mentioned object, the operating condition determining means includes catalyst temperature detecting means for detecting temperature of the catalyst means.

Alternatively, the operating condition determining means includes catalyst temperature estimating means for estimating temperature of the catalyst means, based upon operating parameters of the engine.

Preferably, the catalyst deterioration-determining system may include determination inhibiting means for inhibiting the determination of deterioration of the catalyst means, when the detected temperature of the catalyst means or the estimated temperature thereof is below a predetermined value, or above a predetermined value, or falls outside a predetermined range.

By thus specifying a catalyst temperature range within which determination of the $O_2$ storage capacity can be positively determined, as the deterioration-monitoring range, more accurate deterioration determinating can be effected. Further, by estimating the catalyst temperature from operating conditions of the engine, it is possible to reduce the cost.

Further, the catalyst deterioration-determining system may determine deterioration of the catalyst means, based upon an output from the first and second oxygen concentration sensor or outputs from the first and second oxygen sensors and a predetermined determination value, wherein determining means determines a value of the predetermined determination value, based upon the temperature of the catalyst means.

The temperature of the catalyst for determining the predetermined determination value may be directly detected by temperature detecting means or estimated based upon the detected operating conditions of the engine, such as the rotational speed of the engine and load on the engine, or an amount of intake air supplied to the engine.

By thus correcting the predetermined determination value in dependence on the temperature characteristic of the catalyst, the deterioration determination can be carried out at any temperature of the catalyst within the catalyst monitoring temperature range, without an error in the determination results.

Preferably, the temperature detecting means may be mounted in the catalyst means for detecting temperature at a central portion of the catalyst means, so that the temperature detecting means is exposed to a stable flow of exhaust gases flowing through the catalyst means, to thereby enable to detect the catalyst bed temperature in a stable and accurate manner.

The above and other objects, features, and advantages of the invention will be more apparent from the following detailed description taken in conjunction with the accompanying drawings.

BRIEF DESCRIPTION OF THE DRAWINGS

FIGS. 25a and 25b are timing charts showing changes in the correction coefficient $KO_2$;

FIGS. 26a and 26b are timing charts showing another example of changes in the correction coefficient $KO_2$;

FIGS. 28 (a) and (b) are sectional views of a catalyst C appearing in FIG. 1;

FIG. 31 is a graph useful in explaining results obtainable from the embodiment of FIG. 29;

DETAILED DESCRIPTION

The invention will now be described in detail with reference to the drawings showing embodiments thereof.

Figure 1:
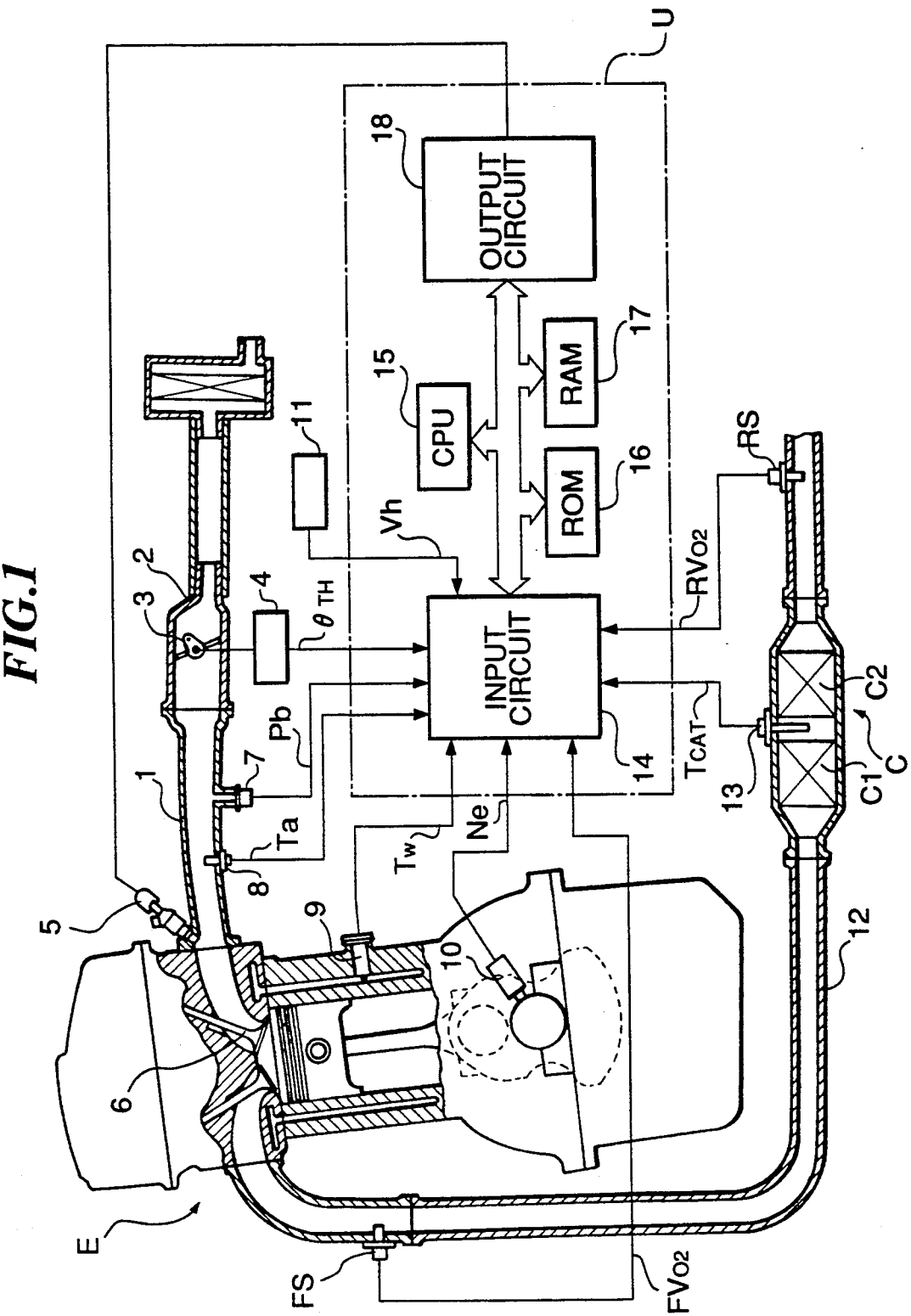
FIG. 1 is a block diagram showing the whole arrangement of a fuel supply control system incorporating a catalyst deterioration-determining system according to an embodiment of the invention.

Referring first to FIG. 1, there is shown the whole arrangement of a fuel supply control system for an internal combustion engine, which incorporates a catalyst deterioration-determining system according to the invention. In the figure, reference numeral E designates an internal combustion engine for automotive vehicles. Connected to the cylinder block of the engine E is an intake pipe 1 across which is arranged a throttle body 2 accommodating a throttle valve 3 therein. A throttle valve opening ($\theta$TH) sensor 4 is connected to the throttle valve 3 for generating an electric signal indicative of the sensed throttle valve opening and supplying same to an electronic control unit (hereinafter referred to as "the ECU") U.

Fuel injection valves 5, only one of which is shown, are inserted into the interior of the intake pipe 1 at locations intermediate between the cylinder block of the engine 1 and the throttle valve 3 and slightly upstream of respective intake valves, not shown. The fuel injection valves 5 are connected to a fuel pump, not shown, and electrically connected to the ECU U to have their valve opening periods controlled by signals therefrom.

On the other hand, an intake pipe absolute pressure ($P_b$) sensor 7 is provided in communication with the interior of the intake pipe 1 at a location immediately downstream of the throttle valve 3 for supplying an electric signal indicative of the sensed absolute pressure within the intake pipe 1 to the ECU U. An intake air temperature (Ta) sensor 8 is inserted into the intake pipe 1 at a location downstream of the intake pipe absolute pressure sensor 7 for supplying an electric signal indicative of the sensed intake air temperature Ta to the ECU U.

An engine coolant temperature (Tw) sensor 9, which may be formed of a thermistor or the like, is mounted in the cylinder block of the engine E, for supplying an electric signal indicative of the sensed engine coolant temperature Tw to the ECU U. An engine rotational speed (Ne) sensor 10 is arranged in facing relation to a camshaft or crankshaft of the engine E, neither of which is shown. The engine rotational speed sensor 10 generates a pulse as a TDC signal pulse at each of predetermined crank angles whenever the crankshaft rotates through 180 degrees, for supplying same to the ECU U.

A vehicle speed (Vh) sensor 11 is connected to the ECU U for detecting the vehicle speed Vh and supplying a signal indicative of the detected vehicle speed Vh to the ECU U.

A three-way catalyst C is arranged within an exhaust pipe 12 connected to the cylinder block of the engine E for purifying noxious components such as HC, CO, and NOx. $O_2$ sensors FS, RS as oxygen concentration sensors are mounted in the exhaust pipe 12 at locations upstream and downstream of the three-way catalyst C, respectively, for sensing the concentration of oxygen present in exhaust gases emitted from the engine E and supplying respective electric signals $FV_{o2}$, $RV_{o2}$ in accordance with the output values thereof to the ECU U. Further, a catalyst temperature ($T_{CAT}$) sensor 13 is mounted on the three-way catalyst C for detecting the temperature of same and supplying a signal indicative of the detected catalyst temperature $T_{CAT}$ to the ECU U.

The ECU U comprises an input circuit 14 having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 15, a ROM 16 storing various operational programs which are executed in the CPU 15, a RAM 17 for storing results of calculations therefrom, etc., and an output circuit 18 which outputs driving signals to the fuel injection valves 5.

The CPU 15 operates in response to the abovementioned signals from the sensors to determine various operating conditions in which the engine E is operating, such as an air-fuel ratio feedback control region in which the fuel supply is controlled in response to the detected oxygen concentration in the exhaust gases, and open-loop control regions other than the feedback control region, and calculates, based upon the determined operating conditions, the valve opening period or fuel injection period $T_{OUT}$ over which the fuel injection valves 5 are to be opened, by the use of the following equation (1) in synchronism with inputting of TDC signal pulses to the ECU U:

$$T_{OUT} = T_i \times K_{o2} \times K_{LS} \times K_1 + K_2 \quad (1)$$

where $T_i$ represents a basic value of the fuel injection period $T_{OUT}$ of the fuel injection valves 5, which is determined in accordance with the engine rotational speed Ne and the intake pipe absolute pressure $P_b$.

$K_{o2}$ is an air-fuel ratio feedback control correction coefficient whose value is determined in response to the oxygen concentration in the exhaust gases during feedback control, while it is set to respective predetermined appropriate values while the engine is in the open-loop control regions.

$K_{LS}$ is an air-fuel ratio leaning coefficient, which is set to a predetermined value less than 1.0 (e.g. 0.95) when the engine is in certain open-loop control regions, such as a predetermined engine deceleration region including an air-fuel ratio leaning region and a fuel cut region.

$K_1$ and $K_2$ are other correction coefficients and correction variables, respectively, which are calculated based on various engine operating parameter signals to such values as to optimize characteristics of the engine such as fuel consumption and driveability depending on operating conditions of the engine.

The CPU 15 supplies through the output circuit 18, the fuel injection valves 5 with driving signals corresponding to the calculated fuel injection period $T_{OUT}$ determined as above, over which the fuel injection valves 5 are opened.

Figure 2:
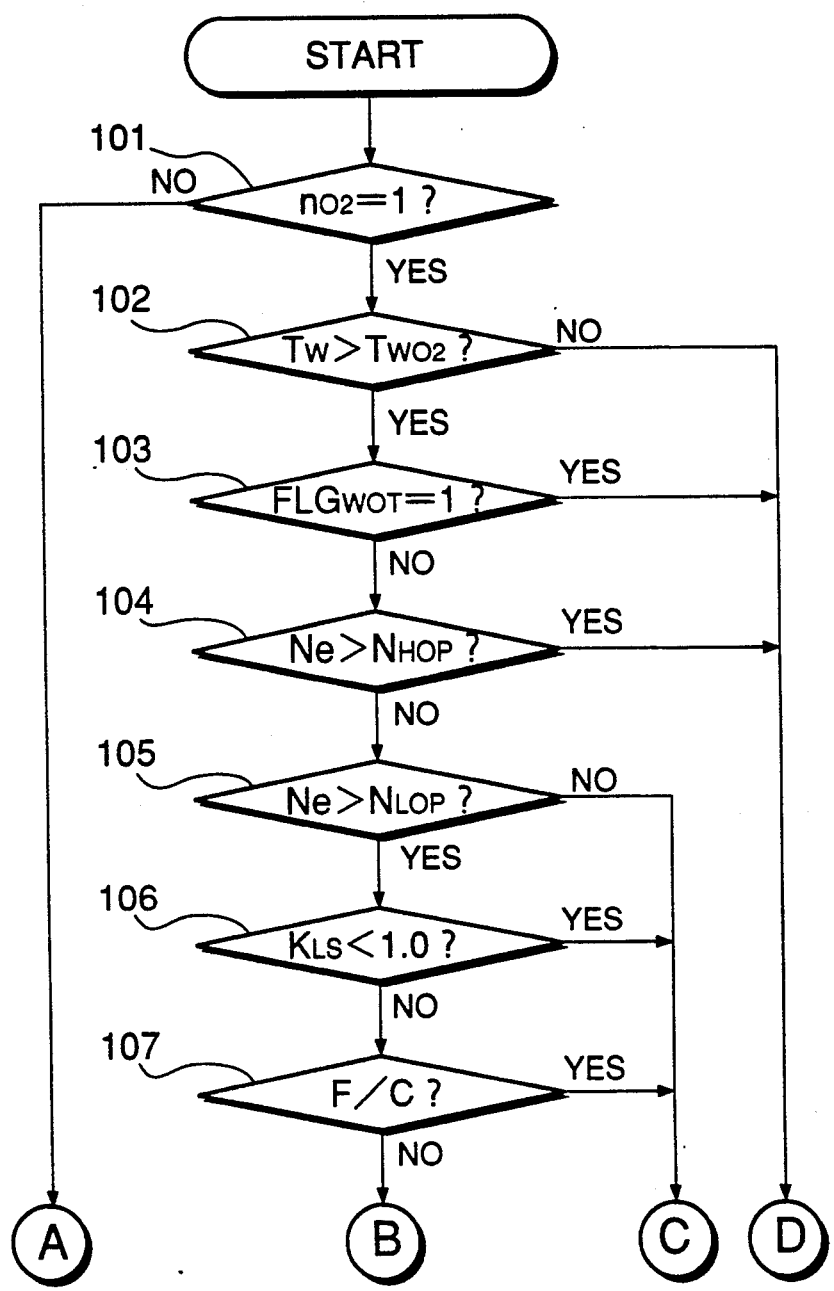
FIG. 2 is a flowchart of a program for setting an air-fuel ratio correction coefficient $KO_2$.
Figure 3:
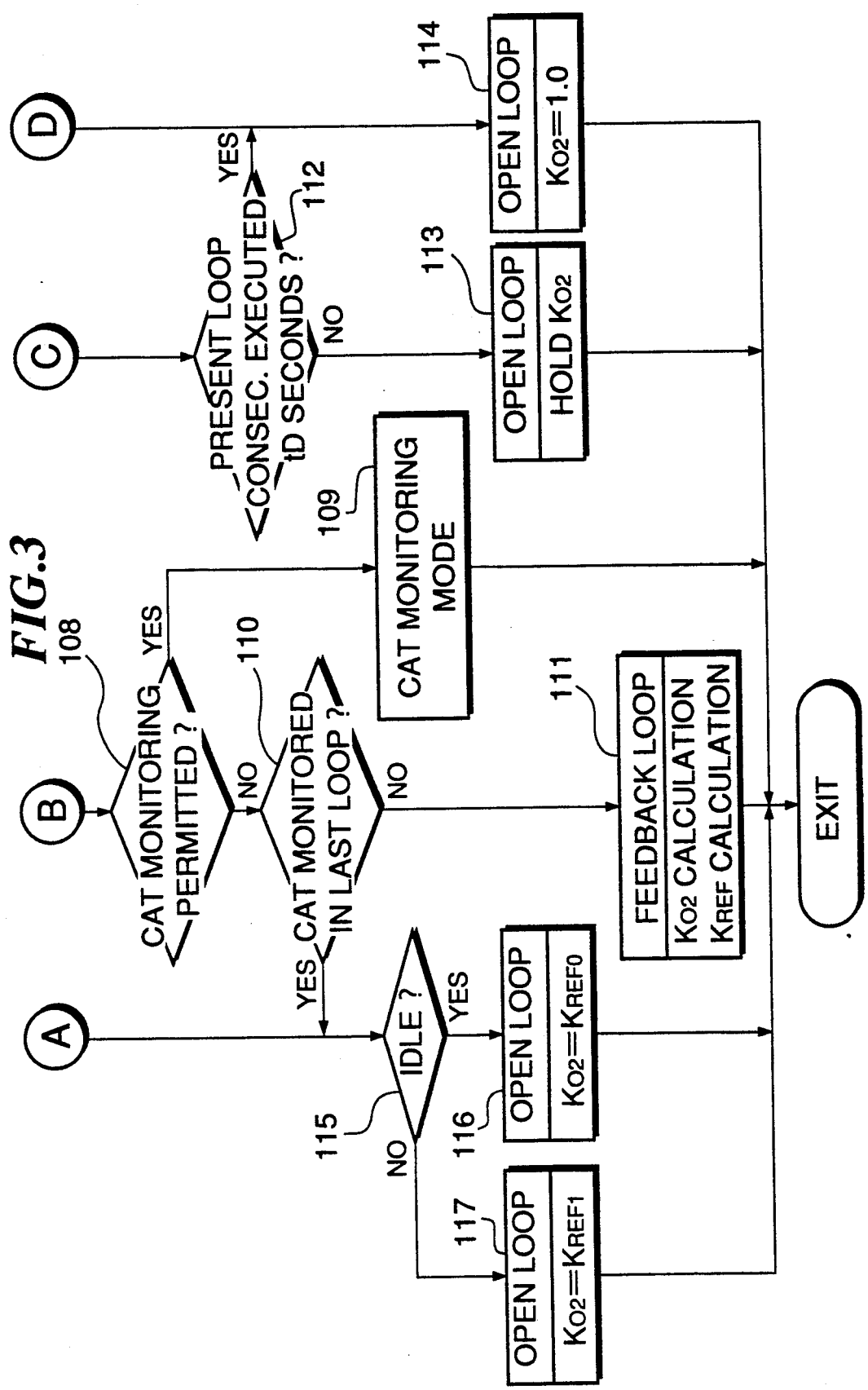
FIG. 3 is a flowchart of a continued part of the program of FIG. 2.

FIGS. 2 and 3 show a program for calculating the air-fuel ratio feedback correction coefficient $K_{o2}$. This program is executed upon generation of each TDC signal pulse and in synchronism therewith.

First, at a step 101, it is determined whether or not a flag $no_2$ is equal to 1. The flag $no_2$ is for determining whether or not the upstream $O_2$ sensor FS and the downstream $O_2$ sensor RS have been activated. If the flag $no_2$ is equal to 1, which indicates that the both $O_2$ sensors FS, RS have been activated, it is determined at a step 102 whether or not the engine coolant temperature Tw is higher than a predetermined value $Tw_{O2}$. If $Tw > Tw_{O2}$, indicating that the engine E has been warmed up, it is determined at a step 103 whether or not a flag $FLG_{WOT}$ is equal to 1. This flag $FLG_{WOT}$ is set to 1, by a program, not shown, when the engine E is in a high load region, in which the fuel supply amount to the engine E should be increased.

If the engine E is not in the high load region, it is determined at a step 104 whether or not the engine rotational speed Ne is higher than a predetermined higher value $N_{HOP}$. If the $Ne \leq N_{HOP}$, it is further determined at a step 105 whether or not the engine rotational speed Ne is higher than a predetermined value $N_{LOP}$. If $N_{LOP} < Ne \leq N_{HOP}$, it is determined at a step 106 whether or not the leaning coefficient $K_{LS}$ is less than 1.0, i.e. whether or not the engine E is in a predetermined decelerating region. If $K_{LS} \geq 1.0$, it is determined at a step 107 whether or not the engine E is under fuel cut. If the answer is negative (NO), it is determined that the engine E is in the feedback control region, and then at a step 108 it is determined whether or not the engine is in an operating condition permitting monitoring of deterioration of the catalyst C. If the answer is affirmative (YES), the program proceeds to a step 109 where second air-fuel ratio control means, hereinafter referred to, controls the correction coefficient $K_{o2}$ in response to an output voltage $RV_{o2}$ from the downstream $O_2$ sensor RS and carries out monitoring of deterioration of the catalyst C, followed by terminating the program.

On the other hand, if the answer to the question of the step 108 is negative (NO), i.e. monitoring of the catalyst C is not permitted, it is determined at a step 110 whether or not the catalyst monitoring was carried out in the last loop. If the answer is negative (NO), i.e. the monitoring has been continually being inhibited, the program proceeds to a step 111 where first air-fuel ratio control means, hereinafter referred to, controls the correction coefficient $K_{o2}$ in response to the outputs $FV_{o2}$, $RV_{o2}$ from the upstream and downstream $O_2$ sensors FS, RS and calculates an average value $K_{REF}$ of the correction coefficient $K_{o2}$, followed by terminating the program.

On the other hand, if the answer to the question of the step 105 is negative (NO), i.e. if $Ne \leq N_{LOP}$, indicating that the engine E is in a predetermined low speed region, or if the answer to the question of the step 106 is affirmative (YES), i.e. if the engine E is in the predetermined decelerating region, or if the answer to the question of the step 107 is affirmative (YES), i.e. if the engine E is under fuel cut, the program proceeds to a step 112 where it is determined whether or not the present loop including the step 112 has been consecutively executed over a predetermined time period $t_D$. If the answer is negative (NO), the correction coefficient $K_{o2}$ is held at a value assumed immediately before the program proceeds to the present loop, whereas if the answer is affirmative (YES), the correction coefficient $K_{o2}$ is set to 1.0 to carry out open loop control of the air-fuel ratio, followed by terminating program. That is, when the engine E shifts from the feedback control region to an open loop control region, depending upon the answers to the questions of the steps 105-107, the correction coefficient $K_{o2}$ is held at the immediately proceeding value until the predetermined time period $t_D$ elapses, and after the lapse of the predetermined time period $t_D$, it is set to 1.0.

If the answer to the question of the step 102 is negative (NO), i.e. if the engine has not been warmed up, or if the answer to the question of the step 103 is affirmative (YES), i.e. if the engine E is in the high load region, or if the answer to the question of the step 104 is affirmative (YES), i.e. if the engine E is in the predetermined high speed region, the program proceeds to the step 114 to carry out the open loop control, followed by terminating the program.

If the answer to the question of the step 101 is negative (NO), i.e. if the both O2 sensors FS, RS are inactivated, and at the same time the answer to the question of the step 110 is affirmative (YES), i.e. if the catalyst monitoring has been first permitted in the present loop, the program proceeds to a step 115 where it is determined whether or not the engine E is in an idling region. This determination is carried out by determining whether or not the engine rotational speed Ne is lower than a predetermined value and at the same time the throttle valve opening $\theta_{TH}$ is smaller than a predetermined value. If the answer to the question of the step 115 is affirmative (YES), i.e. if the engine E is in the idling region, at a step 116 the correction coefficient $K_{o2}$ is set to an average value $K_{REF}$ thereof for use in the idling region to thereby effect the open loop control, followed by terminating the program.

If the answer to the question of the step 115 is negative (NO), i.e. if the engine E is in a region other than the idling region (hereinafter referred to as "the off-idle region"), the correction coefficient $K_{o2}$ is set to an average value $K_{REF1}$ thereof for use in the off-idle region.

Figure 4:
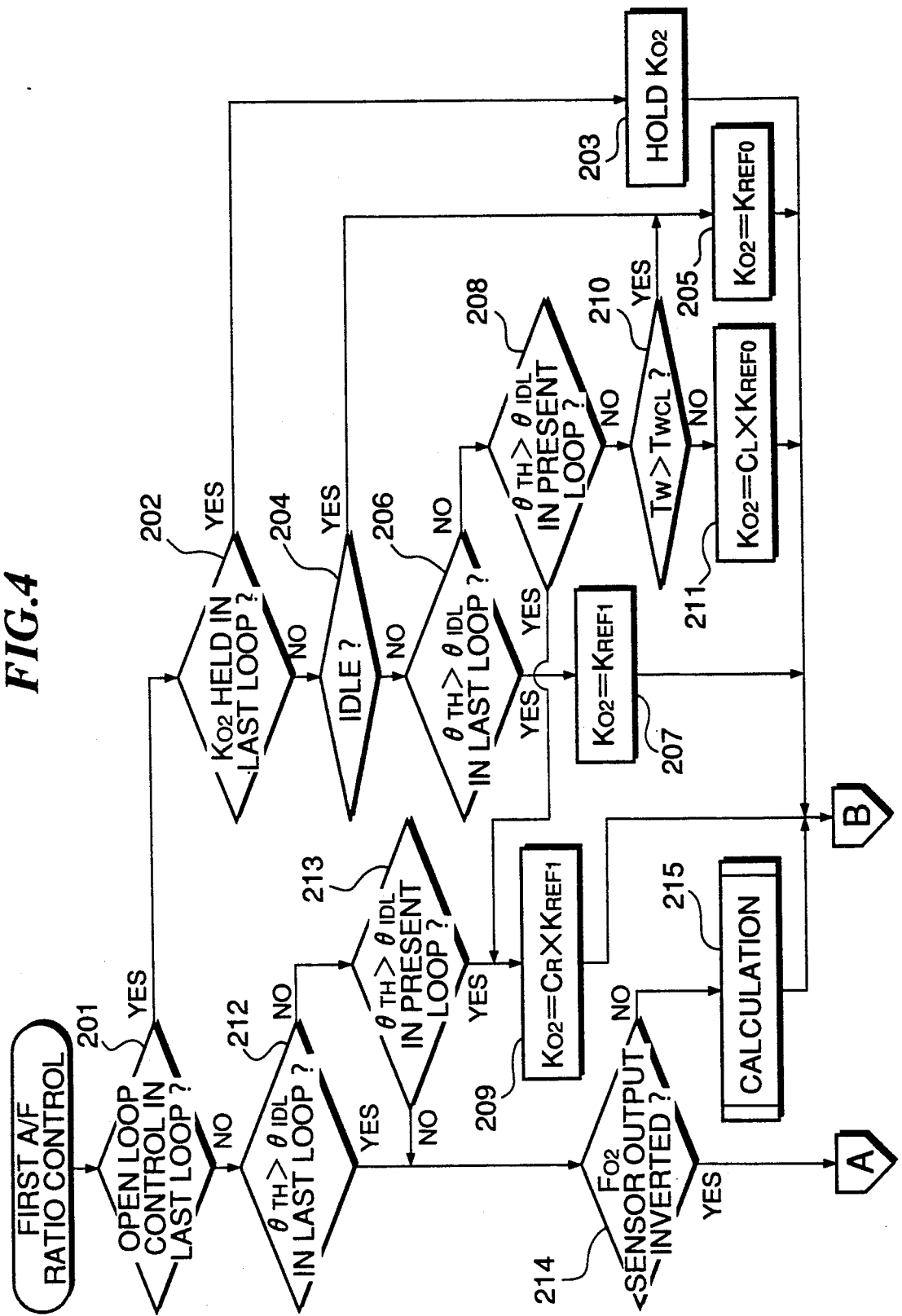
FIG. 4 is a flowchart of a program executed by first air-fuel ratio control means.
Figure 5:
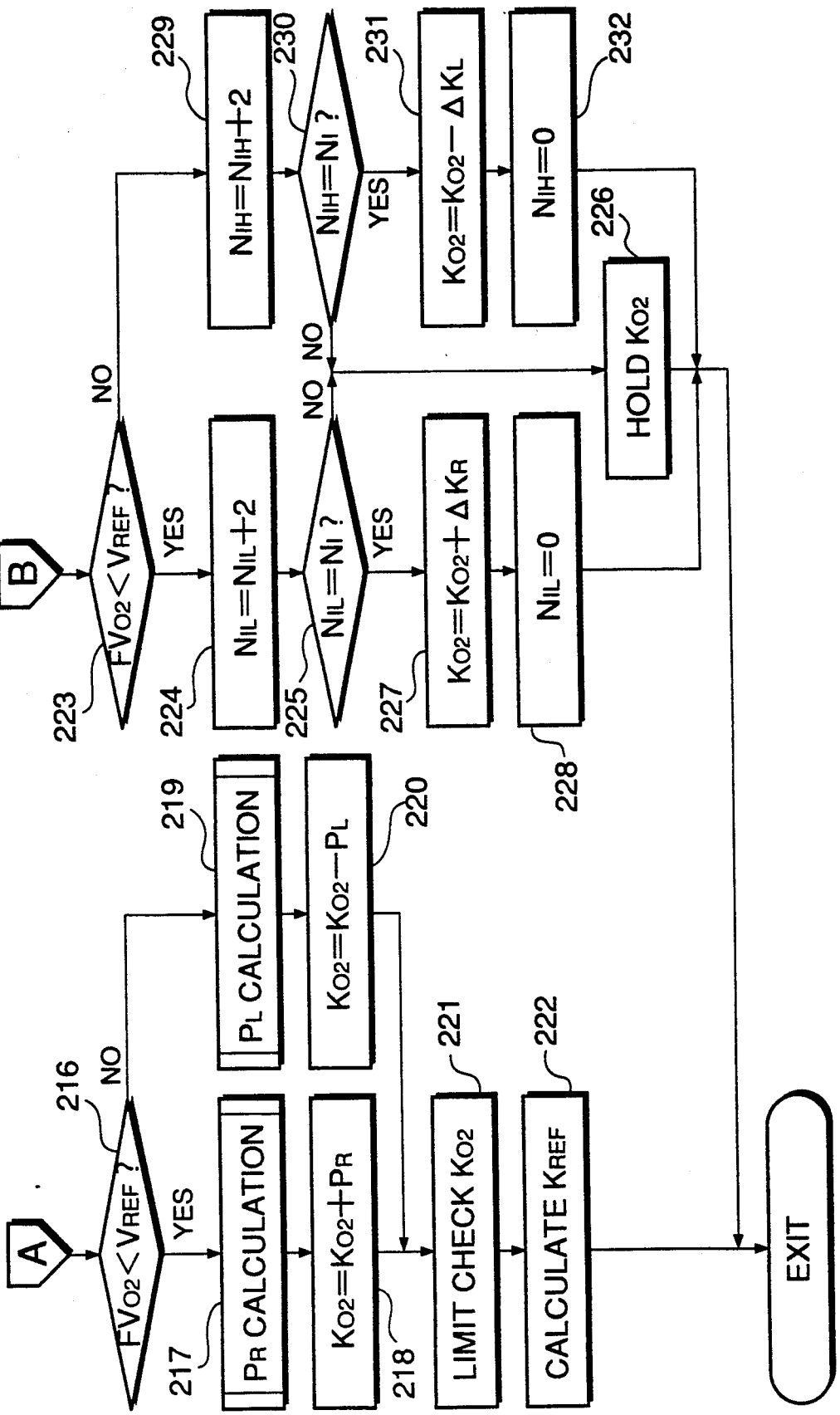
FIG. 5 is a flowchart of a continued part of the program of the FIG. 4.

FIGS. 4 and 5 show a subroutine for calculating the correction coefficient $K_{o2}$, which is executed at the step 111 in FIG. 2 during the feedback control.

First, at a step 201, it is determined whether or not open loop control was effected in the last loop. If the answer to the question is affirmative (YES), it is determined at a step 202 whether or not the value of the correction coefficient $K_{o2}$ was held at the immediately preceding value at the step 113 in FIG. 2. If the answer is affirmative (YES), the value of the correction coefficient $K_{o2}$ continues to be held at the immediately preceding value at a step 203, to carry out integral control (I-term control) at steps 223 et seq., as hereinafter described. If the answer to the question of the step 202 is negative (NO), i.e. if the value of the correction coefficient $K_{o2}$ was not held at the immediately preceding value in the last loop, it is determined at a step 204 whether or not the engine E is in the idling region. If the answer is affirmative (YES), i.e. if the engine E is in the idling region, the correction coefficient $K_{o2}$ is set to the average value $K_{REF0}$ at a step 205, followed by effecting the integral control at the steps 223 et seq.

If the answer to the question of the step 204 is negative (NO), i.e. if the engine E is in the off-idle region, it is determined at a step 206 whether or not the throttle valve opening $\theta_{TH}$ was greater than a predetermined idling value $\theta_{IDL}$ in the last loop. If the answer is affirmative (YES), the correction coefficient $K_{o2}$ is set to the average value $K_{KEF1}$ for the off-idle region at a step 207, followed by effecting the integral control at the steps 223 et seq.

If the answer to the question of the step 206 is negative (NO), i.e. if $\theta_{TH} \leq \theta_{IDL}$ held in the last loop, it is determined as a step 208 whether or not the present throttle valve opening $\theta_{TH}$ is greater than the idling value $\theta_{IDL}$. If the answer is affirmative (YES), i.e. if $\theta_{TH} \leq \theta_{IDL}$ held in the last loop and $\theta_{TH} > \theta_{IDL}$ holds in the present loop, at a step 209 the correction coefficient $K_{o2}$ is set to the product $C_R \times K_{REF1}$ where $C_R$ is an enriching constant which is set at a value greater than 1.0, followed by effecting the integral control at the steps 223 et seq. If the answer to the question of the step 208 is negative (NO), i.e. if $\theta_{TH} \leq \theta_{IDL}$ holds, it is determined at a step 210 whether or not the engine coolant temperature Tw is higher than a predetermined value $T_{WCL}$ (e.g. 70° C.). If the answer is affirmative (YES), i.e. if $Tw > T_{WCL}$, indicating that the engine coolant Tw is not in a low region, the program proceeds to the step 205.

If the answer to the question of the step 210 is negative (NO), i.e. if $Tw \leq T_{WCL}$, indicating that the engine coolant temperature Tw is in the low region, the correction coefficient $K_{o2}$ is set to the product $C_L \times K_{REF0}$ where $C_L$ is a leaning constant which is set at a value smaller than 1.0.

If the answer to the question of the step 201 is negative (NO), i.e. if the feedback control was effected in the last loop, it is determined at a step 212 whether or not the throttle valve opening $\theta_{TH}$ was greater than the idling value $\theta_{IDL}$ in the last loop. If the answer is affirmative (YES), it is further determined at a step 213 whether or not the throttle valve opening $\theta_{TH}$ is greater than the idling value in the present loop. If the answer is affirmative (YES), the program proceeds to the step 209, like the case where the answer to the question of the step 208 is affirmative (YES), when the correction coefficient $K_{o2}$ is set to the product $C_R \times K_{REF1}$.

If the answer to the question of the step 212 is affirmative (YES), i.e if $\theta_{TH} > \theta_{IDL}$ held in the last loop, or if the answer is negative (NO), i.e. if $\theta_{TH} \leq \theta_{IDL}$ holds in the present loop, it is determined at a step 214 whether or not the output level of the upstream O2 sensor FS has been inverted. If the answer is negative (NO), correction terms $\Delta K_R$, $\Delta K_L$, hereinafter referred to, are determined at a step 215, followed by effecting the integral control at the steps 223 et seq.

Figure 15:
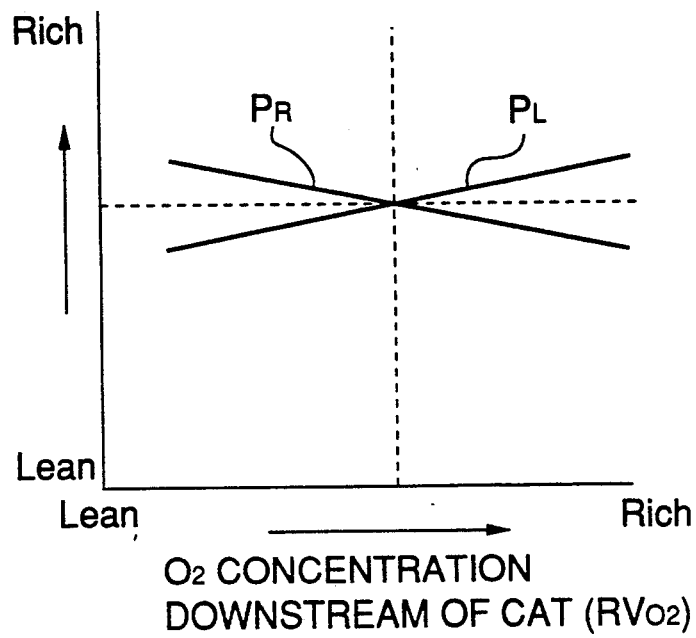
FIG. 15 is a graph showing the relationship between an output $RV_{o2}$ from a downstream $O_2$ sensor and correction terms $P_R$, $R_L$.

If the answer to the question of the step 214 is affirmative (YES), i.e. if there has been an inversion in the output level of the upstream O2 sensor FS, proportional control (P-term control) is effected. More specifically, first, at a step 216, it is determined whether or not the output voltage $FV_{o2}$ from the upstream $O_2$ sensor FS is lower than a reference voltage $V_{REF}$. If the answer is affirmative (YES), i.e. if $FV_{o2} < V_{REF}$, the value of a correction term $P_R$ is determined based upon the output voltage $RV_{o2}$ from the downstream $O_2$ sensor RS, as shown in FIG. 15, at a step 217, followed by effecting the proportional control where the correction term $P_R$ is added to the correction coefficient $K_{o2}$ at a step 218. On the other hand, if the answer to the question of the step 216 is negative (NO), a correction term $P_L$ is determined based upon the output voltage $RV_{o2}$ from the downstream $O_2$ sensor RS, as shown in FIG. 15, at a step 219, followed by effecting the proportional control where the correction term $P_L$ is subtracted from the correction coefficient $K_{o2}$ at a step 220.

The correction term $P_R$ serves to stepwise increase the correction coefficient $K_{o2}$ whenever the output voltage $FV_{o2}$ from the upstream $O_2$ sensor FS is inverted from the leaner side to the richer side with respect to the stoichiometric air-fuel ratio, to thereby control the air-fuel ratio to richer value. As shown in FIG. 15, the value of the correction term $P_R$ is set based upon the output voltage $RV_{o2}$ from the downstream $O_2$ sensor RS such that as the degree to which the output voltage $RV_{o2}$ deviates toward the richer side is greater, it is set to a smaller value, whereas as the degree to which the output voltage $RV_{o2}$ deviates toward the leaner side is greater, it is set to a greater value. The correction term $P_L$ serves to stepwise decrease the correction coefficient $K_{o2}$ whenever the output voltage $FV_{o2}$ from the upstream $O_2$ sensor FS is inverted from the leaner side to the richer side. As shown in FIG. 15, the value of the correction term $R_L$ is set based upon the output voltage $RV_{o2}$ from the downstream $O_2$ sensor RS such that as the degree to which the output voltage $RV_{o2}$ deviates toward the richer side is greater, it is set to a greater value, whereas as the degree to which the output voltage $RV_{o2}$ deviates toward the leaner side is greater, it is set to a smaller value. In this way, the proportional control of the correction coefficient $K_{o2}$ is effected in a fine manner based upon both the output voltage $FV_{o2}$ from the upstream $O_2$ sensor FS and the output voltage $RV_{o2}$ from the downstream $O_2$ sensor RS (see ordinary F/B control mode in FIGS. 13 and 14, hereinafter referred to).

Then, limit checking of the correction coefficient $K_{o2}$ determined at the step 218 or 220 is carried out. Specifically, it is checked whether or not the value of the correction coefficient $K_{o2}$ lies within a predetermined range. If the former does not lie within the latter, the $K_{o2}$ value is set to an upper limit value or a lower limit value defining the predetermined range. Lastly, an average value $K_{REF}$ of the correction coefficient $K_{o2}$ is calculated at a step 222, followed by terminating the program.

Next, the integral control executed at the steps 223 et seq. will be explained. First, at the step 223, it is determined whether or not the output voltage $FV_{o2}$ from the upstream $O_2$ sensor FS is lower than the reference value $V_{REF}$. If the answer is affirmative (YES), i.e. if $FV_{o2} < V_{REF}$ holds, a value of 2 is added to a count number $N_{IL}$ at a step 224 whenever the present step 223 is executed, followed by determining at a step 225 whether or not the count number $N_{IL}$ has reached a predetermined value $N_I$. If the answer is negative (NO), the correction coefficient $K_{o2}$ is held at the immediately preceding value at a step 226, whereas if the answer is affirmative (YES), the correction value $\Delta K_R$ is added to the correction coefficient $K_{o2}$ at a step 227, the count number $N_{IL}$ is reset to 0 at a step 228, and the correction value $\Delta K_R$ is added to the correction coefficient $K_{o2}$ whenever the $N_{IL}$ value reaches the value $N_I$. Thus, so long as the output voltage $FV_{o2}$ from the upstream $O_2$ sensor FS is lower than the reference value $V_{REF}$, i.e. so long as the air-fuel ratio continues to be leaner than the stoichiometric ratio, the correction coefficient is increased by the predetermined value $\Delta K_R$ whenever the count number $N_{IL}$ reaches the predetermined value $N_I$, so that the air-fuel ratio is controlled toward a richer value.

On the other hand, if the answer to the question of the step 223 is negative (NO), i.e. if $FV_{o2} \geq V_{REF}$ holds, 2 is added to the count number $N_{IL}$ whenever the present step 223 is executed, at a step 229, and it is determined at a step 230 whether or not the count number $N_{IH}$ has reached the predetermined value $N_I$. If the answer is negative (NO), the step 226 is executed to hold the correction coefficient $K_{o2}$ at the immediately preceding value, whereas if the answer is affirmative (YES), the correction term $\Delta K_L$ is subtracted from the correction coefficient $K_{o2}$ at a step 231, and the count number $N_{IH}$ is reset to 0 at a step 232, and thereafter, whenever the count number $N_{IH}$ reaches the predetermined value $N_I$, the predetermined value $K_L$ is subtracted from the correction coefficient $K_{o2}$.

In this way, so long as the output voltage $FV_{o2}$ from the upstream $O_2$ sensor FS is higher than the reference value $V_{REF}$, i.e. so long as the air-fuel ratio continues to be richer than the stoichiometric air-fuel ratio, the correction coefficient $K_{o2}$ is decreased by the predetermined value $\Delta K_L$ whenever the count number $N_{IH}$ reaches the predetermined value $N_I$, so that the air-fuel ratio is controlled toward a leaner value.

Figure 16:
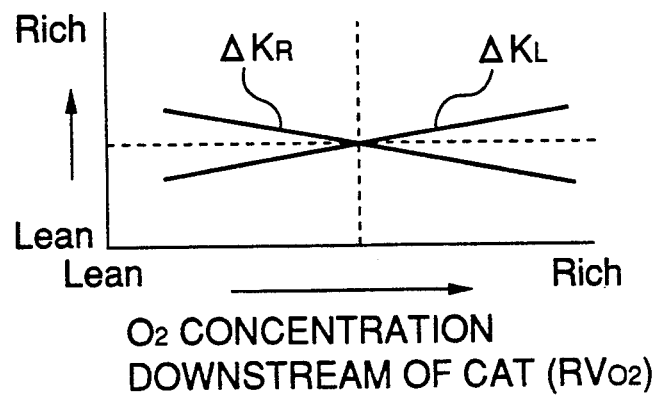
FIG. 16 is a graph showing the relationship between the $O_2$ sensor output $RV_{o2}$ and correction terms $\Delta K_R$, $\Delta K_L$.

The correction terms $\Delta K_L$, $\Delta K_R$ are determined based upon the output voltage $R_{vo2}$ from the downstream $O_2$ sensor RS, as shown in FIG. 16. More specifically, the correction term $\Delta K_R$ serves to stepwise increase the correction coefficient $K_{o2}$ upon inversion of the output voltage $FV_{o2}$ from the upstream $O_2$ sensor FS from the richer side to the leaner side with respect to the stoichiometric ratio to thereby shift the air-fuel ratio to the richer side. The value of the correction term $\Delta K_R$ is set based upon the output voltage $RV_{o2}$ from the downstream $O_2$ sensor RS such that as the degree to which the output voltage $R_{vo2}$ deviates toward the richer side is greater, it is set to a smaller value, whereas as the degree to which the output voltage $R_{vo2}$ deviates toward the leaner side is greater, it is set to a greater value. The correction term $\Delta K_L$ serves to stepwise decrease the correction coefficient $K_{o2}$ upon inversion of the output voltage $FV_{o2}$ of the upstream $O_2$ sensor FS from the leaner side to the richer side with respect to the stoichiometric air-fuel ratio. The value of the correction term $\Delta K_L$ is set based upon the output voltage $RV_{o2}$ from the downstream $O_2$ sensor RS such that as the degree to which the output voltage $RV_{o2}$ deviates toward the richer side is greater, it is set to a greater value, whereas as the degree to which the output voltage $RV_{o2}$ deviates toward the leaner side is greater, it is set to a smaller value. Thus, the integral control of the correction coefficient $K_{o2}$ is effected in a fine manner based upon both the output voltages $FV_{o2}$, $RV_{o2}$ from the upstream and downstream $O_2$ sensors FS, RS (see ordinary F/B control mode in FIGS. 13 and 14).

Next, the manner of monitoring deterioration of the catalyst C will be explained.

As mentioned before, when monitoring of the catalyist is not permitted at the step 108 in the program of FIG. 2, the feedback control is carried out by the first air-fuel ratio control means, based upon the output voltages $FV_{o2}$, $RV_{o2}$ from the upstream and downstream $O_2$ sensors FS, RS, as described hereinabove with reference to FIGS. 4 and 5. On the other hand, when the catalyst monitoring is permitted at the step 108 in FIG. 2, the monitoring of the catalyst C is carried out at the step 109. Details of the catalyst monitoring will now be described with reference to FIGS. 6 to 12.

The catalyst monitoring is carried out by the second air-fuel ratio control means. While the feedback control carried out by the first air-fuel ratio control means is based upon both the output voltages $FV_{o2}$, $RV_{o2}$ from the upstream and downstream $O_2$ sensors FS, RS, the feedback control carried out by the second air-fuel ratio control means is based upon the output voltage $R_{vo2}$ from the downstream $O_2$ sensor RS alone. In this feedback control, a time period TL is measured, which elapses from the time of generation of a special P term $P_{LSP}$ for skipping the correction coefficient $K_{o2}$ from the richer side to the leaner side with respect to the stoichiometric ratio to the time of occurrence of an inversion in the oxygen concentration from the richer side to the leaner side, and a time period $T_R$ is also measured, which elapses from the time of generation of a special P term $P_{RSP}$ for skipping the correction coefficient $K_{o2}$ from the leaner side to the richer side with respect to the stoichiometric ratio to the time of occurrence of an inversion in the oxygen concentration from the leaner side to the richer side. Deterioration of the catalyst C is determined based upon the time periods TL, TR.

First, the outline of the catalyst monitoring will be described with reference to FIG. 6, followed by description of subroutines of some steps of the figure.

Figure 6:
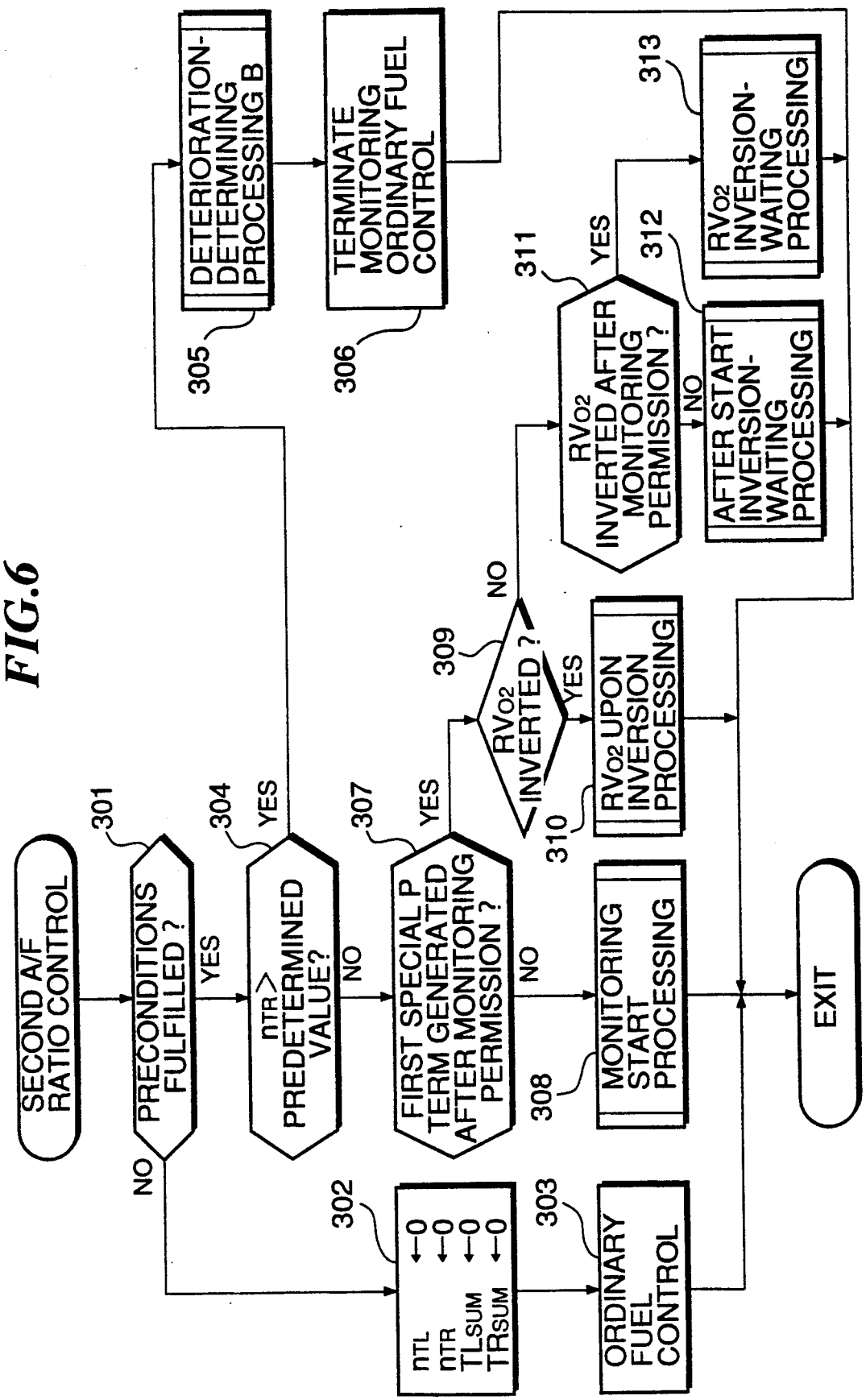
FIG. 6 is a flowchart of a program executed by second air-fuel ratio control means.

In FIG. 6, first, it is determined at a step 301 whether or not preconditions for detecting deterioration of the catalyst C have been fulfilled. If the answer is negative (NO), at a step 302 various control parameter values are set to zero, i.e. nTL (a total number of times of measurement of TL), nTR (a total number of times of measurement of TR), $T_{LSUM}$ (the sum of TL values obtained by a plurality of times of measurements of TL), and $TR_{SUM}$ (the sum of TR values obtained by a plurality of times of measurements of TR) Then, at step 303, the aforedescribed ordinary feedback control is carried out by the first air-fuel ratio control means. When the monitoring preconditions become dissatisfied during execution of the catalyst monitoring, the ordinary feedback control is started by using the average value $K_{REF}$ as the initial values of the correction coefficient $K_{o2}$.

If the answer to the question of the step 301 is affirmative (YES), i.e. if the catalyst monitoring preconditions are fulfilled, it is determined at a step 304 whether or not the $T_R$ measurement time number nTR exceeds a predetermined value. If the answer to the question of the step 304 is affirmative (YES), i.e. if data required for the determination of deterioration of the catalyst C have been prepared, a deterioration-determining processing B is executed at a step 305, and then at a step 306, the monitoring is terminated, followed by resuming the ordinary feedback control. Also in this case, the average value $K_{REF}$ is used as the initial value of the correction coefficient $K_{o2}$.

If the answer to the question of the step 304 is negative (NO), i.e. if the above data have not yet been prepared, steps 307-313 are executed. More specifically, first, it is determined at the step 307 whether or not the first special P term $P_{LSP}$ or $P_{RSP}$ has been generated after the permission of the monitoring. When the monitoring has not yet been started, the answer should be negative (NO), and then a monitoring start processing is executed at the step 308. On the other hand, if the answer to the question of the step 307 is affirmative (YES), i.e. if the first special P term $P_{LSP}$ or $P_{RSP}$ has been generated, it is determined at the step 309 whether or not the output voltage $RV_{o2}$ from the downstream $O_2$ sensor RS has been inverted. If the answer to the question of the step 309 is affirmative (YES), processings required upon inversion of the output voltage $RV_{o2}$ are executed at the step 310, which include incrementing of the TL measurement time number nTL or of the TR measurement time number nTR, starting of a lean delay timer tLD (which measures a time period elapsed from the time of inversion of $RV_{o2}$ to the time of generation of the special P term $P_{LSP}$) or a rich delay timer tRD ( which measures a time period elapsed from the time of inversion of $RV_{o2}$ to the time of generation of the special P term $P_{RSP}$), and generation of the special P term $P_{LSP}$ or $P_{RSP}$.

On the other hand, if the answer to the question of the step 309 is negative (NO), it is determined at a step 311 whether or not the output voltage $RV_{o2}$ from the downstream $O_2$ sensor RS has been inverted at least one time after the permission of the monitoring. If the answer is negative (NO), i.e. if no inversion of the output voltage $RV_{o2}$ has occurred after the permission of the monitoring, an after-start inversion-waiting processing is executed at the step 312, whereas if the answer to the question of the step 311 is affirmative (YES), i.e. if at least one inversion of the output voltage $RV_{o2}$ has occurred after the permission of the monitoring, an $RV_{o2}$ inversion-waiting processing is executed at the step 313. In the steps 312, 313, addition of a special I term $I_{LSP}$ or subtraction of a special I term $I_{RSP}$ to or from the correction coefficient $K_{o2}$ is carried out. However, in the step 313, measurement of the time periods TL, TR is effected, whereas in the step 312 such measurement is not effected. This is because the waiting time period before inversion of the output voltage $RV_{o2}$ after the start depends on upon the timing of permission of the monitoring, making it unnecessary to measure the time periods TL, TR.

Next, the subroutines executed at the steps 301, 308, 312, 313, 310 and 305 in FIG. 6 will be explained in detail.

Figure 7:
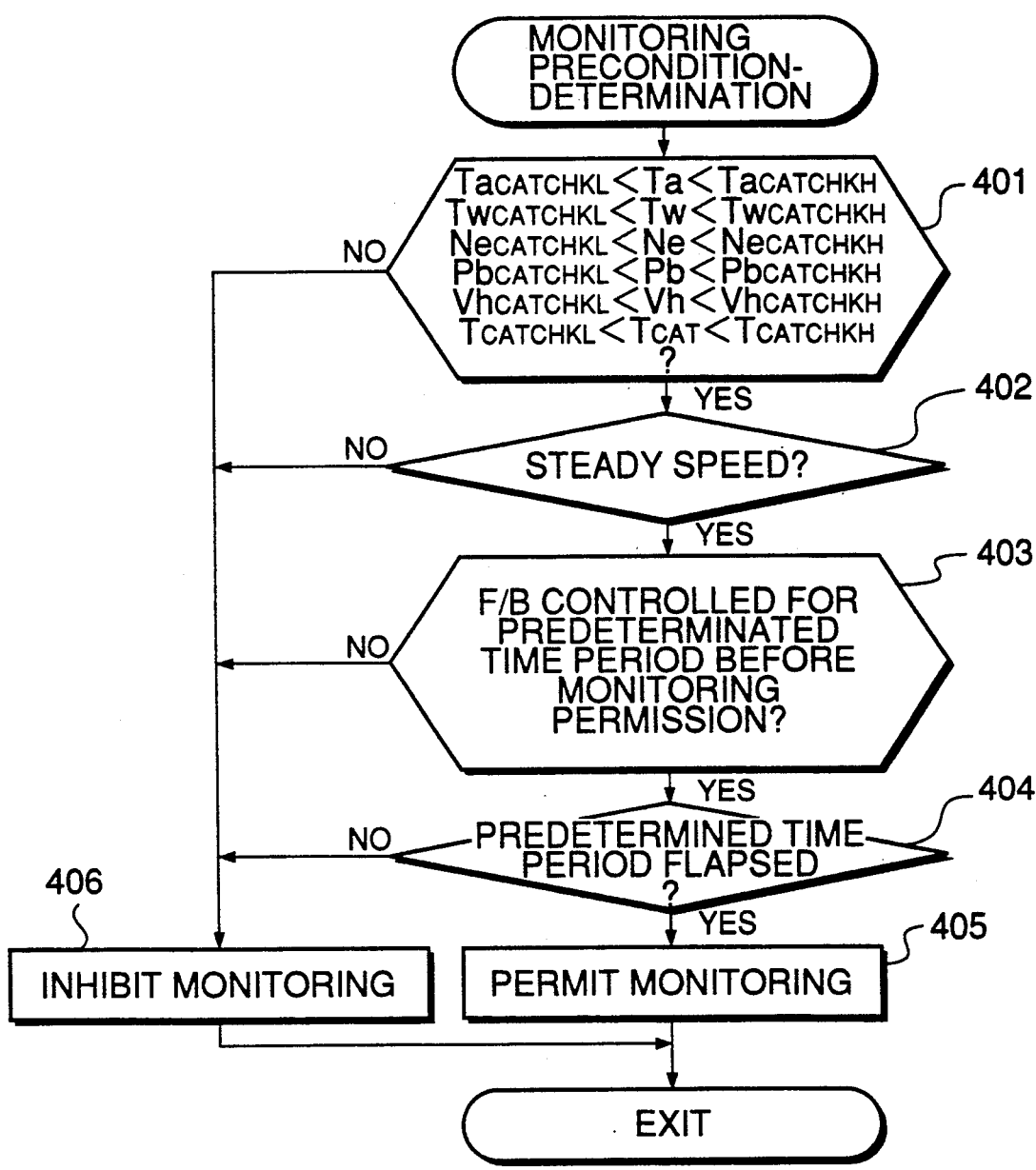
FIG. 7 is a flowchart of a subroutine for determining fulfillment of catalyst determination-monitoring conditions, which is executed at a step 301 in FIG. 6.

FIG. 7 shows details of the subroutine executed at the step 301 in FIG. 6 (monitoring precondition-determining subroutine). First, at a step 401, it is determined whether or not the engine E is in a condition suitable for effecting the monitoring. More specifically, determinations are made as to whether or not the intake air temperature Ta detected by the intake air temperature sensor 8 lies within a predetermined range of 60° C. to 100° C., whether or not the coolant temperature Tw detected by the coolant temperature sensor 9 lies within a predetermined range of 60° C. to 100° C., whether or not the engine rotational speed Ne detected by the engine rotational speed sensor 10 lies within a predetermined range of 2800 rpm to 3200 rpm, whether or not the intake pipe absolute pressure Pb detected by the intake pipe absolute pressure sensor 7 lies within a predetermined range of −350 mmHg to −250 mmHg, whether or not the vehicle speed Vh detected by the vehicle speed sensor 11 lies within a predetermined range of 32 km/h to 80 km/h, and whether or not the catalyst temperature $T_{CAT}$ detected by the catalyst temperature sensor 13 lies within a predetermined range of 400° C. to 800° C. Then, at a step 402, it is determined whether or not the vehicle speed is in a steady state, i.e. whether or not the variation in the vehicle speed Vh has continually been below 0.8 km/sec. over a predetermined time period (e.g. 2 seconds). Then, at a step 403, it is determined whether or not feedback control was effected over a predetermined time period (e.g. 10 seconds) before the permission of the monitoring. Further, at a step 404, it is determined whether or not a predetermined time period (e.g. 2 seconds) has elapsed after the answer to the question of the step 403 became affirmative (YES).

When all the answers to the questions of the steps 401 to 404 are affirmative (YES), it is judged at a step 405 that the catalyst monitoring is permissible, and then the program proceeds to the step 304 in FIG. 6, whereas if any of the answers is negative (NO), it is judged at a step 406 that the catalyst monitoring is not permitted, followed by the program proceeding to the step 302 in FIG. 6.

Figure 8:
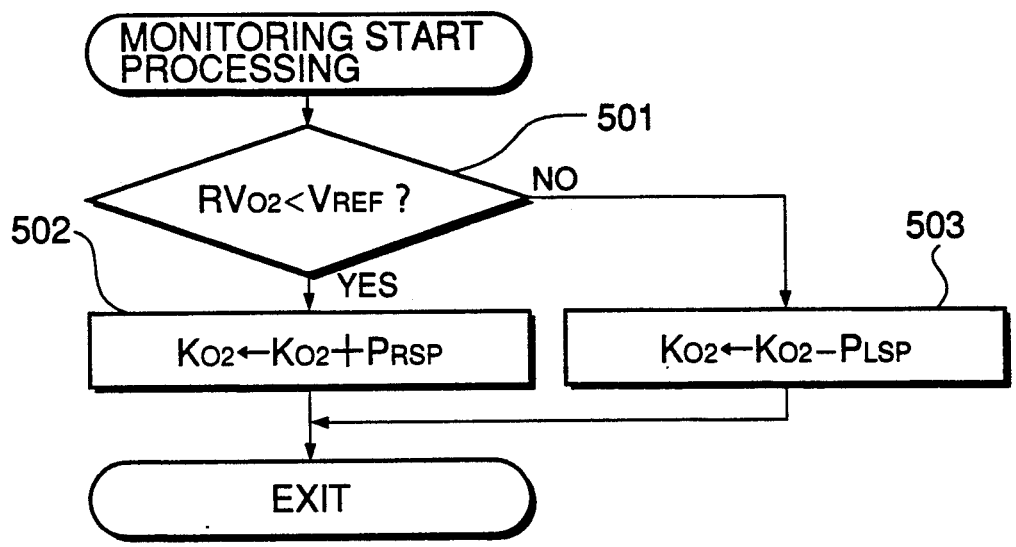
FIG. 8 is a flowchart of a subroutine for carrying out a monitoring start processing executed at a step 308 in FIG. 6.

FIG. 8 shows the details of subroutine executed at the step 308 in FIG. 6 (monitoring-starting subroutine). First, at a step 501, the output voltage $RV_{o2}$ from the downstream $O_2$ sensor RS is compared with the reference value $V_{REF}$. If $RV_{o2} < V_{REF}$ holds, i.e. if the oxygen concentration detected by the downstream $O_2$ sensor RS has a value on the lean side, proportional control is carried out at a step 502 in such a manner that the special P term $P_{RSP}$ is added to the immediately preceding value of the correction coefficient $K_{o2}$, to thereby stepwise change the air-fuel ratio to the richer side. On the other hand, if the answer to the question of the step 501 is negative (NO), i.e. if the output voltage $RV_{o2}$ is higher than the reference value $V_{REF}$, which means that the oxygen concentration has a value on the rich side, proportional control is carried out at a step 503 in such a manner that the special P term $P_{LSP}$ is subtracted from the immediately preceding value of the correction coefficient $K_{o2}$ to thereby stepwise change the air-fuel ratio to the leaner side.

Figure 9:
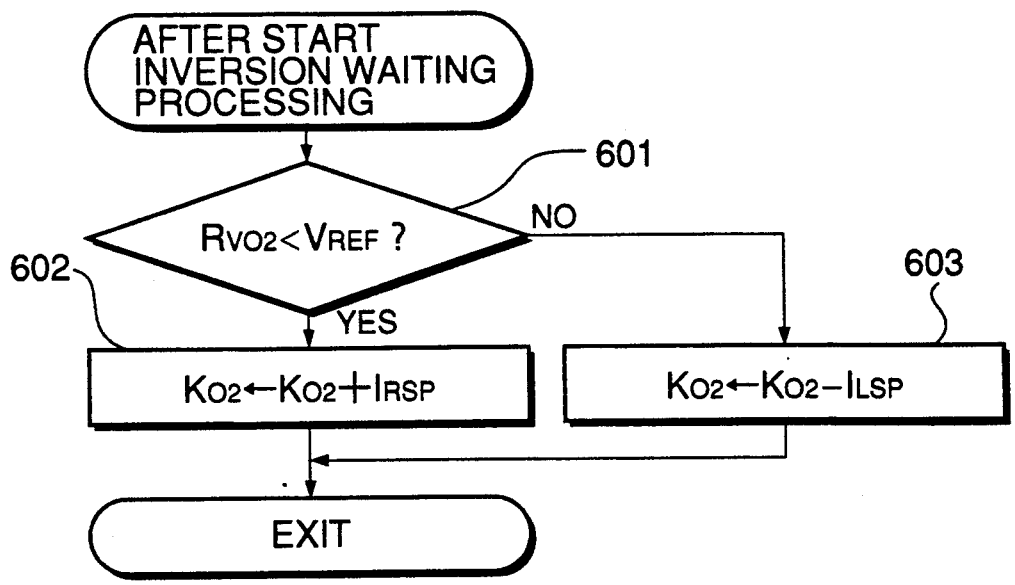
FIG. 9 is a flowchart of a subroutine for carrying out an after-start inversion-waiting processing executed at a step 312 in FIG. 6.

FIG. 9 shows details of the subroutine executed at the step 312 in FIG. 6 (after-start inversion-waiting processing). This subroutine is executed following the subroutine in FIG. 8 (monitoring start processing), hereinbefore described. First, at a step 601, the output voltage $RV_{o2}$ from the downstream $O_2$ sensor RS is compared with the reference voltage $V_{REF}$. If the answer is affirmative (YES), indicating that the output voltage $RV_{o2}$ is lower than the reference value $V_{REF}$, that is, if the oxygen concentration detected by the downstream $O_2$ sensor RS has a value on the leaner side, integral control is carried out at a step 602 in such a manner that the special I term $I_{RSP}$ is added to the immediately preceding value of the correction coefficient $K_{o2}$, to thereby stepwise change the air-fuel ratio toward the richer side. On the other hand, if the answer to the question of the step 601 is negative (NO), i.e., if the output voltage $RV_{o2}$ is higher than the reference voltage $V_{REF}$, indicating that the oxygen concentration detected by the downstream $O_2$ sensor RS has a value on the richer side, integral control is carried out at a step 603 in such a manner that the special I term $I_{LSP}$ is subtracted from the immediately preceding value of the correction coefficient $K_{o2}$.

Figure 10:
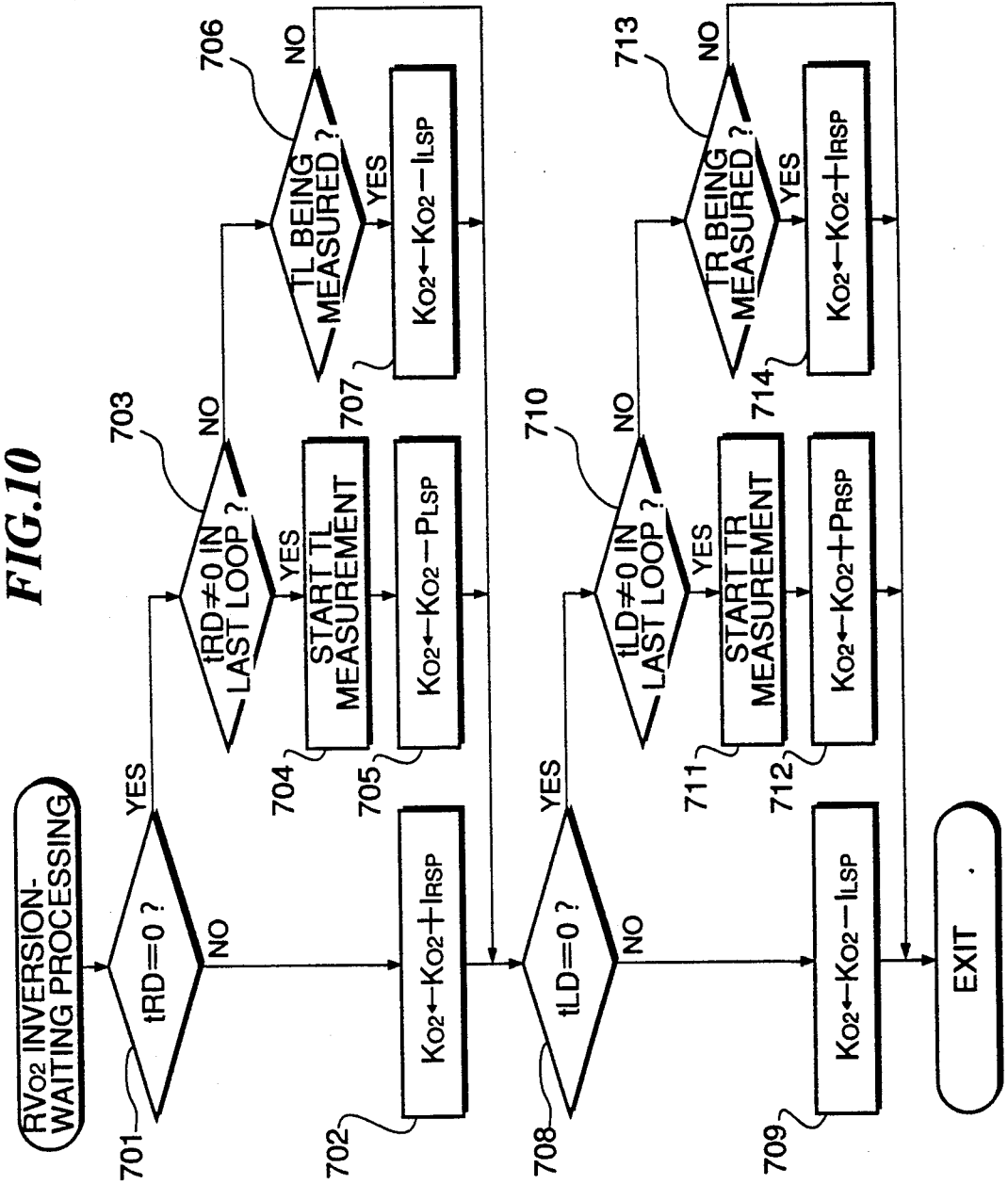
FIG. 10 is a flowchart of a subroutine for carrying out an $RV_{o2}$ inversion-waiting processing executed at a step 313 in FIG. 6.

FIG. 10 shows details of the subroutine executed by the step 313 in FIG. 6 (downstream $O_2$ sensor output inversion-waiting processing). This subroutine is executed on condition that the output voltage $RV_{o2}$ from the downstream $O_2$ sensor RS has been inverted. First, at a step 701, it is determined whether or not the rich delay timer $t_{RD}$ has completed counting. The rich delay timer $t_{RD}$ is formed by a subtraction counter, and is adapted to start counting down at the moment the output $RV_{o2}$ from the downstream $O_2$ sensor RS has been inverted from the leaner side to the richer side with respect to the stoichiometric air-fuel ratio, and when a predetermined time period elapses, its count value becomes to zero. If the answer to the question of the step 701 is negative (NO), i.e. if the count value of the rich delay timer $t_{RD}$ is not zero, that is, if the rich delay timer tRD is still counting down, integral control is carried out at a step 702 in such a manner that the special I term $I_{RSP}$ is added to the immediately preceding value of the correction coefficient $KO_2$, to thereby stepwise change the air-fuel ratio toward the richer side.

On the other hand, if the answer to the question of the step 701 is affirmative (YES), it is determined at a step 703 whether or not the count value of the rich delay timer $t_{RD}$ was zero in the last loop. If the answer is affirmative (YES), i.e. if the count value of the rich delay timer $t_{RD}$ has first become zero in the present loop, measurement of the time period TL is started at a step 704, and proportional control is carried out at a step 705 in such a manner that the special P term $P_{LSP}$ is subtracted from the correction coefficient $K_{o2}$, to thereby stepwise change the air-fuel ratio to the leaner side. If the answer to the question of the step 703 is negative (NO), i.e. if the count value of the rich delay timer $t_{RD}$ continues to be zero, it is further determined at a step 706 whether or not the time period TL is still being measured. If the answer is affirmative (YES), integral control is carried out at a step 707 in such a manner that the special I term $I_{LSP}$ is subtracted from the correction coefficient $K_{o2}$, to thereby stepwise change the air-fuel ratio toward the leaner side.

Then, it is determined at a step 708 whether or not the count value of the lean delay timer $t_{LD}$ is zero. If the answer is negative (NO), i.e. if the lean delay timer $t_{LD}$ is still counting down, integral control is carried out at a step 709 in such a manner that the special I term $I_{LSP}$ is subtracted from the immediately preceding value of the correction coefficient $K_{o2}$, to thereby stepwise change the air-fuel ratio toward the leaner side.

On the other hand, if the answer to the question of the step 708 is affirmative (YES), it is determined at a step 710 whether or not the count value of the lean delay timer $t_{LD}$ was zero in the last loop. If the answer is affirmative (YES), i.e. if the count value of the lean delay timer $t_{LD}$ has first become zero in the present loop, measurement of the time period TR is started at a step 711, and proportional control is carried out at a step 712 in such a manner that the special P term $P_{RSP}$ is added to the correction coefficient $K_{o2}$, to thereby stepwise change the air-fuel ratio to the richer side. If the answer to the step 710 is negative (NO), i.e. if the count value of the lean delay timer $t_{LD}$ continues to be zero, it is further determined at a step 713 whether or not the measurement of the time period $T_R$ is still continued. If the answer is affirmative (YES), integral control is carried out at a step 714 in such a manner that the special I term $I_{RSP}$ is added to the correction coefficient $K_{o2}$, to thereby stepwise change the air-fuel ratio toward the richer side.

Figure 11:
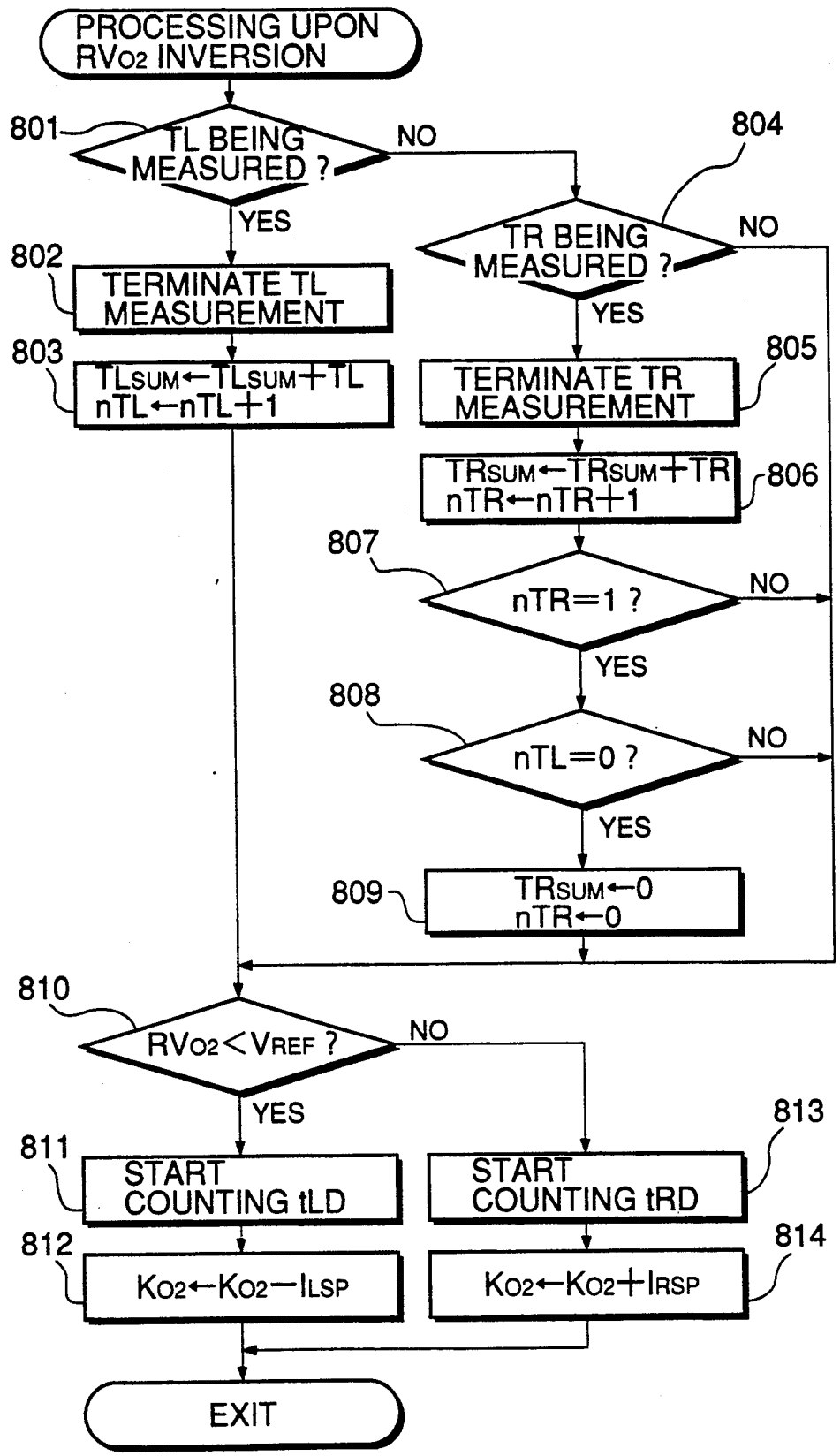
FIG. 11 is a flowchart of a subroutine for carrying out a processing executed upon $RV_{o2}$ inversion at a step 310 in FIG. 6.

FIG. 11 shows details of the subroutine executed at the step 310 in FIG. 6 (processing effected upon inversion of the downstream $O_2$ sensor output). This subroutine is executed upon inversion of the output $RV_{o2}$ from the downstream $O_2$ sensor RS. First, it is determined at a step 801 whether or not measurement of the time period TL was being effected in the last loop. If the answer is affirmative (YES), the measurement of the time period TL is stopped at a step 802, and the value of the time period TL measured in the present loop is added to the TL value sum $TL_{SUM}$, followed by incrementing the TL measurement time number $n_{TL}$.

On the other hand, if the answer to the question of the step 801 is negative (NO), i.e. if the measurement of the time period TL was not being effective in the last loop, it is determined at a step 804 whether or not measurement of the time period TR was being effected in the last loop. If the answer is affirmative (YES), the measurement of the time period TR is stopped at a step 805, and the value of the time period TR measured in the present loop is added to the TR value sum $TR_{SUM}$, followed by incrementing the TR measurement time number $n_{TR}$.

And, if it is determined, respectively, at steps 807 and 808 the value $n_{TR}$ is equal to 1 and at the same time the $n_{TL}$ is equal to 0, the value $TR_{SUM}$ is set to 0 at a step 809. This is to ensure that the measurements of the time periods TL, TR are effected in the order of TL and TR. That is, if the time period is measured before the time period TL, the measured value TR is canceled.

Then, at a step 810 the output voltage $RV_{o2}$ from the downstream $O_2$ sensor RS is compared with the reference value $V_{REF}$. If $RV_{o2} < V_{REF}$ holds, counting-down of the lean delay timer $t_{LD}$ is started at a step 811, and integral control is carried out at a step 812 in such a manner that the special I term $I_{LSP}$ is subtracted from the immediately preceding value of the correction coefficient $K_{o2}$, to thereby stepwise change the air-fuel ratio toward the leaner side.

On the other hand, if the answer of the question of the step 810 is negative (NO), i.e. if $RV_{o2} \geq V_{REF}$, counting-down of the rich delay timer $t_{RD}$ is started at a step 813, and integral control is carried out at a step 814 in such a manner that the special I term $I_{RSP}$ is added to the immediately preceding value of the correction coefficient $K_{o2}$, to thereby stepwise change the air-fuel ratio toward the richer side.

Figure 12:
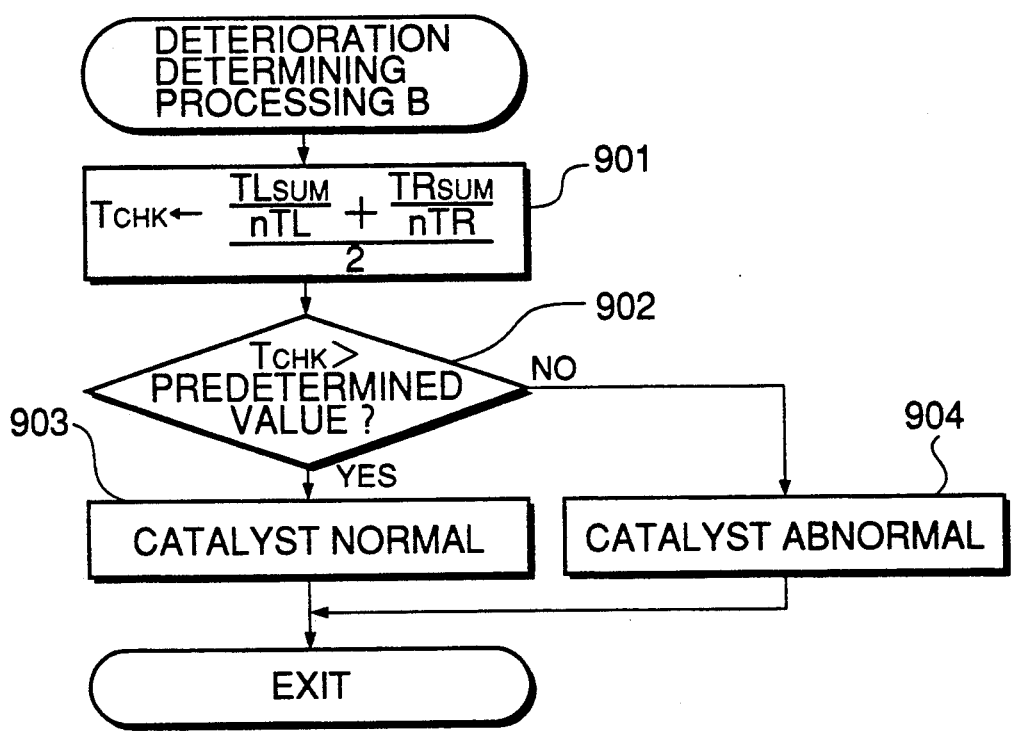
FIG. 12 is a flowchart of a subroutine for carrying out a deterioration-determining processing B executed at a step 305 in FIG. 6.

FIG. 12 shows details of the subroutine executed at the step 305 in FIG. 6 (deterioration-determining processing B). This subroutine is executed when the TR measurement time number $n_{TR}$ exceeds a predetermined value. First, at a step 901 an average value of a value ($TL_{SUM}/n_{TL}$) obtained by dividing the TL value sum by the TL measurement time number $n_{TR}$ and a value ($TR_{SUM}/n_{TR}$) obtained by dividing the TR value sum by the TR measurement time number $n_{TR}$ is calculated to obtain a time period $T_{CHK}$.

Then, at a step 902 it is determined whether the time period $T_{CHK}$ is greater than a predetermined value. If the answer is affirmative (YES), it is judged that the $O_2$ storage capacity of the catalyst C exceeds a reference value. Therefore, at a step 903 it is judged that the exhaust gas purifying system is normal. On the other hand, if the answer to the question of the step 902 is negative (NO), it is judged that the $O_2$ storage capacity of the catalyst C is below the reference value, and then at a step 904 it is judged that the exhaust gas purifying system is abnormal.

The operation of the monitoring of the deterioration of the catalyst C will be further explained with reference to the timing charts of FIGS. 13 and 14.

Figure 13:
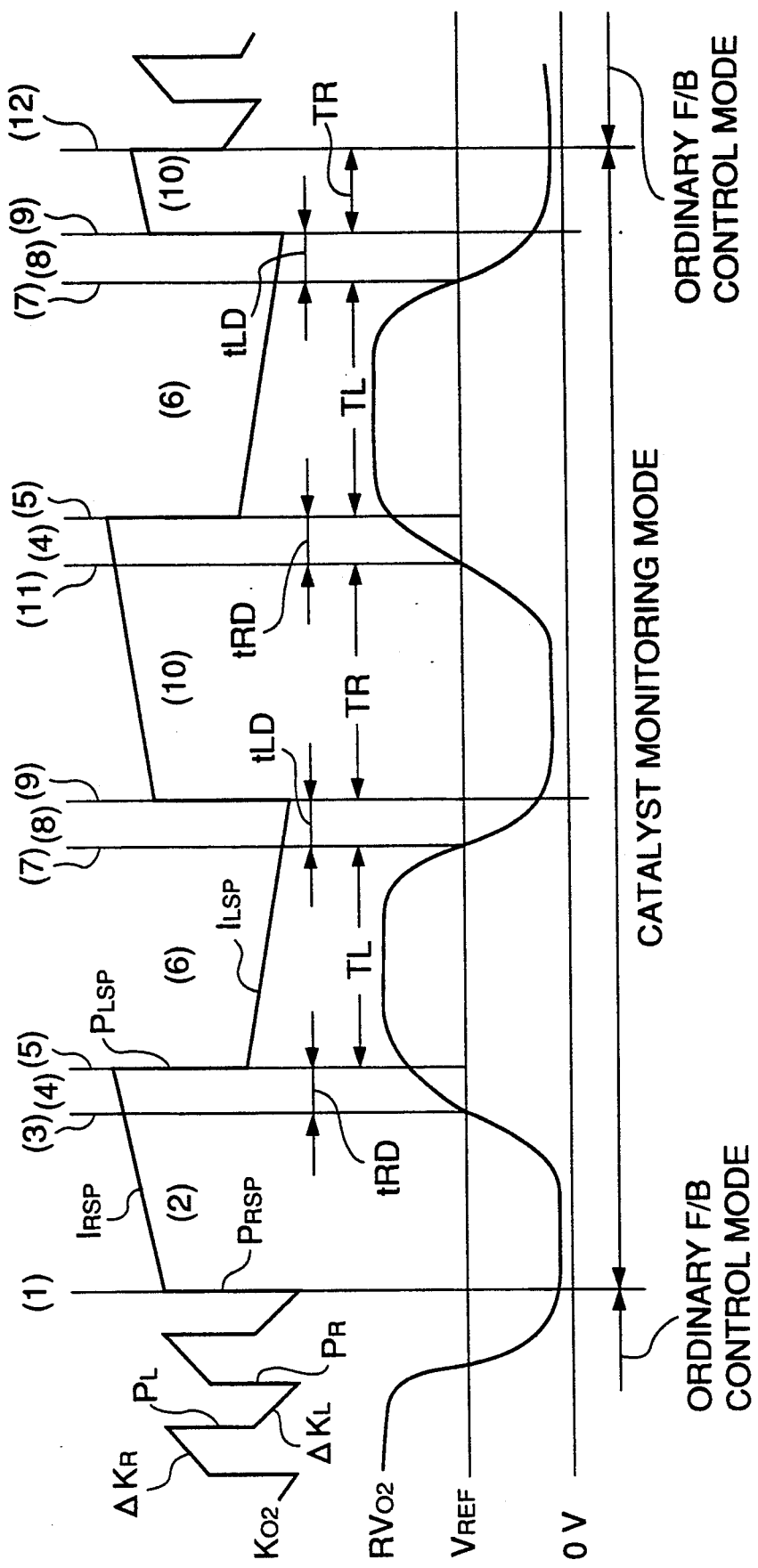
FIGS. 13a and 13b are timing charts showing changes in the correction coefficient $KO_2$ with the lapse of time.

When the engine E enters a condition satisfying the aforementioned preconditions at a time point (1) in FIG. 13, changeover is made from the first air-fuel ratio control means to the second air-fuel ratio control means to start the monitoring of the catalyst C. If on this occasion the output voltage $RV_{o2}$ from the downstream $O_2$ sensor RS is below the reference value $V_{REF}$ (lean state), as illustrated in FIG. 13, the special P term $P_{RSP}$ is applied to stepwise increase the air-fuel ratio correction coefficient $K_{o2}$, and then the special I term $I_{RSP}$ is applied to stepwise increase the correction coefficient $K_{o2}$ in regions (2) and (4). If at a time point (3) between the regions (2) and (4), the output voltage $RV_{o2}$ from the downstream $O_2$ sensor RS is inverted from the leaner side to the richer side with respect to the stoichiometric air-fuel ratio, the rich delay timer $t_{RD}$ is set to start counting-down. When the rich delay timer $t_{RD}$ completes counting-down at a time point (5), the special P term $P_{LSP}$ is applied to stepwise decrease the correction coefficient $K_{o2}$, and then the special I term $I_{LSP}$ is applied in regions (6) and (8) to stepwise decrease the correction coefficient $K_{o2}$. When the rich delay timer $t_{LD}$ finishes counting-down at the time point (5), measurement of the time period TL is started. The measurement of the time period TL is completed when the output voltage $RV_{o2}$ is inverted from the richer side to the leaner side with respect to the stoichiometric air-fuel ratio at a time point (7). Similarly, when the lean delay timer $t_{LD}$ completes counting-down at a time point (9), measurement of the time period TR is started, and this measurement is completed when the output voltage $RV_{o2}$ is inverted from the leaner side to the richer side with respect to the stoichiometric air-fuel ratio at a time point (11). In the region (2), no measurement of the time period TR is effected, since the lean delay timer $t_{LD}$ has not been operating before the region (2).

Figure 14:
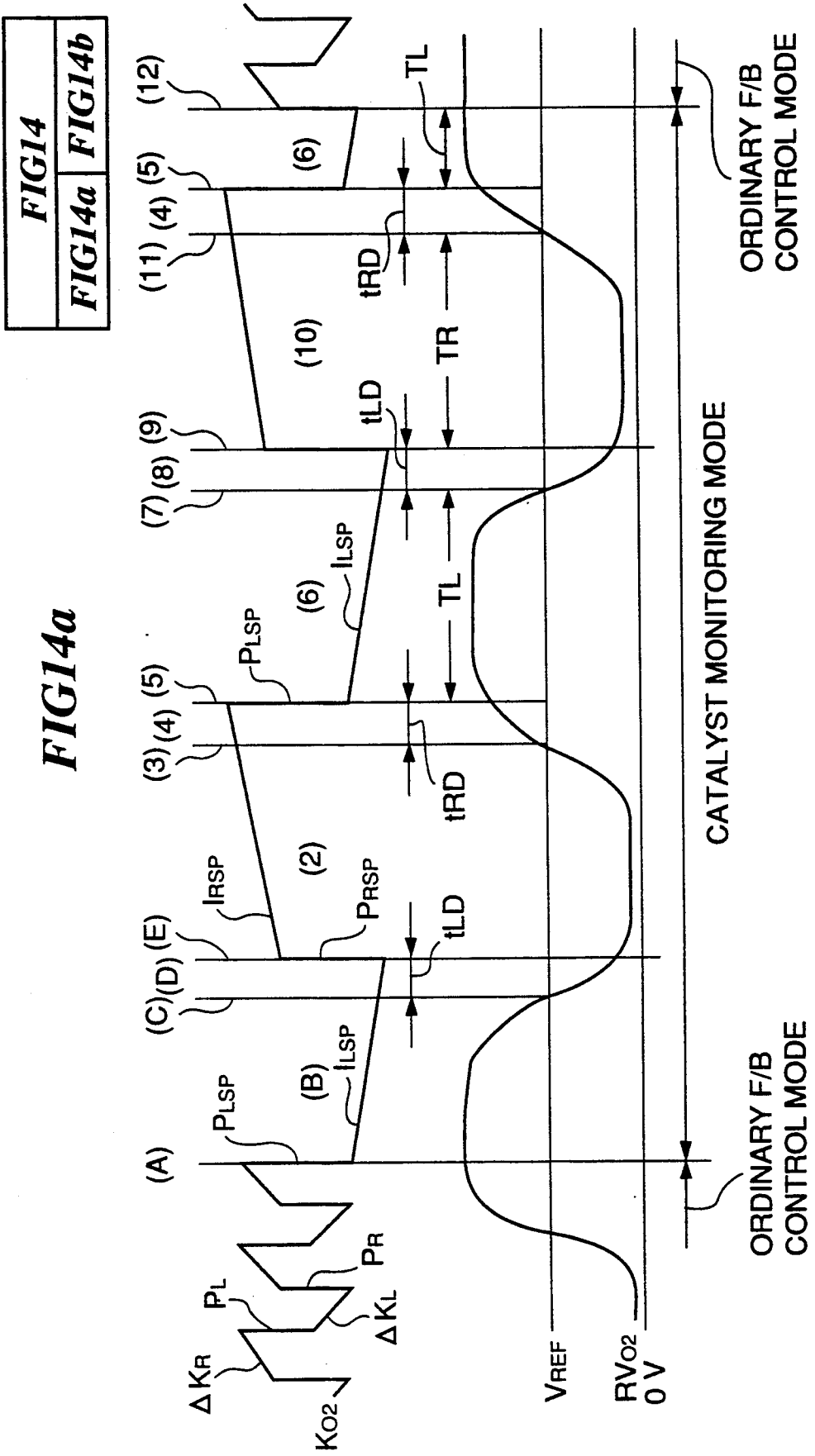
FIGS. 14a and 14b are timing charts showing another example of changes in the correction coefficient $KO_2$.

The timing chart of FIG. 14 shows a case where the monitoring of the catalyst C is started when the output voltage $RV_{o2}$ from the downstream $O_2$ sensor RS is above the reference value $V_{REF}$. In this example, no measurement of the time period TR is effected in the region (2), because it is so programmed that the first time period measurement is started with measurement of the time period TL (see the steps 807 to 809 in FIG. 11). Except for the above, the timing chart of FIG. 14 is substantially identical with the timing chart of FIG. 13 described above.

The time period TL measured as above corresponds to a time lag from the moment the correction coefficient $K_{o2}$ is stepwise decreased by the special p term $P_{RSP}$ to the time the output voltage $RVO2$ from the downstream $O_2$ sensor RS is actually inverted from the richer side to the leaner side with respect to the stoichiometric air-fuel ratio. The time period TR measured as above corresponds to a time lag from the moment the correction coefficient $K_{o2}$ is stepwise increased by the special P term $P_{RSP}$ to change the air-fuel ratio to the richer side to the time the output voltage $RV_{o2}$ from the downstream $O_2$ sensor RS is actually inverted from the leaner side to the richer side with respect to the stoichiometric air-fuel ratio.

In this connection, the catalyst C has the action of taking in oxide gas components ($O_2$ and $NO_x$) in the exhaust gases when the air-fuel ratio changes to the leaner side. When the oxide gas components (i.e. $O_2$ and $NO_x$) have been taken in, the output voltage $RV_{o2}$ from the downstream $O_2$ sensor RS changes from the richer side to the leaner side with respect to the stoichiometric air-fuel ratio. Further, the catalyst C has the action of taking in reduced gas components (CO and HC) in the exhaust gases when the air-fuel ratio changes to the richer side, where the CO and HC react with the $O_2$ and $NO_x$ already taken in. When CO and HC have been taken in, the output voltage $RV_{o2}$ from the downstream $O_2$ sensor RS changes from the leaner side to the richer side with respect to the stoichiometric air-fuel ratio. Therefore, the values of the time periods TL, TR are proportional to the $O_2$ storage capacity of the catalyst C. Therefore, the values of the time periods TL, TR can be used as a parameter for determining deterioration of the catalyst C.

Further, the time period TL which corresponds to a time period within which $O_2$ and $NO_x$ in the exhaust gases can be completely taken in by the catalyst C and the time period TR which corresponds to a time period within which $O_2$ and $NO_x$ taken in can completely react with the CO and HC subsequently taken in are closely related to each other. Therefore, by determining the $O_2$ storage capacity of the catalyst C by the use of a combination of the first measured time period TL and the time period TR measured following the measurement of the time period TL, and the average value $T_{CHK}$ of the TL and TR values, determination of deterioration of the catalyst C can be effected with very high accuracy.

Since the heat of exhaust gases and various noxious components contained in the exhaust gases are absorbed by the catalyst C, the downstream $O_2$ sensor RS is less affected by the exhaust gases than the upstream $O_2$ sensor FS. As a result, the downstream $O_2$ sensor RS shows a more stable output characteristic than the upstream $O_2$ sensor FS. The second air-fuel ratio control means according to the invention, which effects determination of deterioration of the catalyst C, relies solely upon the output voltage $RV_{o2}$ from the downstream $O_2$ sensor RS whose output characteristic is stable, thereby being able to determine deterioration of the catalyst C with high accuracy.

As the time period for determining deterioration of catalyst C, only one of the time periods TL, TR may be used, instead of using the average value of the time periods TL, TR. Further, another combination of the time periods TL, TR (e.g. the sum of the time periods TL, TR) may be used.

Next, a second embodiment of the invention will be described.

The second embodiment is characterized by effecting another deterioration-determining processing A in addition to the deterioration-determining processing B executed at the step 305 in FIG. 6 of the first embodiment described before. Except for this, the second embodiment is identical with the first embodiment.

Figure 17:
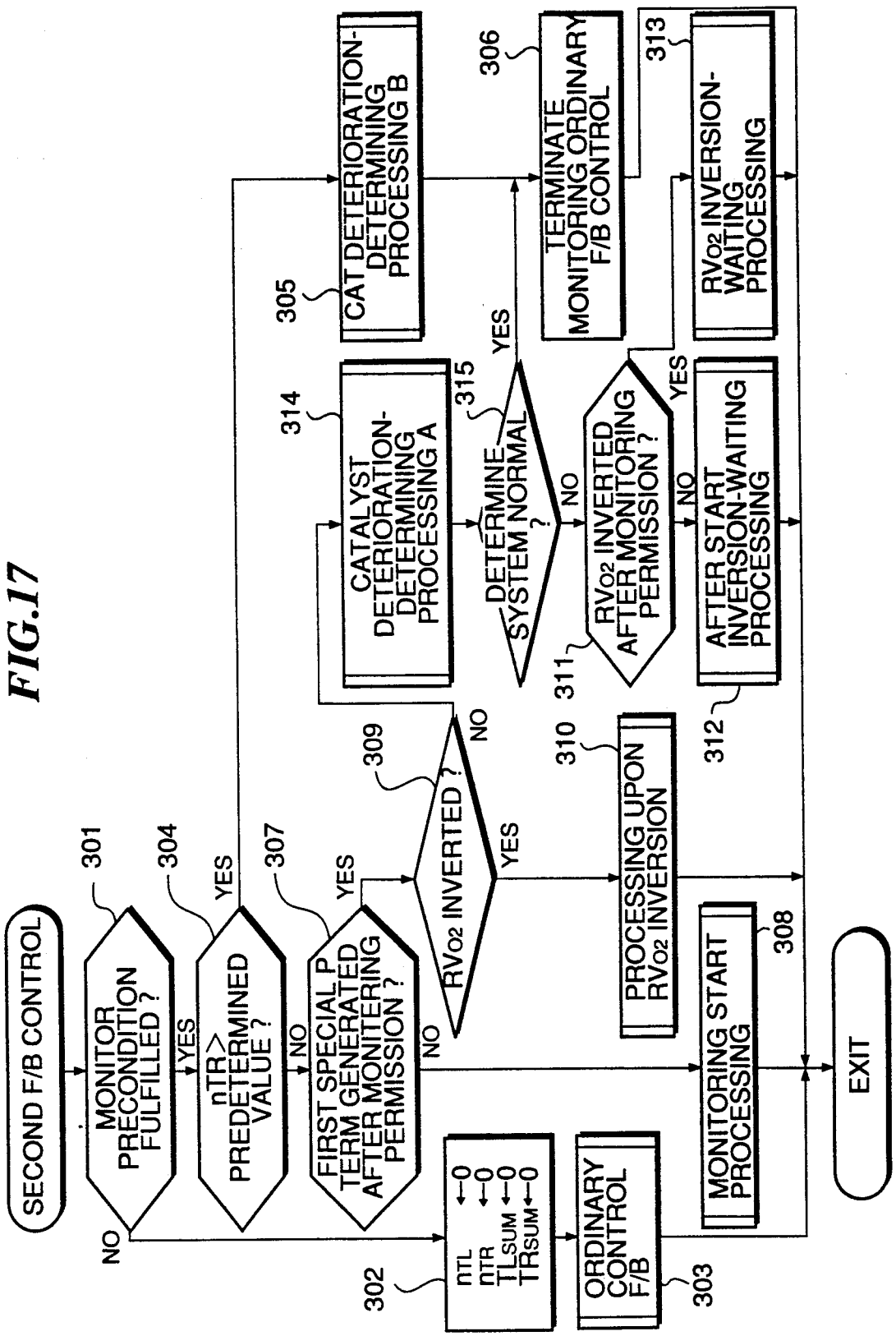
FIG. 17 is a flowchart of a program corresponding to the program of FIG. 6, according to a second embodiment of the invention.

FIG. 17 shows a program for carrying out feedback control according to the second embodiment. Corresponding steps in FIG. 17 to those in FIG. 6 are designated by identical reference numerals, and description of which is omitted. When it is determined at the step 307 that the first special P term has been generated, the deterioration-determining processing A is started at a step 314 before occurrence of inversion of the output $RV_{o2}$ from the downstream $O_2$ sensor RS, which is determined at the step 309. If it is determined at a step 315 that the exhaust gas purifying system is normal, the program proceeds to the step 306 to terminate the monitoring. On the other hand, if it is not determined at the step 315 that the exhaust gas purifying system is normal, the program proceeds to the step 311.

Figure 18:
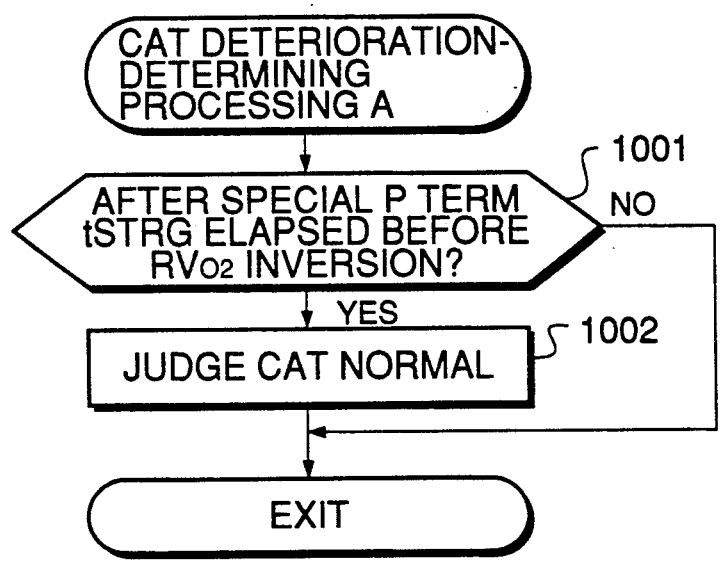
FIG. 18 is a flowchart of a subroutine for carrying out a deterioration-determining processing A executed at a step 314 in FIG. 17.

FIG. 18 shows details of the subroutine executed at the step 314. First, at a step 1001 it is determined whether or not a predetermined time period (limit time period) $t_{STRG}$ has elapsed while no inversion in the output voltage RVO2 from the downstream $O_2$ sensor occurs after generation of the special P term. The predetermined time period $T_{STRG}$ is compared with the time period T which is an average value (TL+TR)/2 of the time periods TL, TR in this embodiment. When the average value (TL+TR)/2 is longer than the predetermined time period $T_{STRG}$, it is determined that the $O_2$ storage capacity of the catalyst C is sufficient. Then, it is determined at a step 1002 that the catalyst C is qualified, without effecting the deterioration-determining processing B. The manner of measuring the time period $T_{STRG}$ is described in the right columns of tables of FIGS. 13 and 14.

The reason for judging that the catalyst C is qualified according to the deterioration-determining processing A is as follows: The smaller the degree of deterioration of the catalyst C, i.e. the higher the $O_2$ storage capacity, the longer the period of inversion of the output voltage $RV_{o2}$ from the downstream $O_2$ sensor RS when feedback control is effected by the second air-fuel ratio control means. From this fact it can be judged that the catalyst C is qualified if the average value of the time periods TL, TR determined by the inversion period of the output voltage $RV_{o2}$ from the downstream $O_2$ sensor RS exceeds the predetermined time period $T_{STRG}$. However, it is known that when the catalyst C is qualified and hence the inversion period is long, there can occur a degradation in the driveability of the engine and an increase in the amount of noxious substances in the exhaust gases. Therefore, if it is judged that the catalyst C is qualified, the monitoring of the catalyst C is immediately stopped and changeover is made from the second air-fuel ratio control means to the first air-fuel ratio control means, thereby avoiding the above-mentioned inconvenience.

Figure 19:
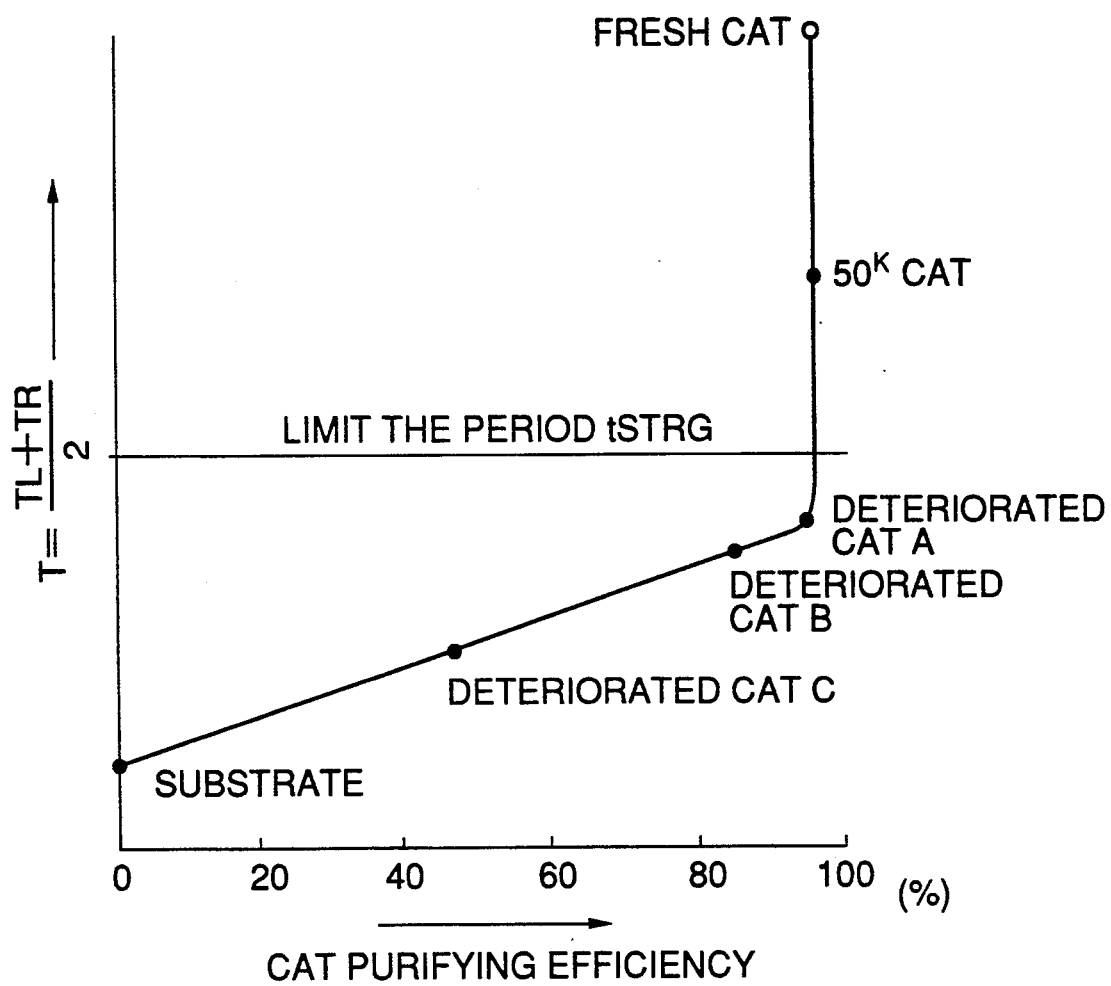
FIG. 19 is a graph showing the relationship between a catalyst purifying efficiency and a measured time period T.

This will be explained with reference to the graph of FIG. 19. According to the embodiment, the predetermined time period or limit time period $t_{STRG}$ is set to such a value as can prevent a degradation in the driveability and an increase in the amount of noxious substances in the exhaust gases, and the catalyst C is judged to be qualified when the average value (TL+TR)/2 of the time periods TL, TR exceeds the limit time period $t_{STRG}$ and then the catalyst monitoring is immediately stopped. It will be learned from the graph of FIG. 19 that the qualification of the catalyst C can be accurately determined by the use of the limit time period $t_{STRG}$.

Next, a third embodiment of the invention will be described.

The third embodiment is distinguished from the first embodiment described before in the structure of the first air-fuel ratio control means and identical with the latter in the other respects. Specifically, while in the first embodiment the first air-fuel ratio control means effects feedback control based upon both the output voltage $FV_{o2}$ from the upstream $O_2$ sensor FS and the output voltage $RV_{o2}$ from the downstream $O_2$ sensor RS, in the third embodiment the first air-fuel ratio control means effects feedback control based solely upon the output voltage $FV_{o2}$ from the upstream $O_2$ sensor FS.

More specifically, while in the first embodiment the correction terms $\Delta K_R$, $\Delta K_L$ are calculated at the step 215 in FIG. 4 based upon the output voltages $FV_{o2}$, $RV_{o2}$ from the upstream and downstream $O_2$ sensors FS, RF, in the present embodiment they are determined based solely upon the output voltage $FV_{o2}$ from the upstream $O_2$ sensor FS.

By thus using only the output voltage $FV_{o2}$ from the upstream $O_2$ sensor FS in effecting the feedback control by the first air-fuel ratio control means, the control system can be simplified in structure.

Then, a fourth embodiment of the invention will be described.

The fourth embodiment is characterized by effecting the additional deterioration-determining processing A in addition to the deterioration-determining processing B, as well as in that the first air-fuel ratio control means carries out feedback control based solely upon the output voltage $FV_{o2}$ from the upstream $O_2$ sensor FS. The fourth embodiment is identical with the first embodiment previously described in the other respects. In other words, the fourth embodiment is a combination of the second and third embodiments described above, providing results similar to those obtained by the latter embodiments.

Next, a fifth embodiment of the invention will be described.

The fifth embodiment is distinguished from the second embodiment described hereinbefore as follows:

While in the second embodiment only the time periods TL, TR are measured, which each elapse from the time the air-fuel ratio is changed from the richer side to the leaner side or vice versa with respect to the stoichiometric air-fuel ratio to the time the output voltage $RV_{o2}$ from the downstream $O_2$ sensor RS is inverted from the richer side to the leaner side or vice versa with respect to the reference value $V_{REF}$, in the fifth embodiment, in addition to the above time periods TL, TR, also time differences DL, DR are measured, which are each a time difference between the time the output voltage $FV_{o2}$ from the upstream $O_2$ sensor FS is inverted from the richer side to the leaner side or vice versa with respect to the reference value $F_{REF}$ after the air-fuel ratio is changed from the richer side to the leaner side with respect to the stoichiometric air-fuel ratio, and the time the output voltage $RV_{o2}$ from the downstream $O_2$ sensor RS is inverted from the richer side to the leaner side or vice versa with respect to the reference value $V_{REF}$ after the above change of the air-fuel ratio.

More specifically, the fifth embodiment is different from the second embodiment in the processing executed upon inversion of the output voltage $RV_{o2}$ at the step 310 in FIG. 17, $RV_{o2}$ inversion-waiting processing at the step 313, and the deterioration-determining processing B at the step 305.

The present embodiment will be described in detail with reference to FIGS. 20-24.

Figure 20:
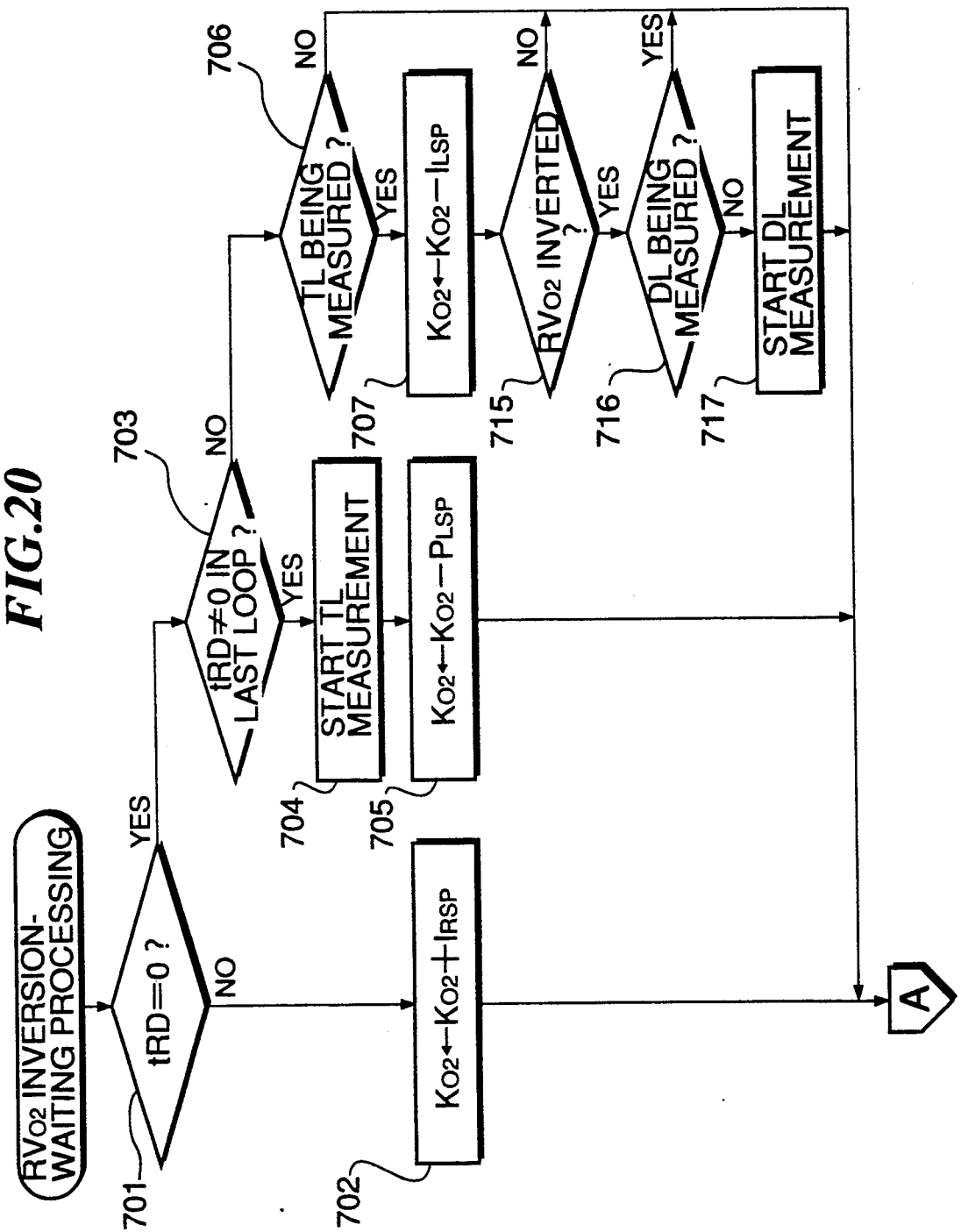
FIG. 20 is a flowchart of a subroutine for carrying out an $RV_{o2}$ inversion-waiting processing executed at a step 313 in FIG. 17.
Figure 21:
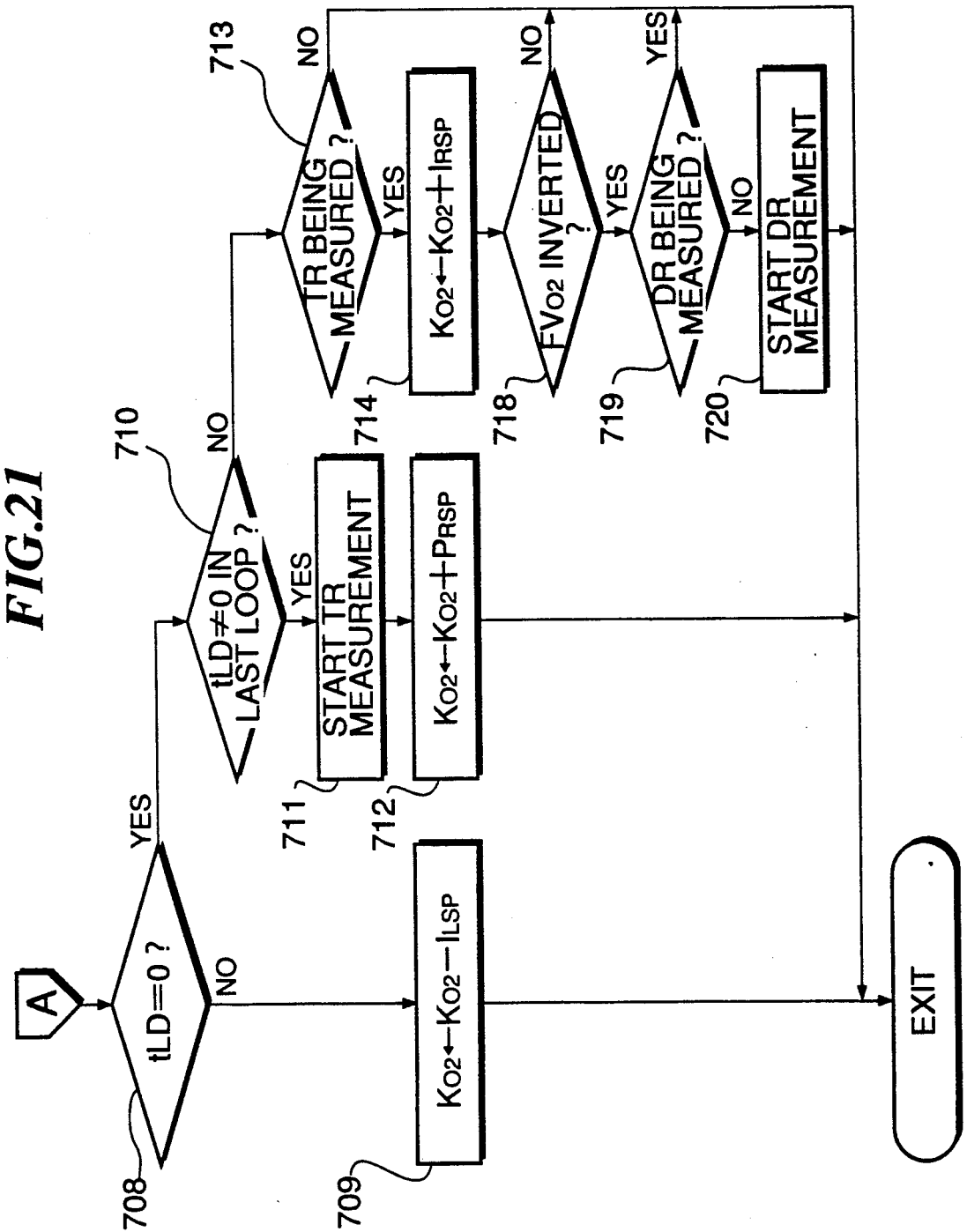
FIG. 21 is a flowchart of a continued part of the subroutine of FIG. 20.

FIGS. 20 and 21 shows details of the subroutine executed at the step 313 in FIG. 6 (processing for waiting inversion of the output from the downstream $O_2$ sensor), according to the fifth embodiment. This subroutine is executed on condition that the output voltage $RV_{o2}$ from the downstream $O_2$ sensor RS has been inverted, like the subroutine of FIG. 10. This subroutine is distinguished from the FIG. 10 subroutine in that additional steps 715-720 are provided. The other steps in FIGS. 20, 21 are identical with corresponding steps in FIG. 10, and therefore designated by identical reference numerals, description of which is omitted.

At the step 715 following the step 707 in FIG. 20, it is determined whether or not the output voltage $FV_{o2}$ from the upstream $O_2$ sensor FS has been inverted. If it has been inverted, it is determined at the step 716 whether or not a time difference DL, hereinafter referred to, is being measured. If the answer is negative (NO), measurement of the time difference DL is started at the step 717.

Similarly, at the step 718 following the step 714 in FIG. 21, it is determined whether or not the output voltage $FV_{o2}$ from the upstream $O_2$ sensor FS has been inverted. If it has been inverted, it is determined at the step 719 whether or not a time difference DR, hereinafter referred to, is being measured. If the answer is negative (NO), measurement of the time difference DR is started at the step 720.

Figure 22:
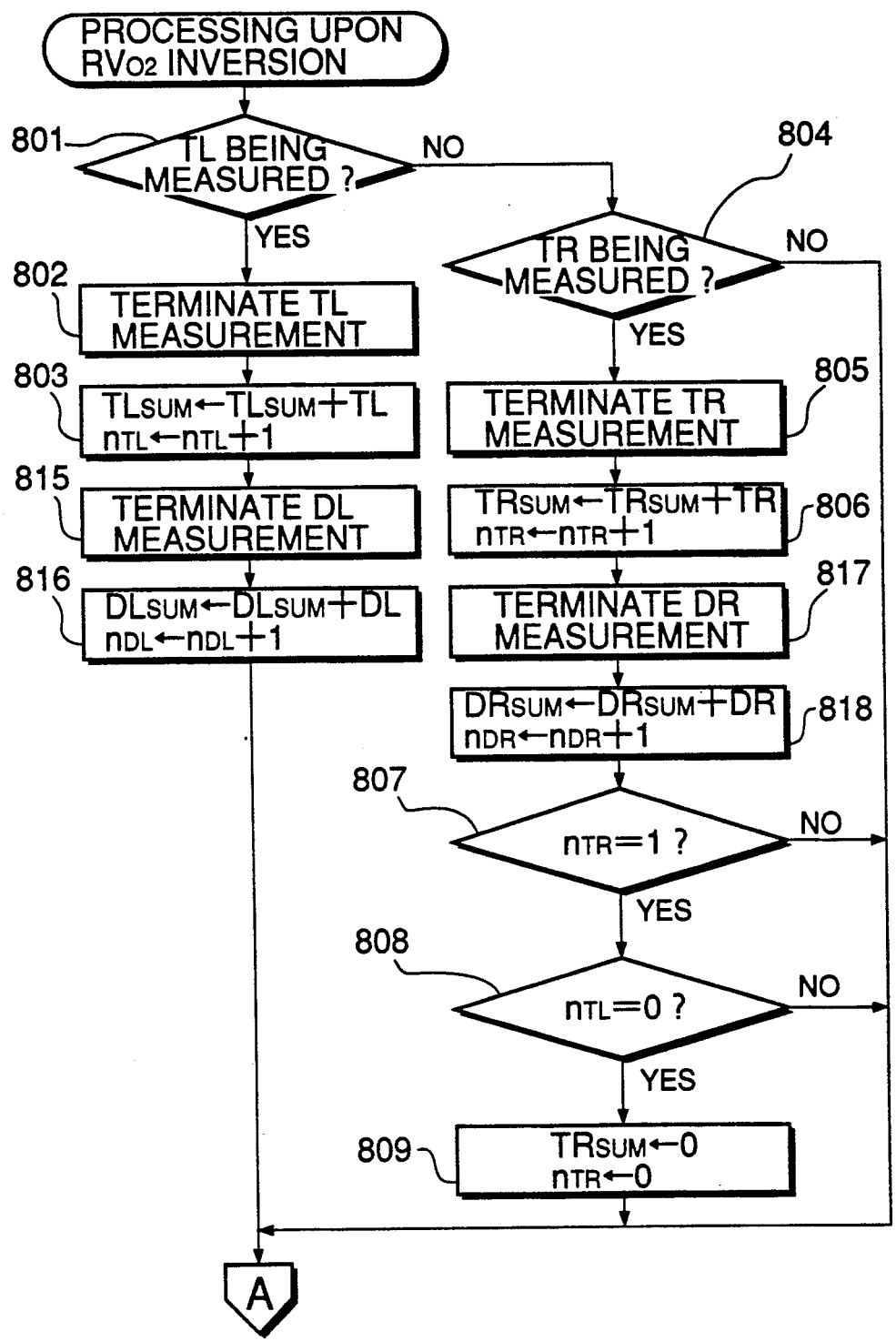
FIG. 22 is a flowchart of a subroutine for carrying out a processing executed upon $RV_{o2}$ inversion at a step 310 of FIG. 17.
Figure 23:
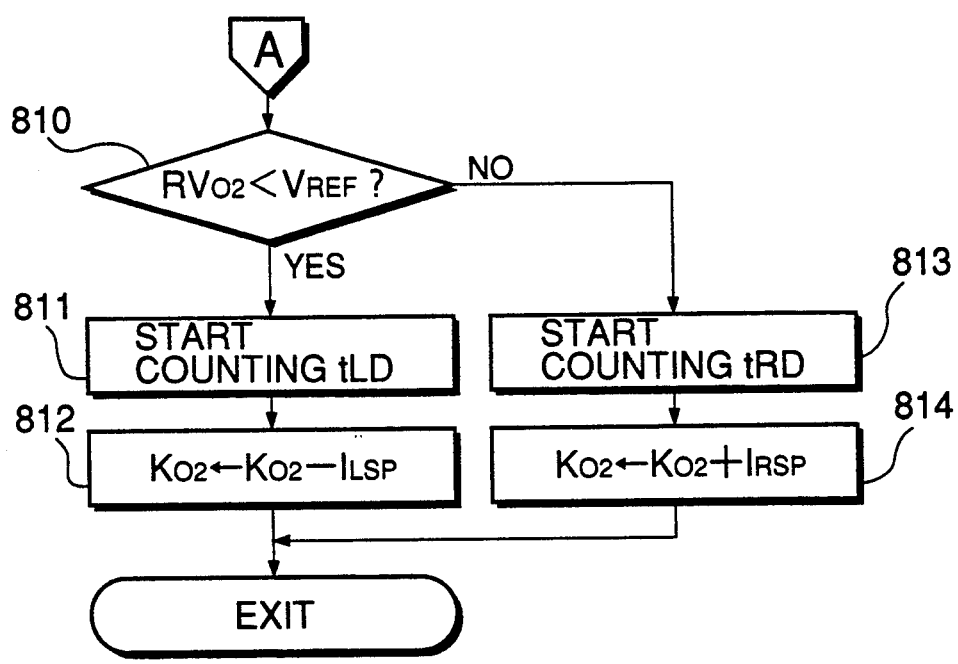
FIG. 23 is a flowchart of a continued part of the subroutine of FIG. 22.

FIGS. 22 and 23 show details of the subroutine of the step 310 in FIG. 17 (processing executed upon inversion of the output from the downstream $O_2$ sensor), according to the fifth embodiment. This subroutine is executed upon inversion of the output voltage $RV_{o2}$ from the downstream $O_2$ sensor RS, like the subroutine of FIG. 11. This subroutine is distinguished from the FIG. 11 subroutine in that additional steps 815-818 are provided in addition to the steps in FIG. 10. The other steps in FIGS. 22, 23 are identical with corresponding steps in FIG. 11 and therefore designated by identical reference numerals, description of which is omitted.

At the step 815 following the step 803 in FIG. 22, the measurement of the time difference DL, which was started at the step 717 in FIG. 20, referred to hereinbefore, is terminated, and then at the step 816, the value of the time difference DL measured in the present loop is added to the DL value sum $DL_{SUM}$, and the DL measurement time number nDL is incremented.

Similarly, at the step 817 following the step 806, the measurement of the time difference DR, which was started at the step 720 in FIG. 20, referred to hereinbefore, is terminated, and then at the step 818, the value of the time difference DR measured in the present loop is added to the DR value sum $DR_{SUM}$, and the DR measurement time number nDR is incremented.

Figure 24:
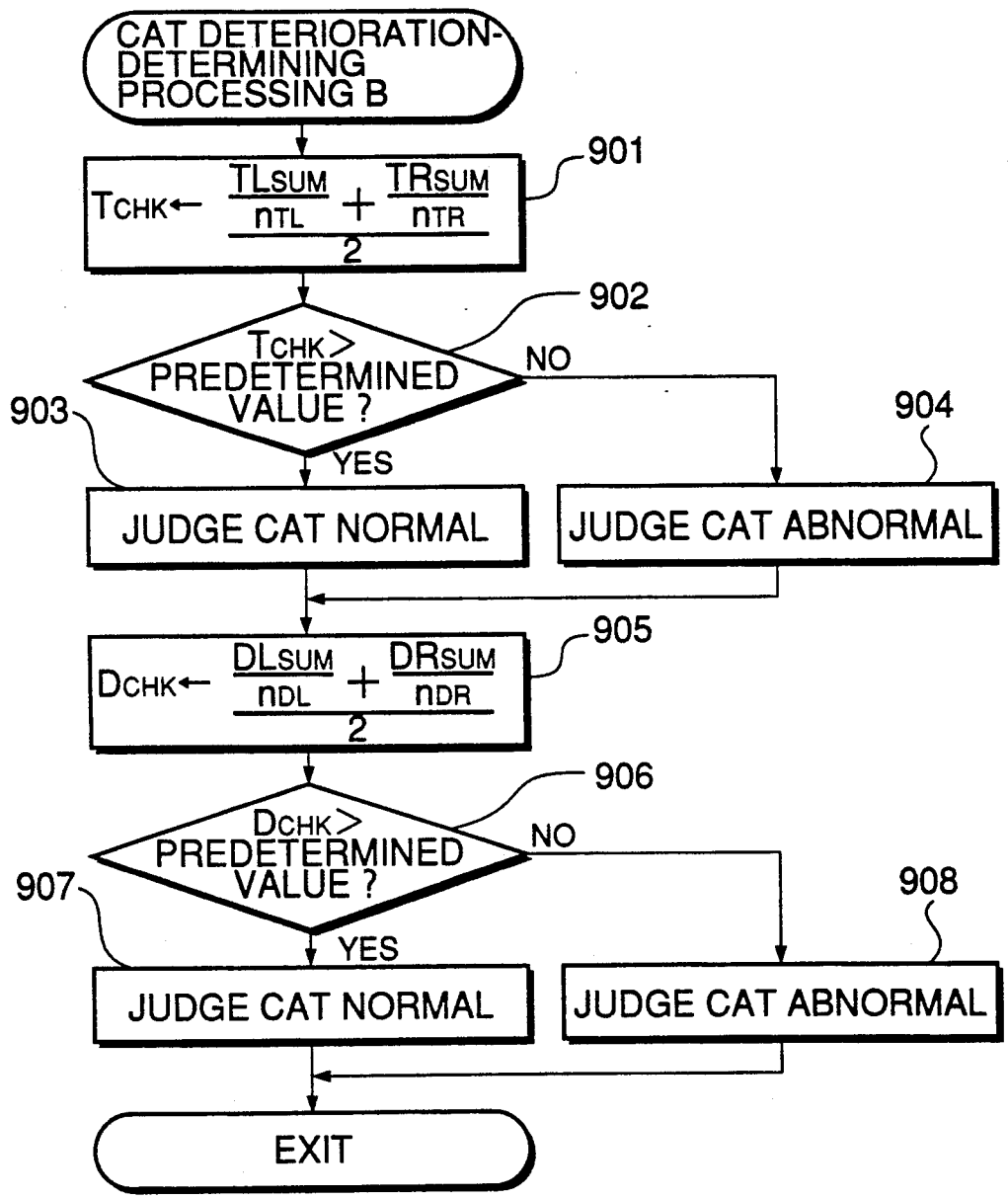
FIG. 24 is a flowchart of a subroutine for carrying out a deterioration-determining processing B executed at a step 305 in FIG. 17.

FIG. 24 shows details of the subroutine of the step 305 in FIG. 17 (deterioration-determining processing B), according to the fifth embodiment. This subroutine is executed when the TR measurement time number nTR has exceeded a predetermined value, like the subroutine of FIG. 12. This subroutine is distinguished from the FIG. 12 subroutine in that additional steps 905, 908 are provided in addition to the steps in FIG. 12. The other steps in FIG. 24 are identical with corresponding steps in FIG. 12 and therefore designated by identical reference numerals, description of which is omitted.

At the step 905 following the step 903 in FIG. 24, an average value of a value ($DL_{SUM}$/nDL) obtained by dividing the DL value sum by the DL measurement time number nDL and a value ($DR_{SUM}$/nDR) obtained by dividing the DR value sum by the DR measurement time number nDR is calculated to thereby determine a time period $D_{CHK}$.

Then, it is determined at the step 906 whether or not the determined time period $D_{CHK}$ exceeds a predetermined value. If the answer is affirmative (YES), it is judged that the $O_2$ storage capacity of the catalyst C exceeds the reference value, and therefore it is judged at the step 907 that the exhaust gas purifying system is normal. On the other hand, if the answer to the question of the step 906 is negative (NO), it is judged that the $O_2$ storage capacity of the catalyst C is below the reference value, and therefore it is judged at the step 908 that the exhaust gas purifying system is abnormal.

Figure 25A:
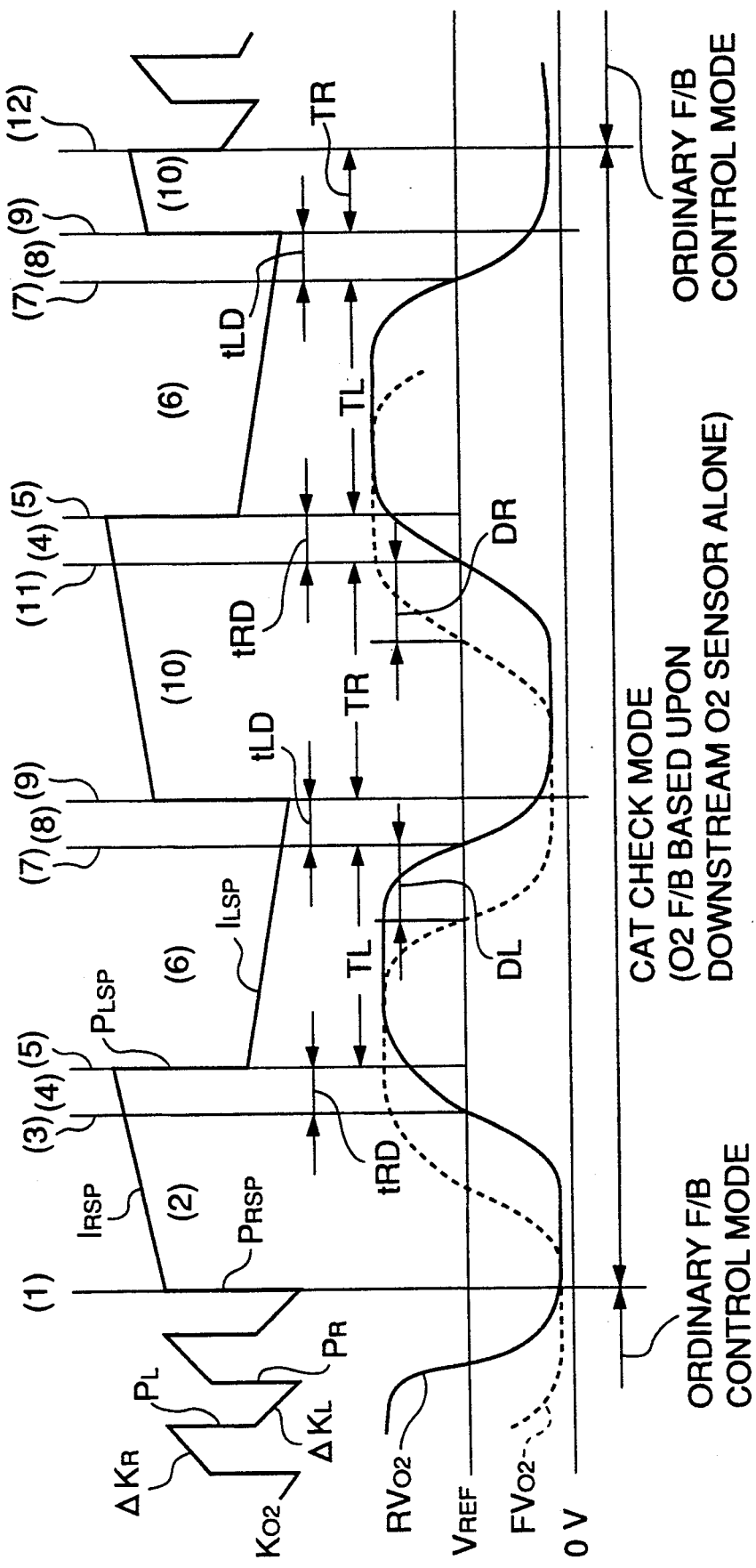
Figure 26A:
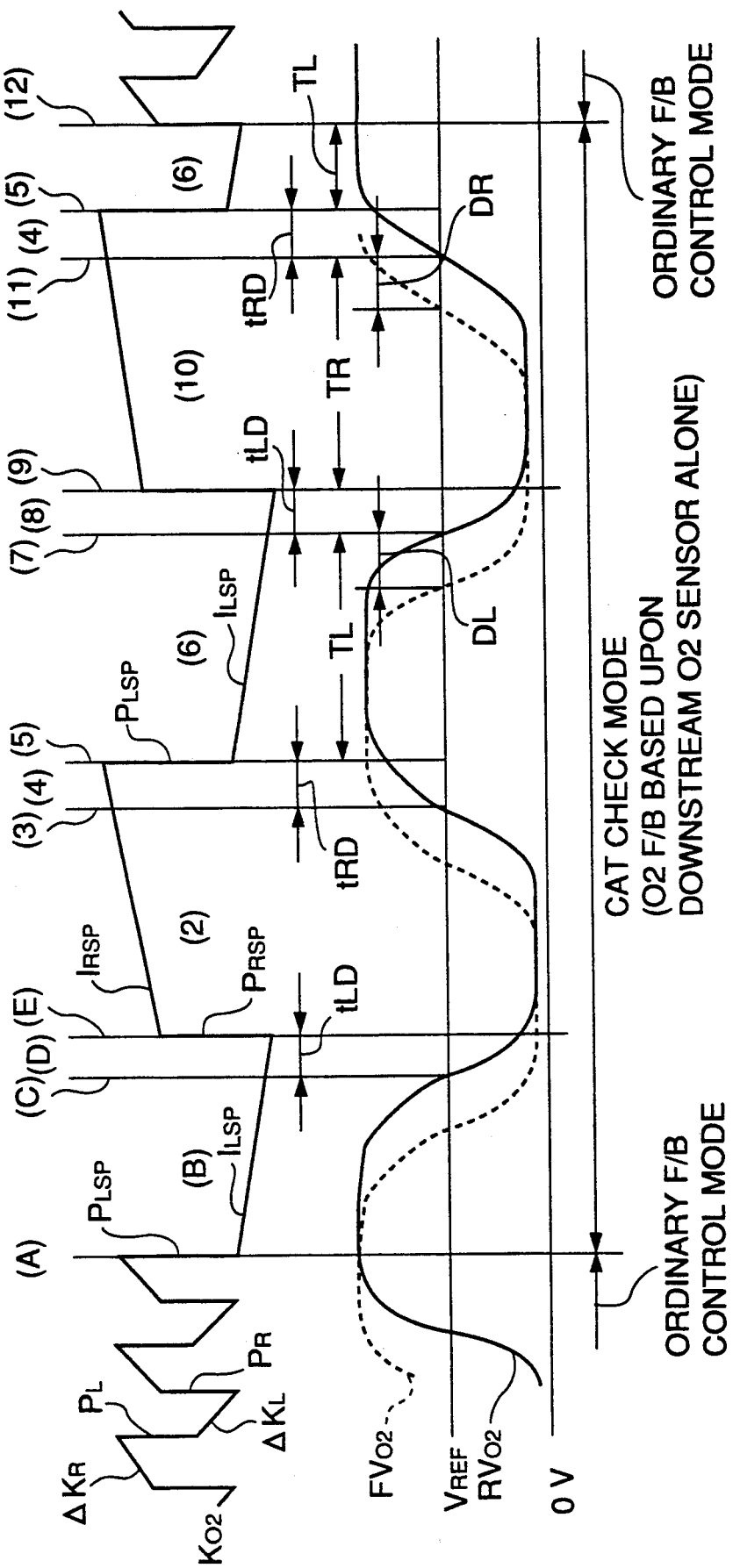

The catalyst monitoring operation will be further described with reference to FIGS. 25 and 26. The timing charts of FIGS. 25 and 26 are identical with those of FIGS. 13 and 14 except that the broken lines represent the output voltage $FV_{o2}$ from the upstream $O_2$ sensor FS and the time period DL, DR are shown in the charts. Therefore, the following description refers only to different points from FIGS. 13 and 14.

As shown in FIG. 25, as indicated by the broken line, the output voltage $FV_{o2}$ from the upstream $O_2$ sensor FS changes in advanced phase relative to the output voltage $RV_{o2}$ from the downstream $O_2$ sensor RS indicated by the solid line. The time difference DL, which started to be measured at the time the output voltage $FV_{o2}$ from the upstream $O_2$ sensor FS was inverted from the richer side to the leaner side with respect to the stoichiometric air-fuel ratio corresponds to a time period elapsed from the time of inversion of the output voltage $FV_{o2}$ to the time the output voltage $RV_{o2}$ from the downstream $O_2$ sensor RS is inverted from the richer side to the leaner side with respect to the stoichiometric air-fuel ratio at a later timing relative to the output voltage $FV_{o2}$, and the time difference DR which started to be measured corresponds to a time period elapsed from the time the output voltage $FV_{o2}$ from the upstream $O_2$ sensor FS was inverted from the leaner side to the richer side with respect to the stoichiometric air-fuel ratio to the time the output voltage $RV_{o2}$ from the downstream $O_2$ sensor RS is inverted from the leaner side to the richer side with respect to the stoichiometric air-fuel ratio at a later timing relative to the output voltage $FV_{o2}$.

Also in the example shown in the timing chart of FIG. 26, like the example shown in FIG. 14, no measurement of the time period TR is carried out in the region (2). As mentioned before, this is because it is programmed such that the first time period measurement is started with measurement of the time period TL, and following the completion of the TL measurement the time period TR is measured (see the steps 807 to 809 in FIG. 22). Similarly to the manner of measurement of the time periods TL, TR, the time differences DL, DR are measured in such a manner that the first time difference measurement is started with measurement of the time difference DL, and following the completion of the DL measurement, the time difference DR is measured. Except for those described above, the timing chart of FIG. 26 is substantially identical with those of FIGS. 14 and 23.

The time difference DL measured as above corresponds to a time lag from the moment the output voltage $FV_{o2}$ of the upstream $O_2$ sensor FS is inverted from the richer side to the leaner side across the reference voltage $V_{REF}$ in response to changing of the air-fuel ratio to the leaner side to the moment the output voltage $RV_{o2}$ from the downstream $O_2$ sensor RS is inverted from the richer side to the leaner side with respect to the stoichiometric air-fuel ratio. Similarly, the time difference DR measured as above corresponds to a time lag from the moment the output voltage $FV_{o2}$ of the upstream $O_2$ sensor is inverted from the leaner side to the richer side across the reference voltage $V_{REF}$ in response to changing of the air-fuel ratio to the richer side to the moment the output voltage $RV_{o2}$ from the downstream $O_2$ sensor RS is inverted from the leaner side to the richer side with respect to the stoichiometric air-fuel ratio.

As mentioned before, the catalyst C has the action of taking in oxide gas components ($O_2$ and NOx) in the exhaust gases when the air-fuel ratio shifts to the leaner side. When the oxide gas components (i.e. $O_2$ and NOx) have been taken in, the output voltage $RV_{o2}$ from the downstream $O_2$ sensor RS changes from the richer side to the leaner side with respect to the stoichiometric air-fuel ratio. Further, the catalyst C has the action of taking in reduced gas components (CO and HC) in the exhaust gases when the air-fuel ratio shifts to the richer side, where CO and HC react with $O_2$ and NOx already taken in. When CO and HC have been taken in, the output voltage $RV_{o2}$ from the downstream $O_2$ sensor RS changes from the leaner side to the richer side with respect to the stoichiometric air-fuel ratio. Therefore, the values of the time differences DL, DR, as well as the values of the time periods TL, TR are proportional to the $O_2$ storage capacity of the catalyst C. Therefore, the values of the time differences DL, DR, as well as the values of the time periods TL, TR can be used as parameters for determining deterioration of the catalyst C.

Further, as mentioned before, the time period TL, which corresponds to a time period within which $O_2$ and NOx in the exhaust gases, can be completely taken in by the catalyst C and the time period TR, which corresponds to within which $O_2$ and NOx taken in can completely react with CO and HC taken in following the taking-in of the $O_2$ and NOx, are closely related to each other. Therefore, by determining the $O_2$ storage capacity of the catalyst C by the use of a combination of the first measured time period TL and the time period TR which is measured following the measurement of the time period TL, and the average value $T_{CHK}$ of the TL and TR values, determination of deterioration of the catalyst C can be effected with very high accuracy.

This is the same case with the time differences DL, DR, since inversion of the output voltage $FV_{o2}$ from the upstream $O_2$ sensor FS takes place with rather a short time delay following a change in the air-fuel ratio. Therefore, by determining the $O_2$ storage capacity of the catalyst C by the use of a combination of the first measured time difference DL and the time period DR measured following the DL measurement, and the average value $D_{CHK}$ of the DL and DR values, determination of deterioration of the catalyst C can be effected with very high accuracy.

Figure 27:
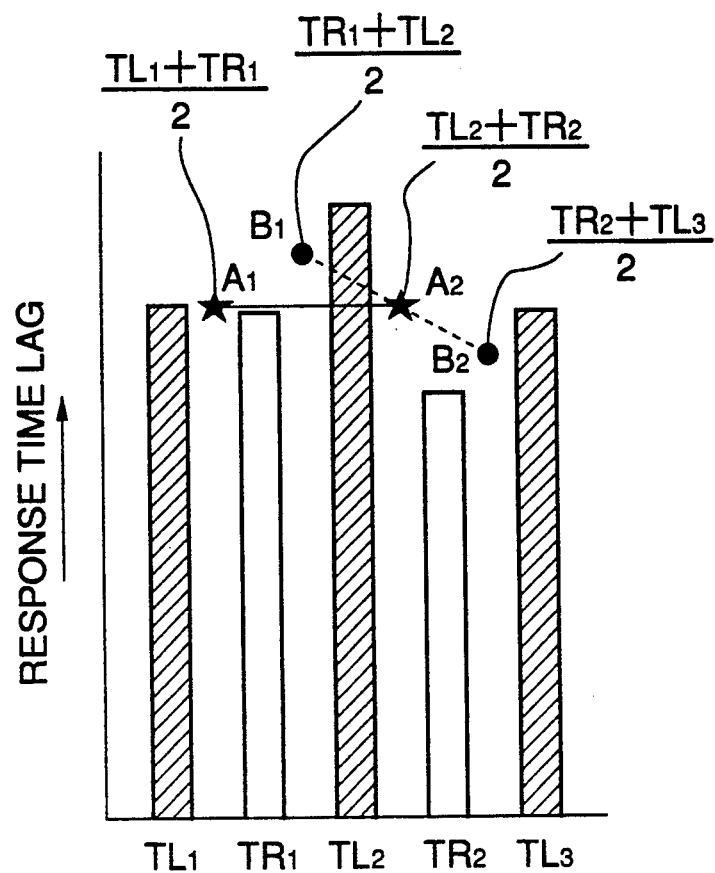
FIG. 27 is a graph showing, by way of example, values of time periods $T_L$, $T_R$ and an average value thereof.

FIG. 27 graphically illustrates values of time periods $TL_1$, $TR_1$, $TL_2$, $TR_2$, $TL_3$, $TR_3$, . . . which have been sequentially measured in the order mentioned. It is to be noted that an average value $A_1$ of the values $TL_1$, $TR_1$ which have been successively measured in the prescribed sequence (i.e. first, $TL_1$ and then, $TR_1$) is almost equal to an average value $A_2$ of the values $TL_2$, $TR_2$ which have been successively measured in the prescribed sequence (i.e. first, $TL_2$, and then, $TR_2$), which shows that highly accurate determination of the catalyst deterioration can be effected. In contrast, an average value $B_1$, of the values $TR_1$, $TL_2$ which have been measured in a sequence (i.e. first, $TR_1$, and then, $TL_2$) different from the prescribed sequence, and an average value $B_2$ of the values $TR_2$, $TL_3$ which have also been measured in a sequence (i.e. first, $TR_2$, and then, $TL_3$) different from the prescribed sequence are largely different from each other, which shows that the determination accuracy is low. This is also applicable to the time differences DL, DR. That is, similarly to the time periods TL, TR, highly accurate determination of the catalyst determination can be achieved by using an average value of the time differences DL, DR.

As the time period for determining deterioration of the catalyst C, the sum of the time periods TL, TR measured in the prescribed sequence or the sum of the time differences DL, DR measured in the prescribed sequence may be used, instead of using an average value of TL, TR or an average value of DL, DR used in the above described embodiments.

Next, a sixth embodiment of the invention will be described.

The sixth embodiment is characterized by effecting the determination of the catalyst deterioration in dependence on the temperature of the catalyst.

The concept of the present embodiment is based upon the fact that the $O_2$ storage capacity of a catalyst can vary with a change in the temperature of the catalyst, which can affect the time period TL elapsed from the time the air-fuel ratio is changed from the richer side to the leaner side with respect to the stoichiometric air-fuel ratio.

The above fact will be described in detail with reference to FIG. 31 showing changes in the $O_2$ storage capacity (OSC) with respect to the catalyst temperature.

As shown in the figure, in the case of a new catalyst, the $O_2$ storage capacity OSC reaches the maximum value at approximately 300° C., and at higher values of the catalyst temperatures, it remains unchanged. However, as the catalyst becomes progressively thermally deteriorated with aging, i.e. as it is aged from a new catalyst into a used but qualified catalyst and then into a deteriorated catalyst, the $O_2$ storage capacity becomes progressively degraded. The used catalyst and the deteriorated catalyst show changes in the $O_2$ storage capacity with a change in the catalyst temperature within a temperature range A-B defined by 300° C. and 550° C.

Therefore, if the lower limit of the monitoring temperature range within which monitoring of the catalyst deterioration is to be made is set to 300° C. indicated by A in the figure so as to match the $O_2$ storage capacity characteristic of a new catalyst, deterioration of a new catalyst can be accurately determined when the determination is made at temperatures falling within the range A-B. However, in the case of a used catalyst having inferior $O_2$ storage capacity than a new catalyst. An erroneous determination can be made within the range A-B. Also, if the lower limit of the monitoring temperature range is set to 550° C. indicated by B in the figure so as to match a used catalyst, there is a possibility that a deteriorated catalyst cannot be determined to be deteriorated at higher temperatures, or a possibility that the catalyst temperature does not rise to the monitoring temperature range, so that the deterioration determination cannot be carried out.

Therefore, even if the deterioration determination is inhibited when the catalyst temperature $T_{CAT}$ falls outside the monitoring temperature range ($T_{CATCHKL}$-T-$C_{ATCHKH}$) as shown in FIG. 7 of the aforedescribed first embodiment, this is still insufficient for prevention of erroneous determination of deterioration of a deteriorated catalyst, though erroneous determination of a new catalyst may be prevented.

The catalyst C appearing in FIG. 1, which is also applicable to the present embodiment, is comprised of two independent beds C1, C2 serially arranged with a given clearance (e.g. 25 mm) therebetween, as shown in FIGS. 28 (a) and (b). Interposed between the beds C1, C2 is the catalyst temperature sensor 13, referred to before, whose probe 13a formed of a thermistor is located at a diametrically central portion of the catalyst C.

The manner of determining the catalyst deterioration according to the present embodiment is distinguished from the previous embodiments described before, only in the deterioration-determining processing B executed at the step 305 in FIGS. 6 and 7. The deterioration-determining processing B according to the present embodiment will now be described.

Figure 30:
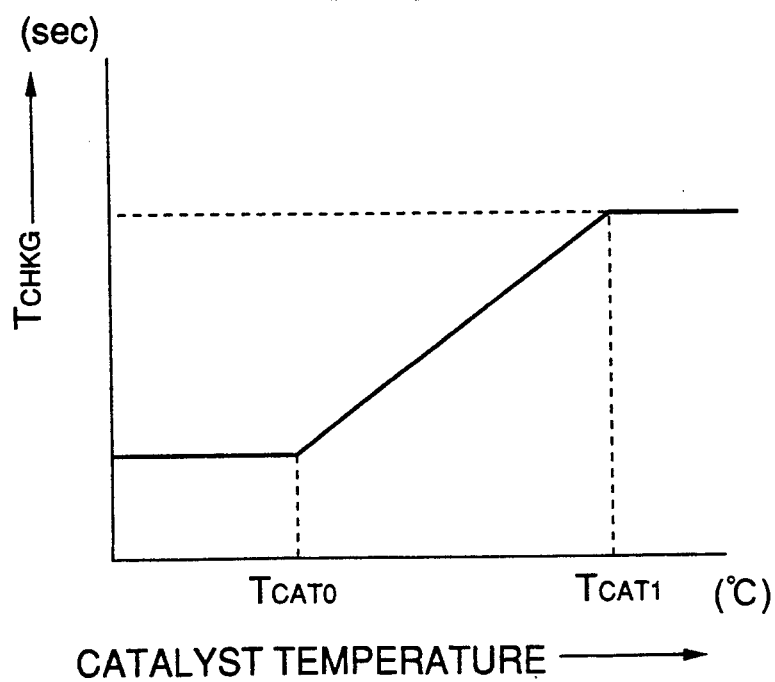
FIG. 30 shows a table for determining a value $T_{CHKG}$ used in the processing B of FIG. 29 for determining deterioration of the catalyst.
Figure 29:
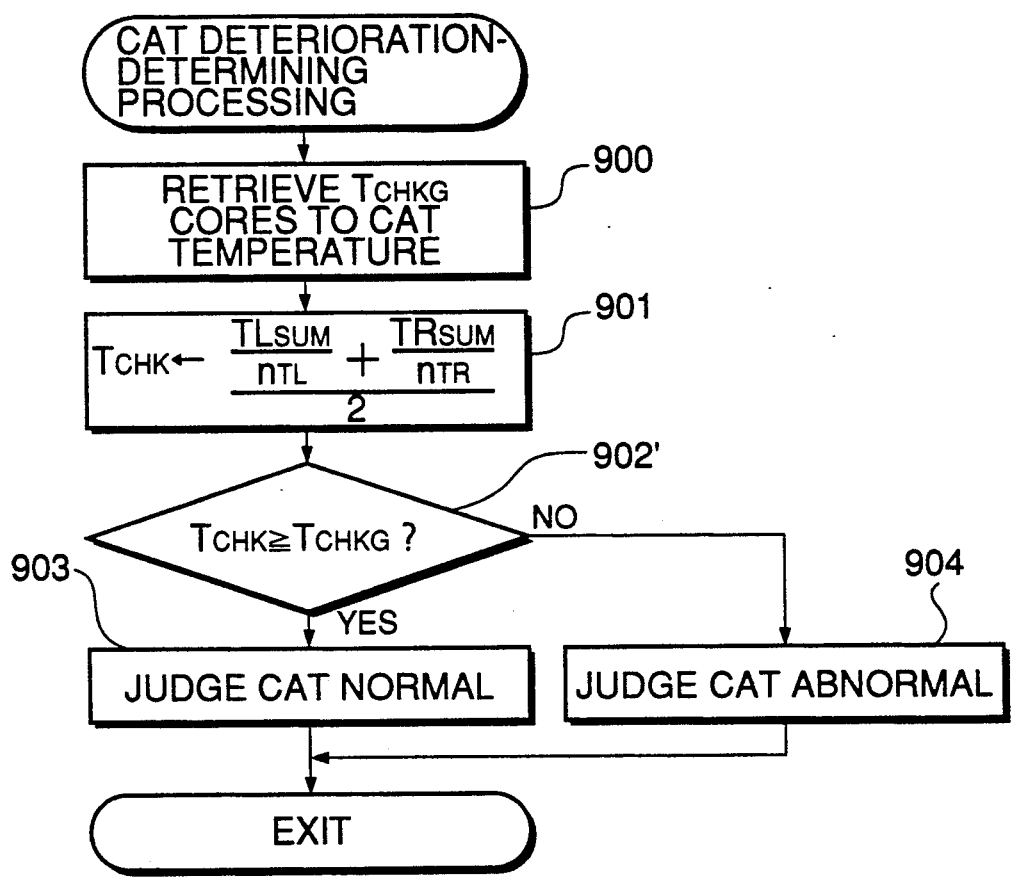
FIG. 29 is a flowchart of a subroutine for carrying out the deterioration-determinating processing B according to another embodiment of the invention.

FIG. 29 shows details of the deterioration-determining processing B according to the sixth embodiment, which is executed at the step 305 in FIG. 17 when the TR measurement time member $n_{TR}$ exceeds the predetermined value. First, at a step 900 a determination value $T_{CHKG}$ is retrieved from a $T_{CHKG}$ table shown in FIG. 30, which corresponds to the catalyst temperature $T_{CAT}$ detected by the catalyst temperature sensor 13. This $T_{CHKG}$ table is based upon the $O_2$ storage capacity vs temperature characteristics of the catalyst shown in FIG. 31, referred to hereinbefore, and set such that the $T_{CHKG}$ value progressively increases as the catalyst temperature $T_{CAT}$ increases from a predetermined value $T_{CAT0}$ (e.g. 350° C.) to $T_{CAT1}$ (e.g. 600° C.). Then, at a step 901, an average value of a value ($TL_{SUM}/n_{TL}$) obtained by dividing the TR value sum by the TL measurement time number nTL and a value ($TR_{SUM}/n_{TR}$) obtained by the TR value sum by the TR measurement time number nTR is calculated to obtain a time period $T_{CHK}$. Then, it is determined at a step 902' whether or not the obtained time period $T_{CHK}$ is greater than the determination value $T_{CHKG}$ read at the step 900. If the answer is affirmative (YES), it is judged at a step 903 that the $O_2$ storage capacity exceeds the reference level and hence the exhaust gas purifying system is normal. On the other hand, if the answer to the question of the step 902' is negative (NO), it is judged at a step 904 that the $O_2$ storage capacity does not reach the reference level and hence the exhaust gas purifying system is abnormal.

By thus using the $T_{CHKG}$ table, it is possible to correct the deterioration-determining value $T_{CHK}$ in dependence on the temperature characteristics of the catalyst such that monitoring of the catalyst deterioration can be achieved without erroneous determination results, irrespective of the catalyst temperature. Further, advantageously, a specific catalyst temperature region may be provided as a deterioration monitoring region, within which degradation of the $O_2$ storage capacity caused by deterioration of the catalyst can be positively determined, as shown, e.g. as a region A-b in FIG. 31, and the deterioration-determining value $T_{CHKG}$ may be corrected in dependence on the catalyst temperature falling within the specific catalyst temperature region, thereby enabling further accurate determination of the catalyst determination.

Figure 32A:
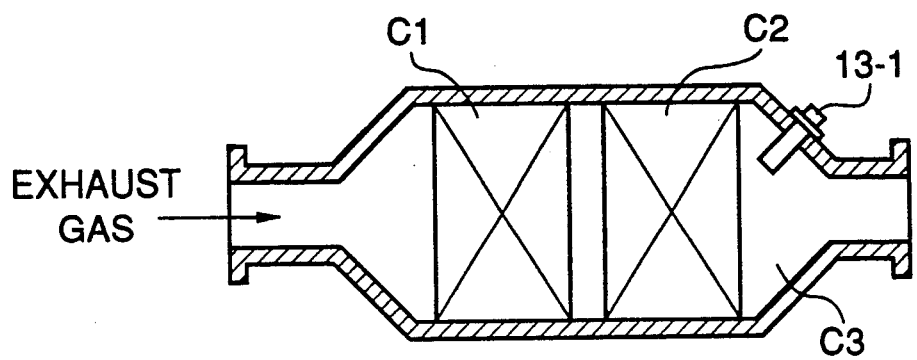
FIGS. 32 (a) and (b) are views useful in explaining results obtainable from the FIG. 29 embodiment.
Figure 32B:
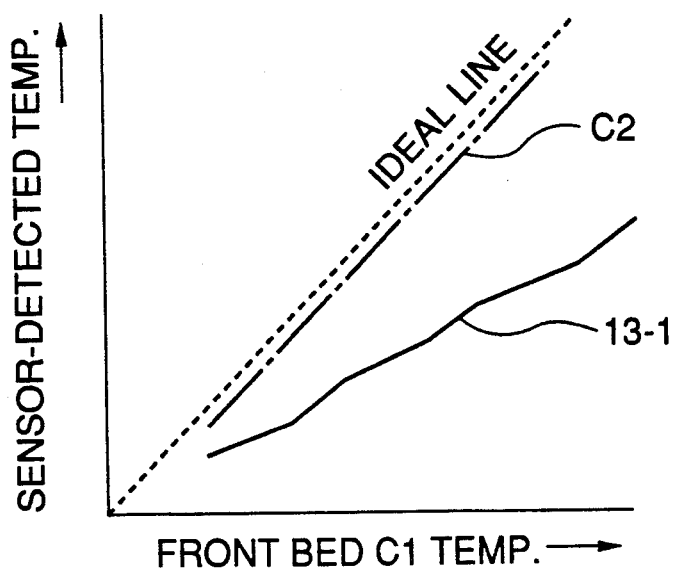

Besides, in the present embodiment, as mentioned above, the probe 13a of the catalyst temperature sensor 13 is located at the boundary between the two catalyst beds C1, C2, which provides the following advantage:

A conventional catalyst temperature sensor as shown in FIG. 32 (a) is generally adapted to detect an abnormal rise in the catalyst temperature and used as an exhaust gas temperature-warning sensor to actuate a warning device upon an abnormal rise in the exhaust gas temperature. In a catalyst of a so-called two-bed type which is comprised of a front bed C1 and a rear bed C2 serially arranged with a predetermined clearance therebetween, as shown in FIG. 32 (a), the exhaust gas temperature-warning sensor 13-1 is usually mounted at an end cone as shown in the figure.

With this arrangement, there is a tendency that the error between the actual catalyst bed temperature and the temperature value indicated by the output from the sensor 13-1 becomes greater as the catalyst bed temperature rises. Further, the temperature gradient changes with a change in the engine load.

Further, the arrangement that the catalyst temperature sensor is provided at the end cone portion C3 immediately behind the rear bed C2 also has the disadvantage that the sensor is easily influenced by exhaust gas flows determined by the configuration of the end cone portion C3 and exhaust gas pulsation and hence shows degraded accuracy of the sensed exhaust gas temperature. Such degraded accuracy can cause an error in setting the aforementioned deterioration-determining value $T_{CHKG}$, making it impossible to achieve highly accurate determination of the catalyst deterioration.

Figure 33:
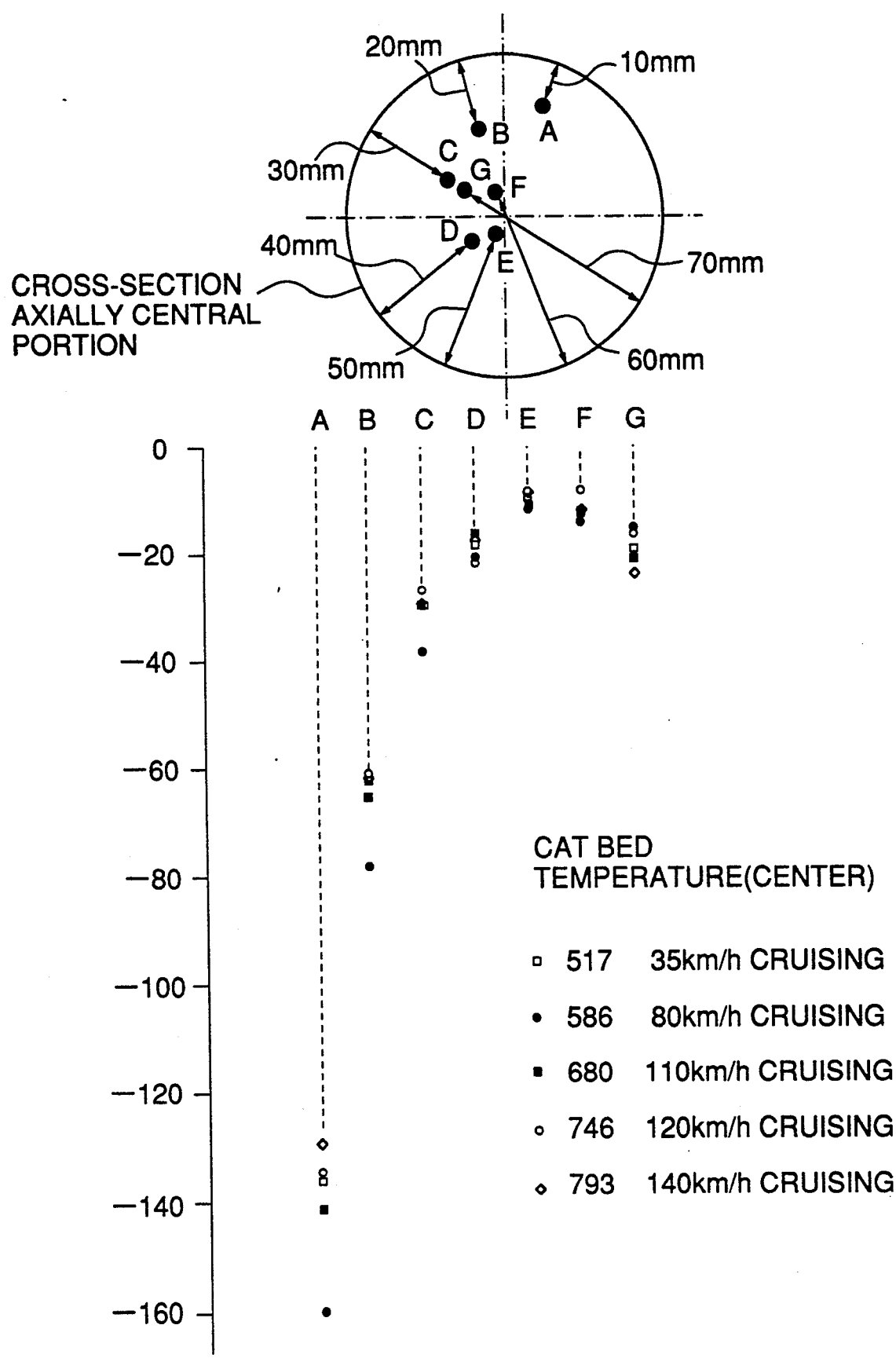
FIG. 33 is a view useful in explaining results obtainable from the FIG. 29 embodiment.
Figure 34:
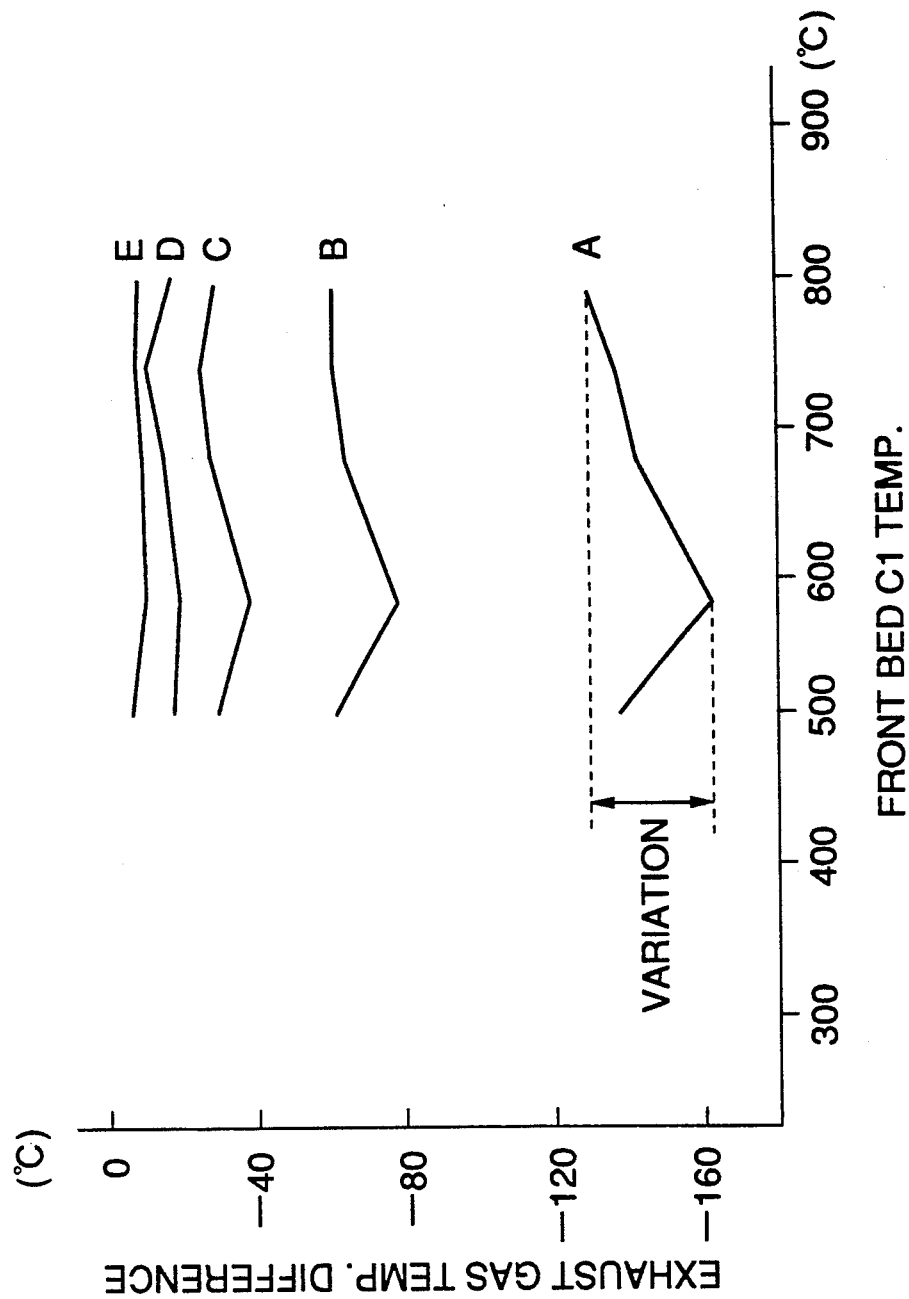
FIG. 34 is a view useful in explaining results obtainable from the FIG. 29 embodiment.

To overcome the above-mentioned disadvantages with the arrangement of the conventional catalyst temperature sensor, according to the present embodiment, the catalyst temperature sensor 13 is mounted at the boundary between the catalyst beds C1, C2. Thus, the sensor 13 is exposed to a stable flow of exhaust gases, so that it can detect the temperature of the catalyst beds with accuracy and reliability even with a change in the engine load etc. Besides, since the probe or thermistor 13a of the sensor 13 is located at an axially central portion of the catalyst C, it is less susceptible to the influence of the exhaust gas flow containing exhaust gas pulsation, etc., and hence able to detect the temperature with high accuracy and stableness. This can also be understood from FIGS. 33 and 34. FIG. 33 shows distributions of values of the exhaust gas temperature taken in the diametric direction, of the boundary between the beds C1, C2 of the catalyst C, the temperature values being sensed at temperature-sensing points A-G. As shown in the figure, the temperature gradient shows only a small amount of variation with respect to a change in the engine load. Moreover, the difference between the sensed temperature and the bed temperature of the front bed C1 is smaller as the sensing point is closer to the diametric center of the catalyst (e.g. points D, E). FIG. 34 shows differences of the exhaust gas temperature sensed at the temperature-sensing points A-E in FIG. 33, from the bed temperature of the front bed C1. It will be learned from the figure that as the sensing point is closer to the diametric center (e.g. D, E), a variation in the temperature difference, which is caused by a change in the bed temperature of the front bed C1, is smaller.

Further, according to the present embodiment, since the clearance between the beds C1, C2 is set at 25 mm, the sensor can be free from the influence of lowering of the exhaust gas temperature at the temperature-sensing points, which is caused by a low ambient temperature, thereby enabling to achieve highly accurate determination of the catalyst deterioration.

Then, a seventh embodiment of the invention will be described.

According to the seventh embodiment, the catalyst temperature is estimated based upon operating conditions of the engine, instead of actually detecting the catalyst temperature by the use of the catalyst temperature sensor 13 as employed in the above described sixth embodiment.

Figure 35:
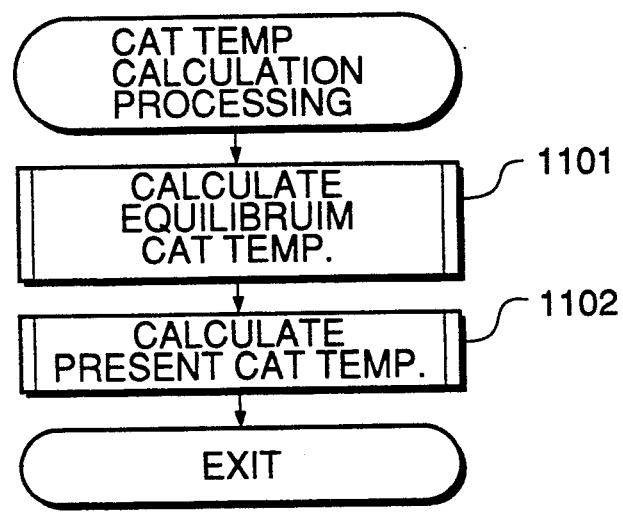
FIG. 35 is a flowchart of a subroutine for calculating a value of the temperature CAT of the catalyst according to another embodiment of the invention.

FIG. 35 shows a manner of determining or estimating the catalyst temperature according to the present embodiment. First, at a step 1101, an equilibrium catalyst temperature Tb is calculated by the use of the following equation (2):

$$Tb = K \times (Ne)^a \times (Tout)^b \times \{(A/F)/14.7\}^c \quad (2)$$

where Ne represents the engine rotational speed, Tout the fuel injection period of the fuel injection valve 5, A/F the air-fuel ratio, and K, a, b, c constants determined experimentally.

Then, at a step 1102, the catalyst temperature Tb calculated above is averaged by the use of the following equation (3) to obtain the current catalyst temperature $T_{CATn}$:

$$T_{CATn} = C_{REFT}/2^{16} \times Tb + (2^{16} - C_{REFT})/2^{16} \times T_{CATn-1} \quad (3)$$

where $C_{REFT}$ represents a weighing coefficient for weighing the average value $T_{CATn-1}$ calculated in the last loop and is set to a suitable value within a range of $1-2^{16}$.

By thus calculating the catalyst temperature, equivalent results to those of the sixth embodiment can be obtained even without the use of the catalyst temperature sensor 13. That is, although in the sixth embodiment where the temperature of the catalyst C is directly sensed by the catalyst temperature sensor 13, the catalyst temperature can be detected with accuracy, the use of the catalyst temperature sensor leads to an increase in the manufacturing cost, particularly in a case where high detection accuracy and high detection responsiveness are required. In addition, the catalyst temperature sensor 13 is usually mounted at the bottom of the vehicle body, which may lead to a short life and degraded reliability of the sensor due to splashes of water, mud, etc., scattering of pebbles, etc. Therefore, the present embodiment, which dispenses with the catalyst temperature sensor, is advantageous in solving the above problems.

Although in the sixth to seventh embodiments described above, the deterioration determination is made based solely upon the output from the downstream O₂ sensor RS, it may of course be made based upon both the outputs from the upstream and downstream O₂ sensors FS, RS.

Although in the sixth to seventh embodiments the deterioration-determining values for determining the O₂ storage capacity are obtained from tables, they may be calculated from the catalyst temperature. Also, the determined O₂ storage capacity may be corrected based upon the catalyst temperature.

Although in the sixth to seventh embodiments the two beds C1, C2 have almost the same size, alternatively one of the beds, for example, the front bed C1 may be larger in size than the rear bed C2. Further, three beds having almost the same size may be used.

What is claimed is:

1. A catalyst deterioration-determining system for determining deterioration of catalyst means of an internal combustion engine having:
   an exhaust passage;
   catalyst means arranged in said exhaust passage;
   an oxygen concentration sensor arranged in said exhaust passage downstream of said catalyst means for sensing concentration of oxygen contained in said exhaust gases;
   determining means for comparing an output from said oxygen concentration sensor with a predetermined reference value and determining, from a result of said comparison, whether the air-fuel ratio of a mixture supplied to said engine is richer or leaner than a stoichiometric air-fuel ratio;
   air-fuel ratio control means responsive solely to an output from said determining means for calculating an air-fuel ratio correction value and controlling the air-fuel ratio of said mixture by means of the calculated air-fuel ratio correction value; and
   operating condition detecting means for detecting operating conditions of said engine,
   said catalyst deterioration-determining system comprising:
   inversion time period measuring means for measuring a time period elapsed from the time said air-fuel ratio control means causes an inversion in the value of said air-fuel ratio of said mixture with respect to said stoichiometric air-fuel ratio in response to said output from said determining means to the time an inversion occurs in said output from said determining means, when it is detected by said operating condition detecting means that said engine is in a predetermined operating condition; and
   deterioration determining means for comparing said time period measured by said inversion time period measuring means with a predetermined time period and determining that said catalyst means is deteriorated, when said measured time period is shorter than said predetermined time period.

2. A catalyst deterioration-determining system as claimed in claim 1, wherein said operating condition detecting means includes catalyst temperature detecting means for detecting temperature of said catalyst means.

3. A catalyst deterioration-determining system as claimed in claim 2, including determination inhibiting means for inhibiting said determination of deterioration of said catalyst means, when the detected temperature of said catalyst means falls outside a predetermined range.

4. A catalyst deterioration-determining system as claimed in claim 2, wherein said catalyst temperature detecting means is mounted in said catalyst means for detecting temperature at a central portion of said catalyst means.

5. A catalyst deterioration-determining system as claimed in claim 1, wherein said operating condition detecting means includes catalyst temperature estimating means for estimating temperature of said catalyst means, based upon operating parmeters of said engine.

6. A catalyst deterioration-determining system as claimed in claim 5, wherein said catalyst temperature estimating means estimates the temperature of said catalyst means, based upon rotational speed of said engine and load on said engine.

7. A catalyst deterioration-determining system as claimed in claim 5, wherein said catalyst temperature estimating means estimates the temperature of said catalyst means, based upon an amount of intake air supplied to said engine.

8. A catalyst deterioration-determining system as claimed in claim 5, including determination inhibiting means for inhibiting said determination of deterioration of said catalyst means, when the estimated temperature of said catalyst means falls outside a predetermined range.

9. A catalyst deterioration-determining system as claimed in claim 1, wherein said inversion time period measuring means comprises:
   first time period measuring means for measuring a first time period elapsed from the time said air-fuel ratio control means causes a change in the value of said air-fuel ratio correction value from a richer side to a leaner side with respect to said stoichiometric air-fuel ratio to the time said output from said oxygen concentration sensor is inverted from said richer side to said leaner side with respect to said stoichiometric air-fuel ratio;
   second time period measuring means for measuring a second time period elapsed from the time said air-fuel ratio control means causes a change in the value of said air-fuel ratio correction value from said leaner side to said richer side with respect to said stoichiometric air-fuel ratio to the time said output from said second oxygen concentration sensor is inverted from said leaner side to said richer side with respect to said stoichiometric air-fuel ratio;
   said deterioration determining means comparing the sum of first and second time periods measured by said first and second time period measuring means or an average value thereof with a predetermined time period and determining that said catalyst means is deteriorated, when the sum or said average value is less than said predetermined time period;
   wherein said deterioration determining means calculates the sum or said average value of said first time period measured by said first time period measuring means and said second time period successively measured following said measurement of said first time period, by said second time period measuring means, and determines that said catalyst means is deteriorated when the calculated sum or average value is less than said predetermined time period.

10. A catalyst deterioration-determining system for determining deterioration of catalyst means of an internal combustion engine having:
    an exhaust passage;
    catalyst means arranged in said exhaust passage;
    a first oxygen concentration sensor arranged in said exhaust passage upstream of said catalyst means, for sensing concentration of oxygen contained in exhaust gases emitted from said engine;
    first determining means for comparing an output from said first oxygen concentration sensor with a first predetermined reference value and determining, from a result of said comparison, whether the air-fuel ratio of a mixture supplied to said engine is richer or leaner than a stoichiometric air-fuel ratio;
    a second oxygen concentration sensor arranged in said exhaust passage downstream of said catalyst means for sensing concentration of oxygen contained in said exhaust gases;
    second determining means for comparing an output from said second oxygen concentration sensor with a second predetermined reference value and determining, from a result of said comparison, whether the air-fuel ratio of said mixture supplied to said engine is richer or leaner than said stoichiometric air-fuel ratio;

air-fuel ratio control means responsive to an output from said second determining means for calculating an air-fuel ratio correction value and controlling the air-fuel ratio of said mixture by means of the calculated air-fuel ratio correction value; and operating condition detecting means for detecting operating conditions of said engine, said catalyst deterioration-determining system comprising:

inversion time period measuring means for calculating a time period based upon the time an inversion occurs in an output from said first determining means to the time an inversion occurs in said output from said second determining means, after said air-fuel ratio control means causes an inversion in the value of the air-fuel ratio of said mixture with respect to said stoichiometric air-fuel ratio in response to said output from said second determining means, when it is detected by said operating condition detecting means that said engine is in a predetermined operating condition; and deterioration determining means for comparing said time period calculated by said inversion time period measuring means with a predetermined time period and determining that said catalyst means is deteriorated, when said calculated time period is shorter than said predetermined time period.

11. A catalyst deterioration-determining system as claimed in claim 10, wherein said inversion time period measuring means comprises:

first time difference measuring means for measuring a first time difference between the time said output from said first oxygen concentration sensor is inverted from a richer side to a leaner side with respect to said stoichiometric air-fuel ratio after said air-fuel ratio control means causes a change in the value of said air-fuel ratio correction value from said richer side to said leaner side with respect to said stoichiometric air-fuel ratio and the time said output from said second oxygen concentration sensor is subsequently inverted from said richer side to said leaner side with respect to said stoichiometric air-fuel ratio;

second time difference measuring means for measuring a second time difference between the time said output from said first oxygen concentration sensor is inverted from said leaner side to said richer side with respect to said stoichiometric air-fuel ratio after said air-fuel ratio control means causes a change in the value of said air-fuel ratio correction value from said leaner side to said richer side with respect to said stoichiometric air-fuel ratio and the time said output from said second oxygen concentration sensor is subsequently inverted from said leaner side to said richer side with respect to said stoichiometric air-fuel ratio; and said deterioration determining means comparing the sum of first and second time differences measured by said first and second time difference measuring means or an average value thereof with a predetermined time period and determining that said catalyst means is deteriorated, when the sum or said average value is less than said predetermined time period;

wherein said deterioration determining means calculates the sum or said average value of said first time difference measured by said first time difference measuring means and said second time difference successively measured following said measurement of said first time period, by said second time difference measuring means, and determines that said catalyst means is deteriorated when the calculated sum or average value is less than said predetermined time period.

12. A catalyst deterioration-determining system for determining deterioration of catalyst means of an internal combustion engine having:

an exhaust passage;

catalyst means arranged in said exhaust passage;

a first oxygen concentration sensor arranged in said exhaust passage upstream of said catalyst means, for sensing concentration of oxygen contained in exhaust gases emitted from said engine;

a second oxygen concentration sensor arranged in said exhaust passage downstream of said catalyst means for sensing concentration of oxygen contained in said exhaust gases; and first air-fuel ratio control means responsive to an output from said first oxygen concentration sensor and an output from said second oxygen concentration sensor for controlling the air-fuel ratio of a mixture supplied to said engine by means of an air-fuel ratio correction value;

said catalyst deterioration-determining system comprising:

second air-fuel ratio control means responsive to said output from said second oxygen concentration sensor for controlling the air-fuel ratio of said mixture by means of said air-fuel ratio correction value;

operating condition determining means for determining whether said engine is in a predetermined operating condition;

changeover means for effecting changeover from said first air-fuel ratio control means to said second air-fuel ratio control means for controlling the air-fuel ratio of said mixture, when said engine is determined to be in said predetermined operating condition;

inversion determining means for determining whether said output from said second oxygen concentration sensor has been inverted from a leaner side to a richer side or vice versa with respect to a stoichiometric air-fuel ratio;

first time period measuring means for measuring a first time period elapsed from the time said second air-fuel ratio control means causes a change in the value of said air-fuel ratio correction value from said richer side to said leaner side with respect to said stoichiometric air-fuel ratio to the time said output from said second oxygen concentration sensor is inverted from said richer side to said leaner side with respect to said stoichiometric air-fuel ratio, after said changeover has been effected;

second time period measuring means for measuring a second time period elapsed from the time said second air-fuel ratio control means causes a change in the value of said air-fuel ratio correction value from said leaner side to said richer side with respect to said stoichiometric air-fuel ratio to the time said output from said second oxygen concentration sensor is inverted from said leaner side to said richer side with respect to said stoichiometric air-fuel ratio, after said changeover has been effected;

deterioration determining means for comparing the sum of said first and second time periods measured by said first and second time period measuring means or an average value thereof with a predetermined time period and determining that said catalyst means is deteriorated, when the sum or said average value is shorter than said predetermined time period.

13. A catalyst deterioration-determining system as claimed in claim 12, wherein said deterioration-determining means calculates the sum or said average value of said first time period measured while said second air-fuel ratio control means is controlling the air-fuel ratio of said mixture in response to said output from said second oxygen concentration sensor and said second time period successively measured following said measurement of said first time period, and determines that said catalyst means is deteriorated when the calculated sum or average value is less than said predetermined time period.

14. A catalyst deterioration-determining system for determining deterioration of catalyst of an internal combustion engine having:

an exhaust passage;

catalyst means arranged in said exhaust passage;

a first oxygen concentration sensor arranged in said exhaust passage upstream of said catalyst means, for sensing concentration of oxygen contained in exhaust gases emitted from said engine;

a second oxygen concentration sensor arranged in said exhaust passage downstream of said catalyst means, for sensing concentration of oxygen contained in said exhaust gases; and first air-fuel ratio control means responsive to an output from said first oxygen concentration sensor and an output from said second oxygen concentration sensor, for controlling the air-fuel ratio of a mixture supplied to said engine by means of a first air-fuel ratio correction value;

said catalyst deterioration determining system comprising:

second air-fuel ratio control means responsive to said output from said second oxygen concentration sensor, for controlling the air-fuel ratio of said mixture by means of a second air-fuel ratio correction value;

operating condition determining means for determining whether said engine is in a predetermined operating condition;

changeover means for effecting changeover from said first air-fuel ratio control means to said second air-fuel ratio controlling means for controlling the air-fuel ratio of said mixture, when said engine is determined to be in said predetermined operating condition;

deterioration determining means for determining whether said catalyst means is deteriorated, based on said output from said second oxygen concentration sensor which is output when the air-fuel ratio of said mixture is controlled by said second air-fuel ratio control means.

* * * * *